United States Patent [19]

Zimmerman

[11] 4,353,653

[45] Oct. 12, 1982

[54] FONT SELECTION AND COMPRESSION FOR PRINTER SUBSYSTEM

[75] Inventor: Lee T. Zimmerman, Boca Raton, Fla.

[73] Assignee: International Business Machines Corporation, Armonk, N.Y.

[21] Appl. No.: 86,384

[22] Filed: Oct. 19, 1979

[51] Int. Cl.³ .............................................. B41J 5/30
[52] U.S. Cl. ................................. 400/70; 400/109; 400/110; 400/124; 400/171; 400/55; 400/225; 400/248; 400/616.1; 364/900
[58] Field of Search ................ 400/70, 109, 110, 111, 400/120, 121, 124, 126, 171; 364/900

[56] References Cited

U.S. PATENT DOCUMENTS

| | | | |
|---|---|---|---|
| 3,038,148 | 6/1962 | Tait et al. | 364/900 |
| 3,413,611 | 11/1968 | Pfuetze | 364/900 |
| 3,521,241 | 7/1970 | Rumble | 364/900 |
| 3,613,087 | 10/1971 | Brown et al. | 364/900 |
| 3,634,828 | 1/1972 | Myers et al. | 364/900 |
| 3,643,226 | 2/1972 | Loizides et al. | 364/900 |
| 3,964,591 | 6/1976 | Hill et al. | 400/126 |
| 4,005,390 | 1/1977 | Findley | 400/70 X |
| 4,029,190 | 6/1977 | Ragen et al. | 400/70 |
| 4,031,519 | 6/1977 | Findley | 364/900 |
| 4,050,563 | 9/1977 | Menhennett | 400/124 |
| 4,079,458 | 3/1978 | Rider et al. | 364/900 |
| 4,084,261 | 4/1978 | Laker et al. | 364/900 |
| 4,125,873 | 11/1978 | Chesarek | 364/900 |
| 4,137,425 | 1/1979 | Ferroglio et al. | 400/111 X |
| 4,145,570 | 3/1979 | Diab | 400/111 X |
| 4,159,882 | 7/1979 | Sanders, Jr. et al. | 400/124 |
| 4,179,738 | 12/1979 | Fairchild et al. | 364/200 |
| 4,217,055 | 8/1980 | Moon | 400/144.2 |

OTHER PUBLICATIONS

IBM Technical Disclosure Bulletin, "Composing Systems which Incorporate Font Changing and Impression Setting from Tape or Card Input", Hunt et al., vol. 13, No. 5, Oct. 1970, pp. 1149-1150.

IBM Technical Disclosure Bulletin, "Memory Arrangement Representing a Keyboard having both Fixed and Variable Characters", Hamilton et al., vol. 21, No. 9, Feb. 1979, pp. 3471-3472.

Primary Examiner—Ernest T. Wright, Jr.
Attorney, Agent, or Firm—D. Kendall Cooper

[57] ABSTRACT

A printer subsystem receives command and data information from a host system and retains a large number of font images in an associated storage area within the printer subsystem. A base font image set is ordinarily selected by the user but provision is made to dynamically change the font images as may be required in a real time fashion during actual printing operations. The font images are stored in a compressed form in the storage area. Routines involve use of pointer tables and data tables. It is possible to select an entire set of new font images in place of the base set of images or to modify only selected character images within the base font image set.

7 Claims, 72 Drawing Figures

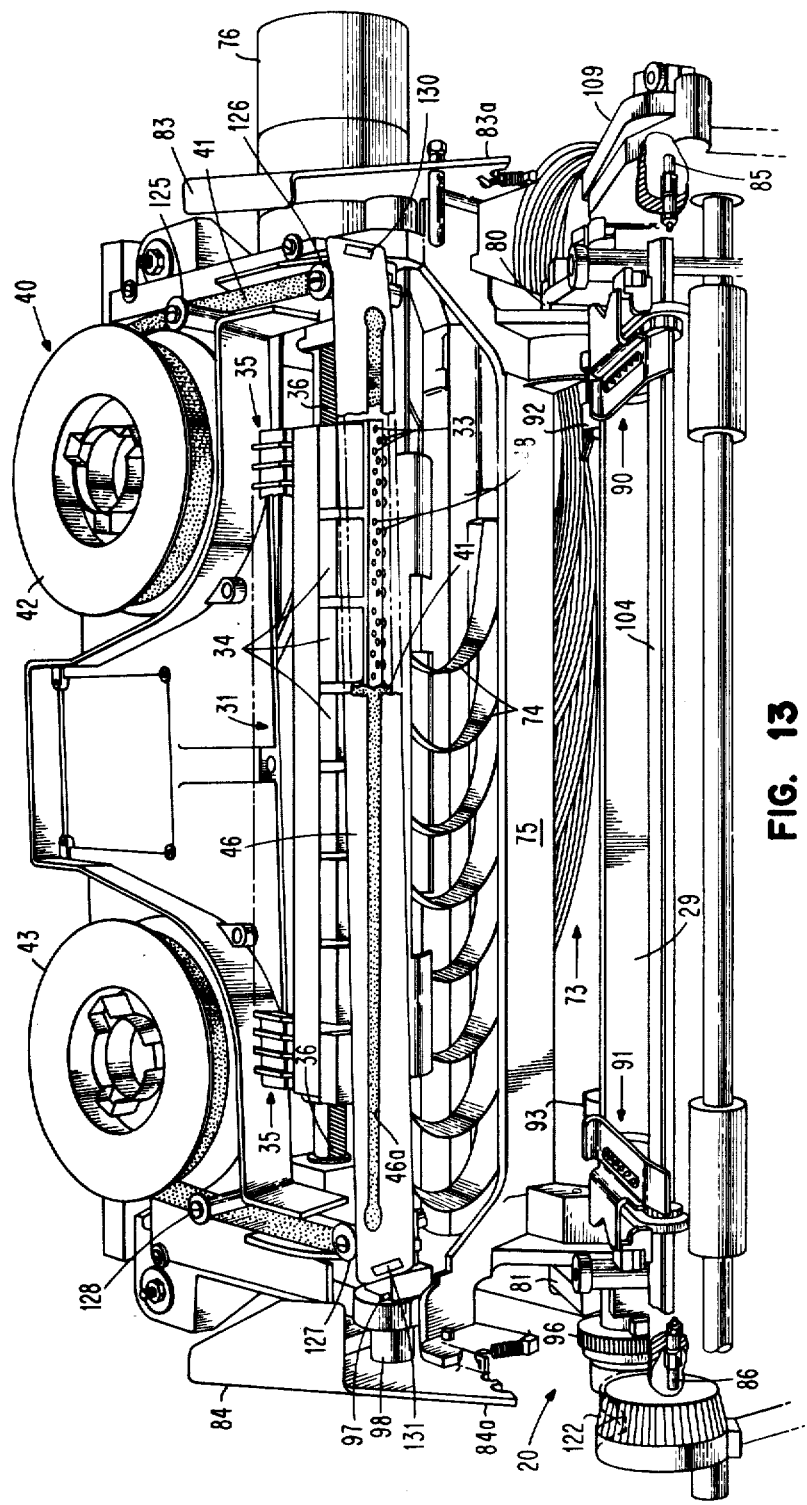

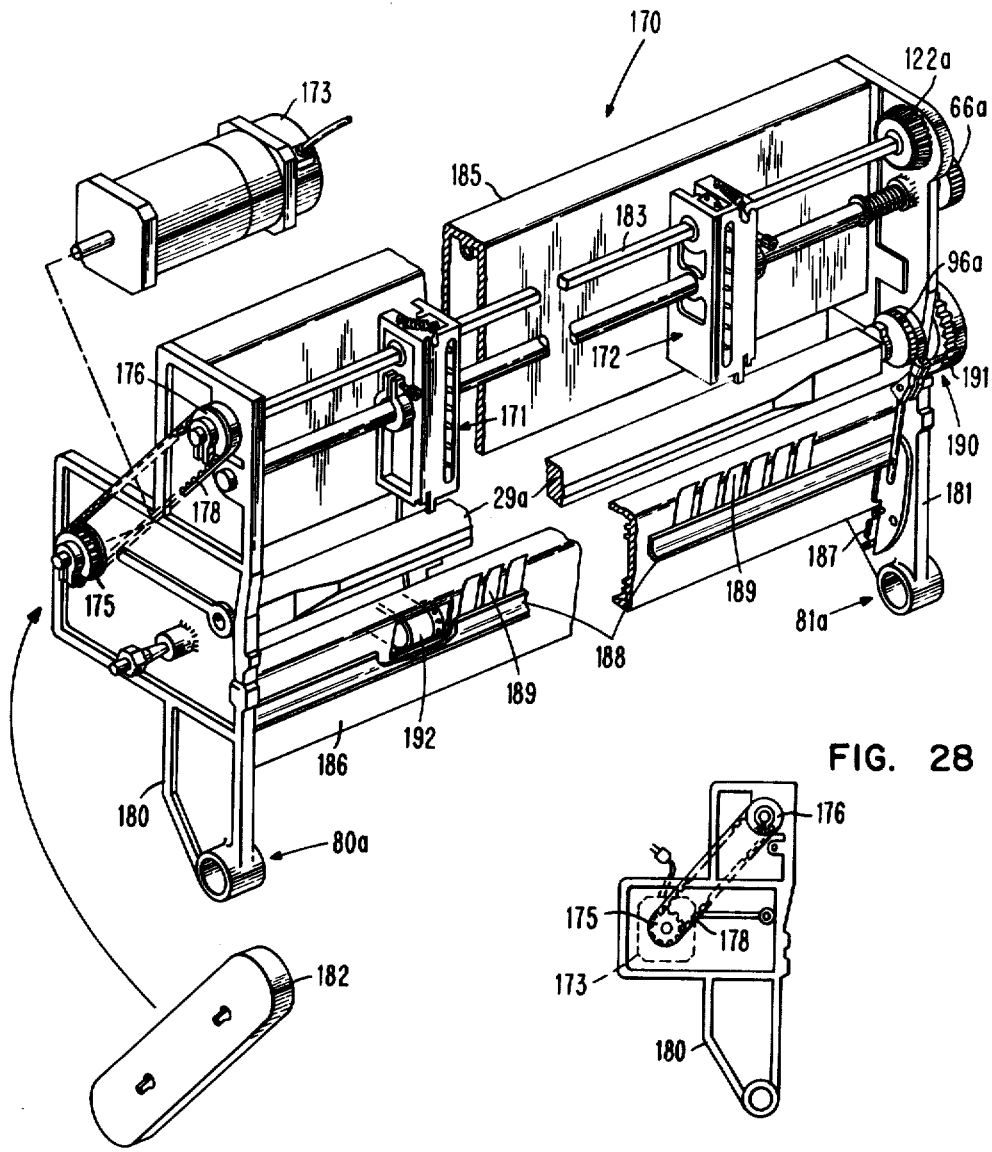

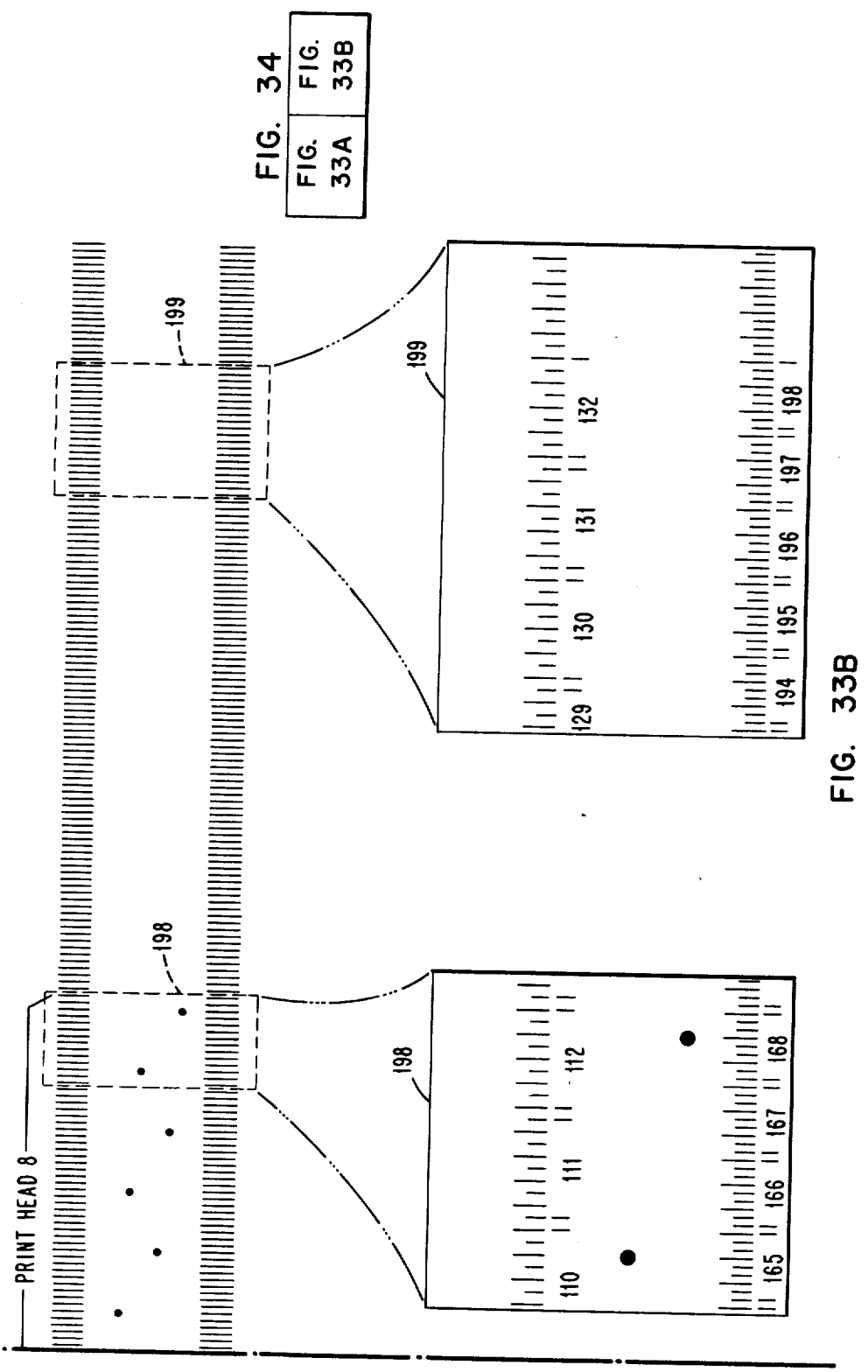

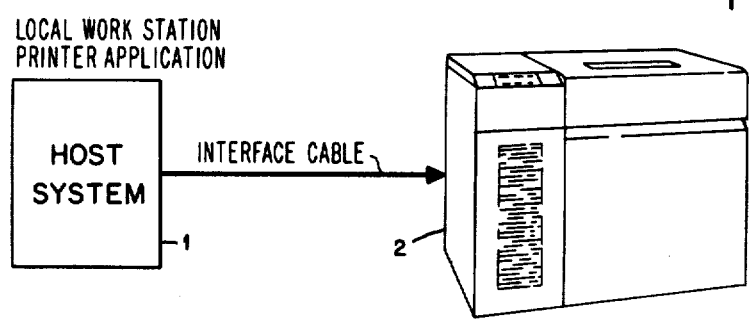
FIG. 38
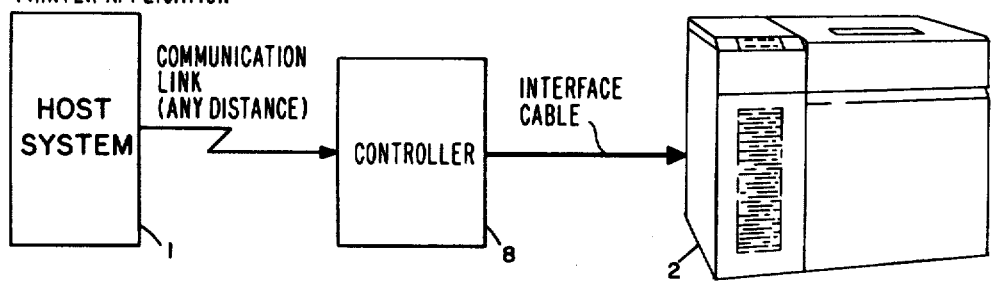
FIG. 39
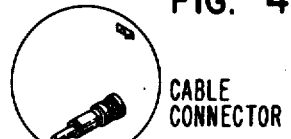
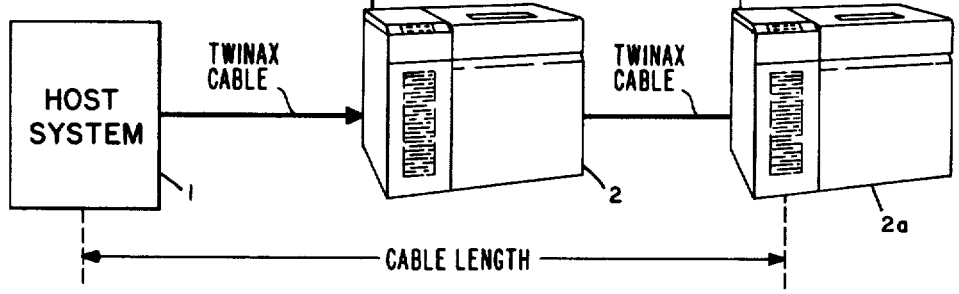
FIG. 40

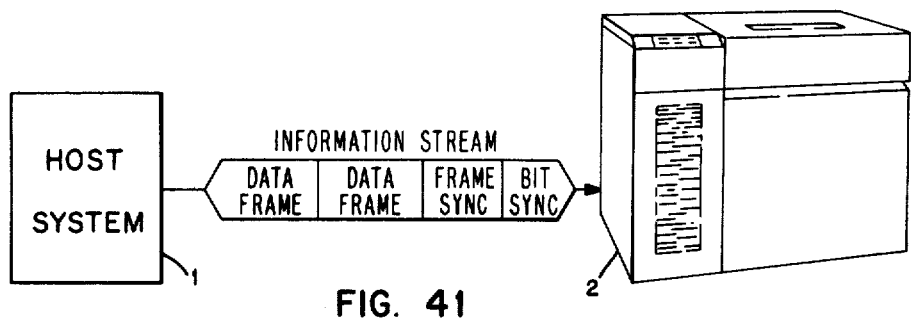
FIG. 41
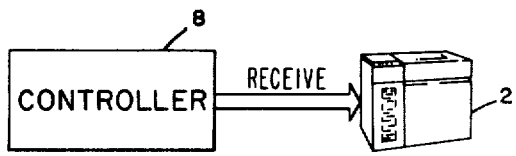
FIG. 42
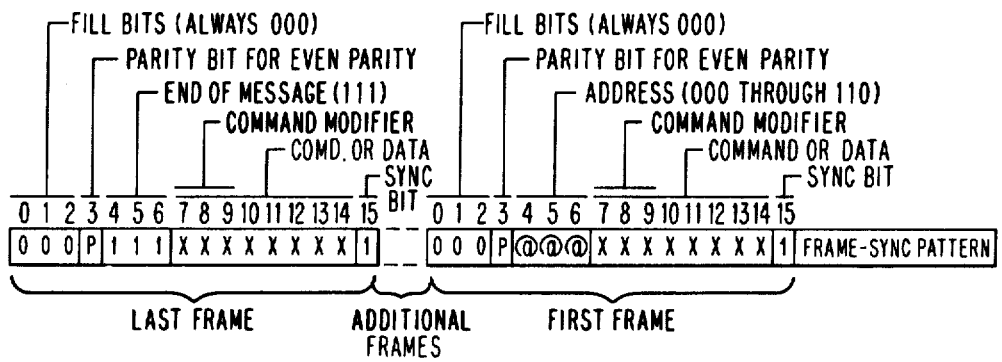
FIG. 43
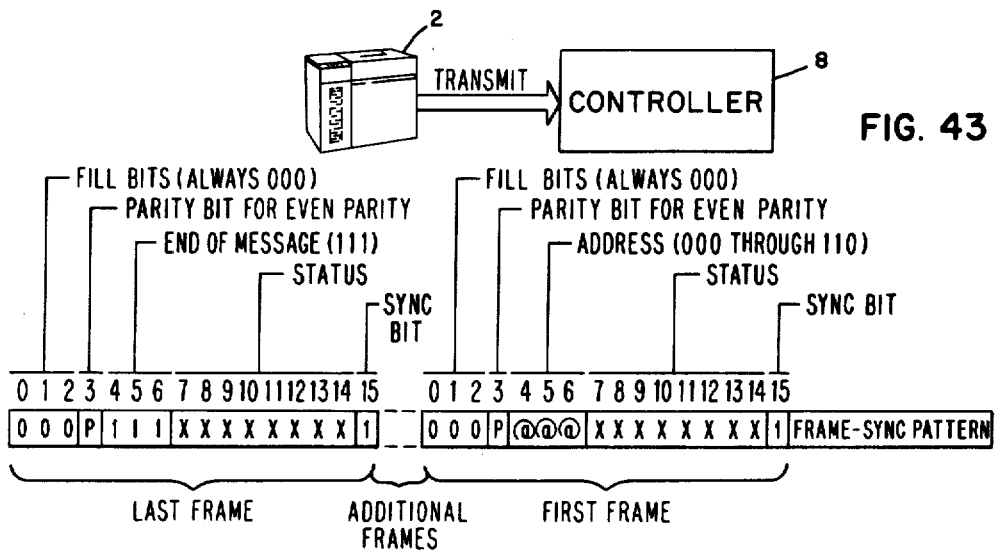

ADDRESSING HIGHLIGHTS
FOR A SINGLE PRINTER, ADDRESS IS 000
WITH CABLE CONNECTOR FEATURE, USABLE ADDRESSES ARE 000 TO 110
A BIT COMBINATION OF 111 INDICATES END-OF-MESSAGE & TERMINATES A
TRANSFER SEQUENCE

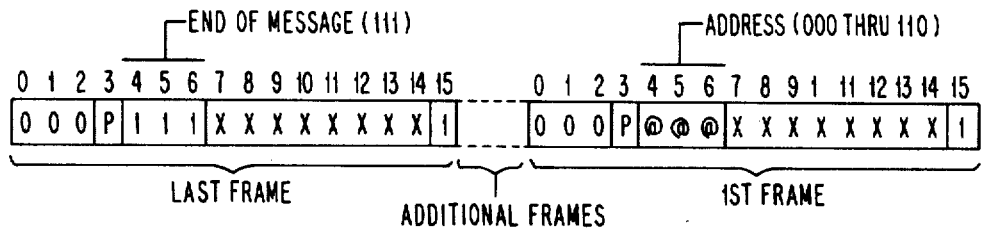

FIG. 44

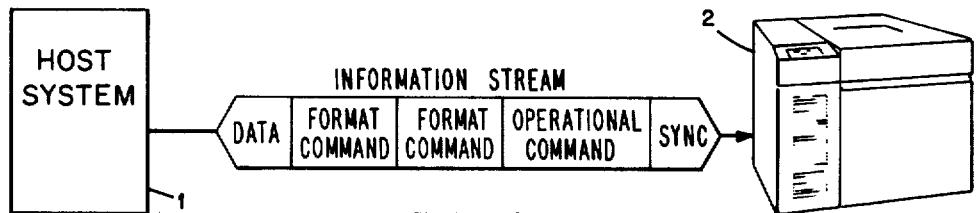

FIG. 45

SAMPLE TRANSFER SEQUENCE FOR PRINTING DATA

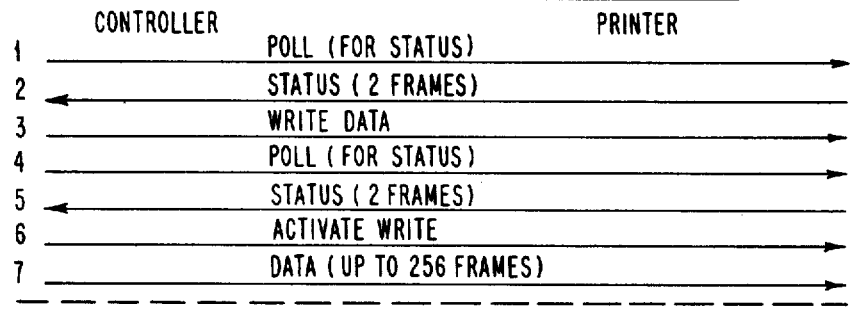

1, 4: POLL COMMAND REQUESTS PRINTER STATUS
2, 5: RESPONSE STATUS FRAMES INFORM CONTROLLER OF PRINTER AVAILABILITY
3: WRITE DATA COMMAND PREPARES PRINTER FOR PRINTING OPERATION
6: ACTIVATE WRITE COMMAND STARTS PRINTING OPERATION
7: CONTROLLER SENDS DATA & EMBEDDED FORMATTING COMMANDS TO PRINTER

FIG. 46

OPERATIONAL COMMAND
POLL (X0)

FORMATTING COMMAND
NEW LINE (15)

POLL STATUS FRAME 1

POLL STATUS FRAME 2

COMMUNICATIONS MICROPROCESSOR (CMM)

CONTROL MICROPROCESSOR (CTM)

| TABLE 1A | | | 1ST PASS | 2ND PASS |
|---|---|---|---|---|
| B9 | 1011 | 1001 | SKIP X'1C' | GRAPHIC ERROR (X'1C') |
| C9 | 1100 | 1001 | SKIP X'24' | GRAPHIC ERROR (X'24') |
| 00 | 0000 | 0000 | SPACE | SKIP |
| 00 | 0000 | 0000 | REQUIRED SPACE | SKIP |
| D6 | 1101 | 0110 | A(LC) CIRCUMFLEX | SKIP |
| FE | 1111 | 1110 | A(LC) DIAERESIS | SKIP |
| F6 | 1111 | 0110 | A(LC) GRAVE ACCENT | SKIP |
| DE | 1101 | 1110 | A(LC) ACUTE | SKIP |

TABLE 2A

| | |
|---|---|
| 20 | 00 |
| 20 | 11 |
| 20 | 17 |
| 20 | 17 |
| 02 | 00 |
| 02 | 00 |
| 0A | 60 |
| FF | FF |

TABLE 2B

| | |
|---|---|
| B0 | 4A |
| 4F | 5A |
| BB | 4F |
| BA | 5F |
| 44 | 4A |
| BE | 5A |
| DD | 6A |

TABLE 2C

| | | | |
|---|---|---|---|
| C1 | 1100 | 0001 | GRAPHIC ERROR X'20' CHARACTERS |
| C1 | 1100 | 0001 | GRAPHIC ERROR X'20' CHARACTERS |
| 03 | 0000 | 0011 | SKIP 1 CHARACTER |
| 01 | 0000 | 0001 | SKIP 0 CHARACTER |
| 93 | 1001 | 0011 | GRAPHIC ERROR 9 CHARACTERS |
| 0F | 0000 | 1111 | SKIP 7 CHARACTERS |

FIG. 61

LOADING CHARACTERS FROM COMPRESSED TABLES

LOAD TABLE

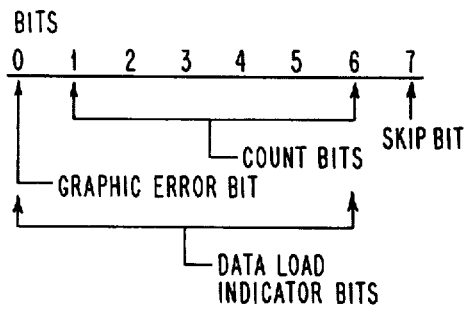

DATA TABLE

BYTE X, BYTE X+1, BYTE X+2.........

FOR GRAPHIC ERROR & SKIP THE
BITS HAVE THE FOLLOWING VALUE
- 6 = 1
- 5 = 2
- 4 = 4
- 3 = 8
- 2 = 16
- 1 = 32

0000 0101 = SKIP 2 CHARACTERS
1000 1011 = 5 GRAPHIC ERROR CHARACTERS 1001 1010 = LOAD NEXT BYTE FOR 2ND SLICE OF CHARACTER IMAGE
LOAD 2 BLANKS FOR 3RD & 4TH SLICE OF     "         "
LOAD NEXT BYTE FOR 5TH SLICE OF          "         "
"    "    "    "    6TH "    "           "         "
" ONE BLANK" 7TH "    "                  "         "
"    "    "    "    8TH "    "           "         "
SLICE 1 & 9 ARE BLANK AS RANDOM ACCESS MEMORY IS
BLANK AT THE START

FIG. 63

SET CODED GRAPHIC CHARACTER SET(CGCS)
THROUGH LOCAL ID (2BD10381P1)

| 0 | 0 | 0 | X | X | X | X | 0 | 0 | 1 | 0 | 1 | 0 | 1 | 1 | 1 |

| 0 | 0 | 0 | X | X | X | X | 1 | 1 | 0 | 1 | 0 | 0 | 0 | 1 | 1 |

| 0 | 0 | 0 | X | X | X | X | 0 | 0 | 0 | 0 | 0 | 0 | 1 | 1 | 1 |   FIG. 64

| 0 | 0 | 0 | X | X | X | X | 1 | 0 | 0 | 0 | 0 | 0 | 0 | 1 | 1 |

| 0 | 0 | 0 | X | X | X | X |   |   | P1 |   |   |   |   |   | 1 |
0                                                                 15

LOAD ALTERNATE CHARACTER(S)(2BFENN)

| 0 | 0 | 0 | X | X | X | X | 0 | 0 | 1 | 0 | 1 | 0 | 1 | 1 | 1 |

FIG. 65   | 0 | 0 | 0 | X | X | X | X | 1 | 1 | 1 | 1 | 1 | 1 | 1 | 0 | 1 |

| 0 | 0 | 0 | X | X | X | X |   | N |   |   |   | N |   |   | 1 |
0                                                                 15

0                                                                 15
| 0 | 0 | 0 | X | X | X | X | 0 | 1 | 0 | 0 | 0 | 0 | 1 | 0 | 1 |

PRINTING FROM INTERFACE BUFFER WITH CONTROL CODES TO CHANGE FONTS & MODIFY CHARACTER IMAGE

FONT SELECTION AND COMPRESSION FOR PRINTER SUBSYSTEM

BACKGROUND OF THE INVENTION

The invention relates to font selection for printers. In prior printer subsystems, different fonts have ordinarily been provided for printing images in several languages. However, selection of the fonts has been on a somewhat limited and highly selective basis. That is, it has been customary for any individual printer subsystem to have only one or several fonts available and these are usually prewired into the system for each individual customer. The customer has not been able to expand the range of languages or special symbols that he might require during normal printer operations without extensive reworking of the font selection means, a service call, and the like. Where font selection has been available, the storage required for the fonts has been rather extensive.

SUMMARY OF THE INVENTION

In accordance with the present invention, storage facilities are provided for a printer subsystem, the storage facilities being preloaded with a large number of font images arranged generally in accordance with individual languages accessible by the printer subsystem on a real time basis as printing operations proceed. With this arrangement, it is possible to print more than one language in individual lines of characters with a rapid switchover from one language to another in a manner that the switchover is hardly noticeable by the user. In addition, special symbols are accommodated. That is, the customer may require symbols that are unique to his particular printing operations and that are ordinarily not encountered by any other customer. In addition, the font storage is on a compressed basis, that is numerous font images are stored in a relatively limited amount of storage space by a compression technique. In most cases, the printer subsystem is loaded with a "base" font image set that is the normal font image used by the particular printer subsystem. As operations proceed, the "base" image can be replaced by other font images. After use of the other font images, the printer subsystem ordinarily returns to the base font image set. Routines involve the storage of all of the fonts in selected areas of a read only storage, the images being accessed during printer operations as required for generation of wire images in the printer unit. Routines make use of pointer tables and data tables for the base font images, modifications for the base font images, and alternative font images that may be selected by the subsystem.

CROSS-REFERENCE TO RELATED PATENT APPLICATIONS

The present patent application is one of a group of copending patent applications which concern the same overall printer subsystem configuration but which individually claim different inventive concepts embodied in such overall printer subsystem configuration. These related patent applications were filed on the same date, namely, Oct. 19, 1979, are specifically incorporated by reference herein, and are more particularly described as follows:

(1) Application Ser. No. 086,484 entitled "Printer Subsystem with Dual Cooperating Microprocessors", the inventors being Messrs. William W. Boynton, et al;

(2) Application Ser. No. 086,494 entitled "Partial Line Turnaround for Printers", the inventors being Messrs. Gregory N. Baker et al;

(3) Application Ser. No. 086,490 entitled "Automatic Print Inhibit in Margins for Printer Subsystem", the inventors being Messrs. Willard Greene et al;

(4) Application Ser. No. 086,491 entitled "Detection of Multiple Emitter Changes in Printer Subsystem", the inventors being Messrs. Barry R. Cavill et al;

(5) Application Ser. No. 086,492, now U.S. Pat. No. 4,279,199 issued July 21, 1981, and entitled "Print Head Image Generator for Printer Subsystem", the inventors being Messrs. Abelardo D. Blanco et al;

(6) Application Ser. No. 086,568, now U.S. Pat. No. 4,285,604 issued Aug. 25, 1981, and entitled "Ribbon Shield for Printer", the inventor being Mr. Donald K. Rex;

(7) Application Ser. No. 086,483, now U.S. Pat. No. 4,278,020 issued July 14, 1981, and entitled "Print Wire Actuator Block Assembly for Printers", the inventor being Mr. Albert W. Oaten; and (8) Application Ser. No. 086,567 entitled "Microcomputer Control of Ribbon Drive for Printers", the inventors being Messrs. Barry R. Cavill, et al.

For a better understanding of the present invention, together with other and further advantages and features thereof, reference is made to the description taken in connection with the accompanying drawing, the scope of the invention being pointed out in the appended claims.

BRIEF DESCRIPTION OF THE DRAWING

Referring to the drawing:

FIG. 11 is a view of a ribbon shield having a print aperture positioned in a horizontal plane.

FIG. 12 is a cross-sectional view of the ribbon shield on the line 12—12 in FIG. 11.

FIG. 13 is an overhead view of the printer slightly from the rear of the unit showing the forms feed open.

FIGS. 27 and 28 illustrate an alternative forms feed assembly for the printer unit.

FIGS. 33A and 33B, when arranged as shown in FIG. 34, show in greater detail the relationship of the print wires to character locations on the forms to be printed.

FIGS. 38-40 illustrate various systems in which the printer subsystem may be connected.

FIG. 41 illustrates a stream of information between the host system and the printer subsystem.

FIG. 42 illustrates significance of bits in the frames during a receive mode when information is transferred from the controller to the printer subsystem.

FIG. 43 illustrates bit significance for the frames during a transmit mode when information is transferred from the printer subsystem to the controller.

FIG. 44 illustrates the bit configurations for printer addressing.

FIG. 45 shows command and data arrangements in the information stream.

FIG. 46 is a chart illustrating a typical transfer of data to be printed.

FIGS. 59-61 are more detailed representations of the scheme shown in FIG. 58.

FIG. 63 illustrates loading of characters from compressed tables.

FIG. 64 illustrates the formatting command for Coded Graphic Character Set (CGCS) word to change font images.

FIGS. 65-67 show various aspects of a Load Alternate Character operation.

DESCRIPTION OF PRINTER SUBSYSTEM AND PRINTER MECHANISMS

In order to best illustrate the utility of the present invention, it is described in conjunction with a high speed matrix printer, typically capable of printing in a high range of lines per minute on continuous forms. The particular printer subsystem described herein is associated with a host system or processor, responds to command and data signals from the host to print on the forms and in turn provides status signals to the host during operations.

The printer itself is an output line printer designed to satisfy a variety of printing requirements in data processing, data collection, data entry, and communications systems. It can be used as a system printer or a remote work station printer.

The following printer highlights are of interest:
Print density of 10 or 15 characters per inch (25.4 mm) selectable by the operator or by the using system program;
Condensed print mode, 15 characters per inch (25.4 mm) saves paper costs and makes report handling, mailing, reproduction, and storage easier;
Line spacing of 6, or 8 lines per inch (25.4 mm) or any other line density selectable by the operator or by the using system program;
Incremental and reverse forms movement selectable by the using system program;
Sixteen self-contained character sets selectable by the using system program with a base language selected by hardware jumpers.
Special graphics ability (special characters, graphs, plotting, etc.) selectable by the using system program;
Matrix printing technology;
Built-in diagnostics for problem determination by the operator;
Microprocessor control unit;
Maximum print line width—330.2 mm (13.2 in);
Maximum print positions for 10 characters per inch (25.4 mm)—132;
Maximum print positions for 15 characters per inch (25.4 mm)—198;
Adjustable forms width—76.2 to 450 mm (3.0 to 17.7 in);
Maximum forms length—76.2 to 317.5 mm (3.0 to 12.5 in).

Figure 1:
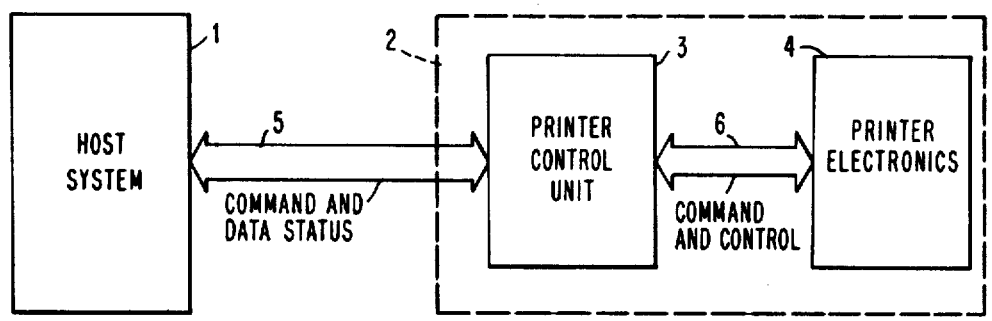
FIG. 1 is a simplified system diagram for the printer subsystem.

FIG. 1 illustrates a representative system configuration including a host system 1 and the printer subsystem 2 which includes a printer control unit 3 and printer electronics 4. Command and data signals are provided by the host system by way of interface 5, and command and control signals are provided from printer control unit 3 to the printer electronics 4 by way of bus 6. Status signals are supplied by printer control unit 3 to host system 1 by way of interface 5. Typically, the host system 1 generates information including commands and data and monitors status. Printer control unit 3 receives the commands and data, decodes the commands, checks for errors and generates status information, controls printing and spacing, and contains printer diagnostics. Printer electronics 4 executes decoded control unit commands, monitors all printer operations, activates print wires, drives motors, senses printer emitters, and controls operator panel lights and switching circuitry. It controls the tractor/platen mechanism, the ribbon drive, the print head (i.e., actuator group) carrier 31, the operator panel 26, and the printer sensors.

The elements of the system, such as the printer control unit 3 and printer electronics 4, incorporate one or more microprocessors or microcomputers to analyze commands and data and to control operations.

Figure 2:
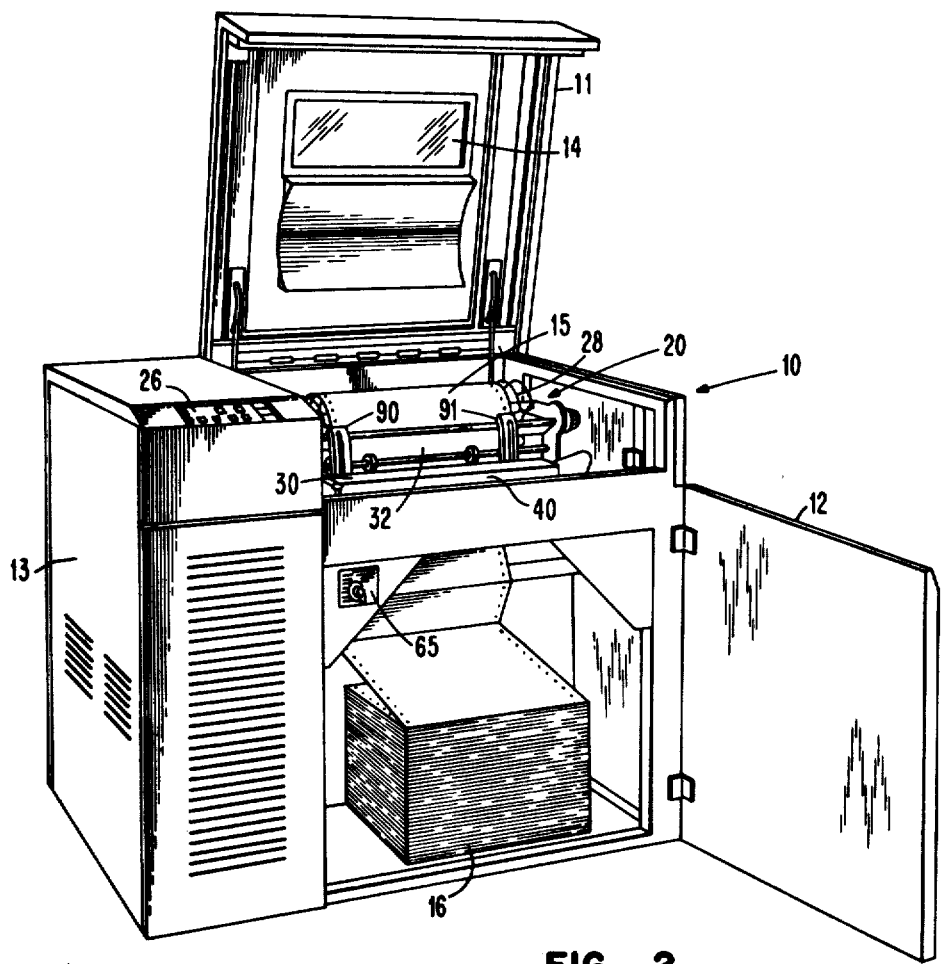
FIG. 2 illustrates the printer console and a number of printer components as well as forms feeding.
Figure 3:
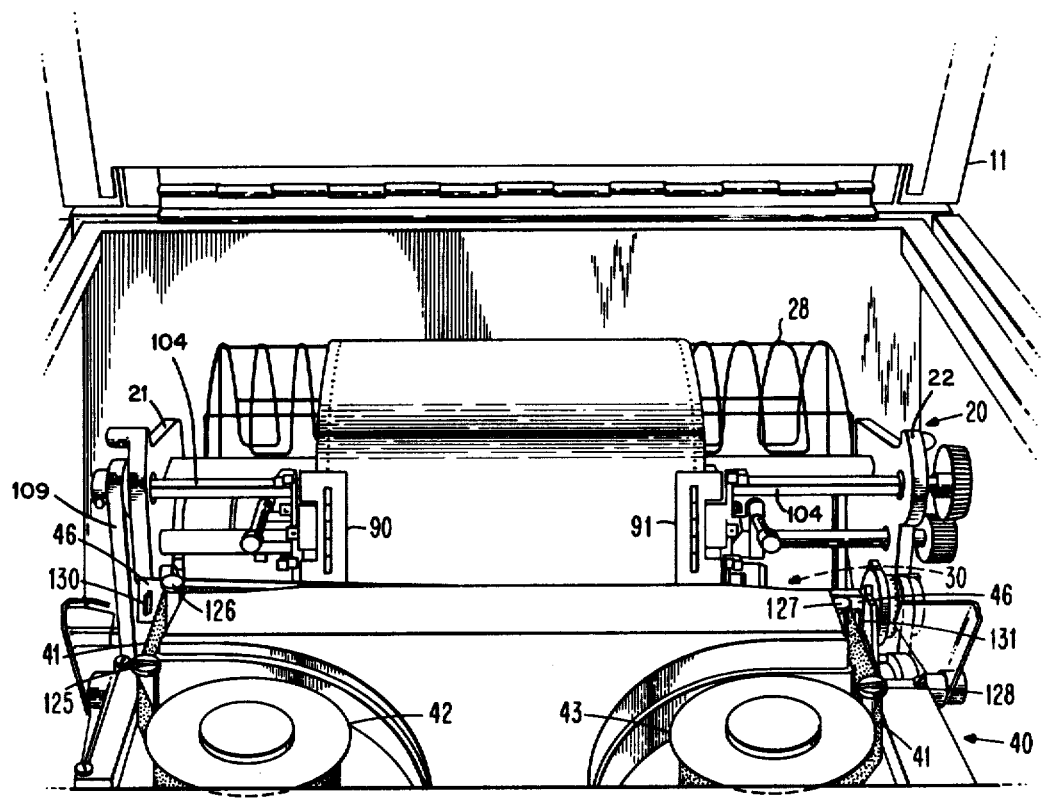
FIG. 3 is a frontal view of the printer unit in the printer console of FIG. 2.

FIGS. 2 and 3 illustrate various components of the printer all of which are housed in the console 10. Various access panels or covers such as those designated 11, 12, and 13 are provided. Top cover 11 has a window 14 that enables an operator to observe forms movement during operation of the printer and when the cover 11 is closed. Forms (documents) 15 are provided from a stack 16 and can be fed in one embodiment upwardly or downwardly as viewed in FIGS. 2 and 3 by means of a forms feed assembly 20 which includes one or more sets of forms tractors such as the upper set comprising tractors 90 and 91. A forms guide 28 guides the forms 15 after printing to a takeup stack, not shown but positioned below the printing mechanism and to the rear of the printer console 10. The printer subsystem 2 incorporates a print assembly 30 that is positioned generally in a horizontal relationship with respect to forms 15 at a print station 32. Print assembly 30 is more clearly visible in other views. This is also true of the printer ribbon drive assembly 40 which is located in closer proximity to the front of the printer. Printer control unit 3 and its associated microprocessors are generally located behind the side cover 13.

Figure 4:
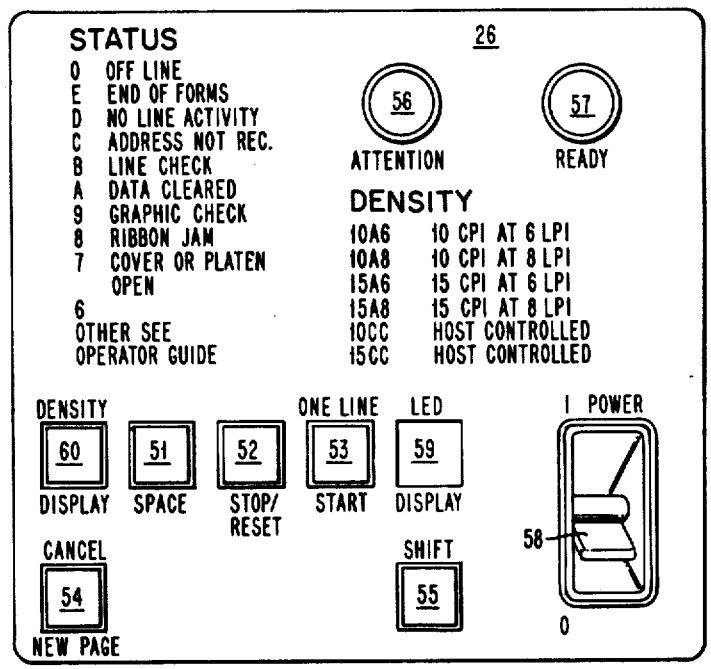
FIG. 4 illustrates an operator panel useful with the printer of FIGS. 1 and 2.

A ribbon 41 is provided on one of the spools 42 or 43, which are disposable. Each box of ribbons would preferably contain a disposable ribbon shield 46 that fits between print assembly 30 and forms 15 to keep ribbon 41 in proper alignment and to minimize ink smudging on forms 15. Two motors 49 and 50 shown more clearly in FIG. 8 drive ribbon 41 back and forth between spools 42 and 43. The printer control unit 3 detects ribbon jams and end of ribbon (EOR) conditions. A ribbon jam turns on an error indicator (display 59 shows "80", FIG. 4) and stops printing. An EOR condition reverses the ribbon drive direction.

The printer includes an operator panel 26 (shown in greater deail in FIG. 4) that consists of several operator control keys (pushbuttons 51-55 and 60), two indicator lights 56, 57, a power on/off switch 58, and an operator panel display 59. By using various combinations of the keys 51-54 and 60 in conjunction with the shift key 55 the operator can: start or stop printing and view the last line printed, set print density, position the forms 15 up or down one page or one line at a time, move the forms 15 incrementally up or down for fine adjustment, and start or stop the diagnostic tests when selected by a mode switch 65, FIG. 5, to be described.

The operator panel 26 notifies the operator that: the printer is ready to print data from the using system (57), the printer requires attention (56), the current print density setting (60), errors, if any, have been detected, and the results of the diagnostic tests (59).

Figure 5:
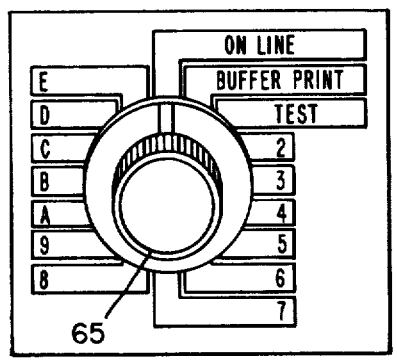
FIG. 5 shows a mode switch for control of on-line, off-line conditions.

A 16-position mode switch 65 is located behind the front door 12 and is shown in greater detail in FIG. 5. The on-line positions permit printing to be controlled by the using system. All other positions are off-line and do not allow printing to be initiated from the using system.

The first three switch positions are used by the operator to select these modes:

On-line. The normal operating position. With the switch 65 in this position, the printer accepts commands from the using system. The operator panel display 59 indicates any detected error conditions.

Buffer Print. An additional on-line position which permits the EBCDIC values (hexadecimal codes) sent from the host system 1 and the associated character images. No control characters are interpreted. This feature allows the user to view the data stream sent to the printer.

Test. For off-line checkout and problem determination. In test mode, when Start key 53 is pressed, the attention indicator (56) stays on and Ready indicator (57) is turned on until the diagnostic tests that are stored in the printer control unit 3 are finished or the Stop key 52 is pressed. If an error is detected, the printer stops and displays an error code in the operator panel display 59.

The remaining thirteen (13) positions of the mode switch 65 designated "2-9" and "A-E" are used by service personnel to select a variety of diagnostic tests to aid in off-line problem determination and confirmation of service requirements.

Figure 6:
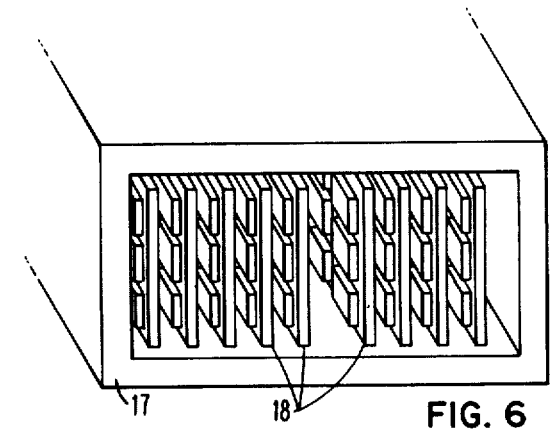
FIG. 6 shows a gate assembly with printed circuit cards.

FIG. 6 illustrates a gate assembly 17 located behind side cover 13, FIG. 2, the gate assembly 17 including modular printed circuit cards such as cards 18 that contain much of the circuit elements for printer control unit 3 and printer electronics 4, FIG. 1.

Figure 7:
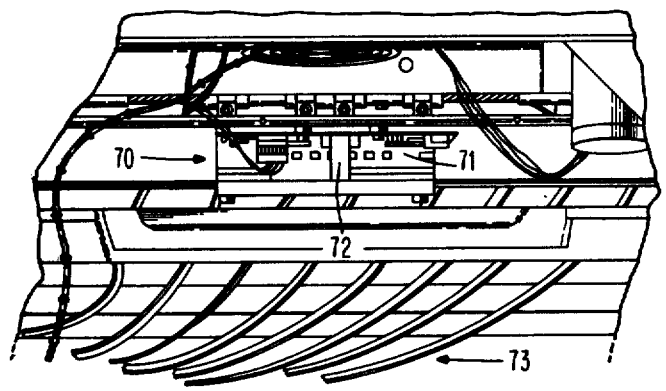
FIG. 7 is a frontal view of the printer console of FIG. 2 with the cover open showing a print emitter.

FIG. 7 is a frontal view of a print emitter assembly 70 that includes an emitter glass 71 and an optical sensor assembly 72. Glass 71 is vertically positioned with respect to sensor assembly 72 and is mechanically attached to print assembly 30 so that as the print heads 34, print actuators 35, and print wires 33 move back and forth left to right and conversely as viewed in FIG. 7, glass 71 also moves in the same manner with respect to sensor assembly 72 to indicate the horizontal position of the print wires 33. Cabling 73 supplies signals to the print actuators 35 which are described in detail below.

OVERVIEW OF PRINTER MECHANISMS

Figure 8:
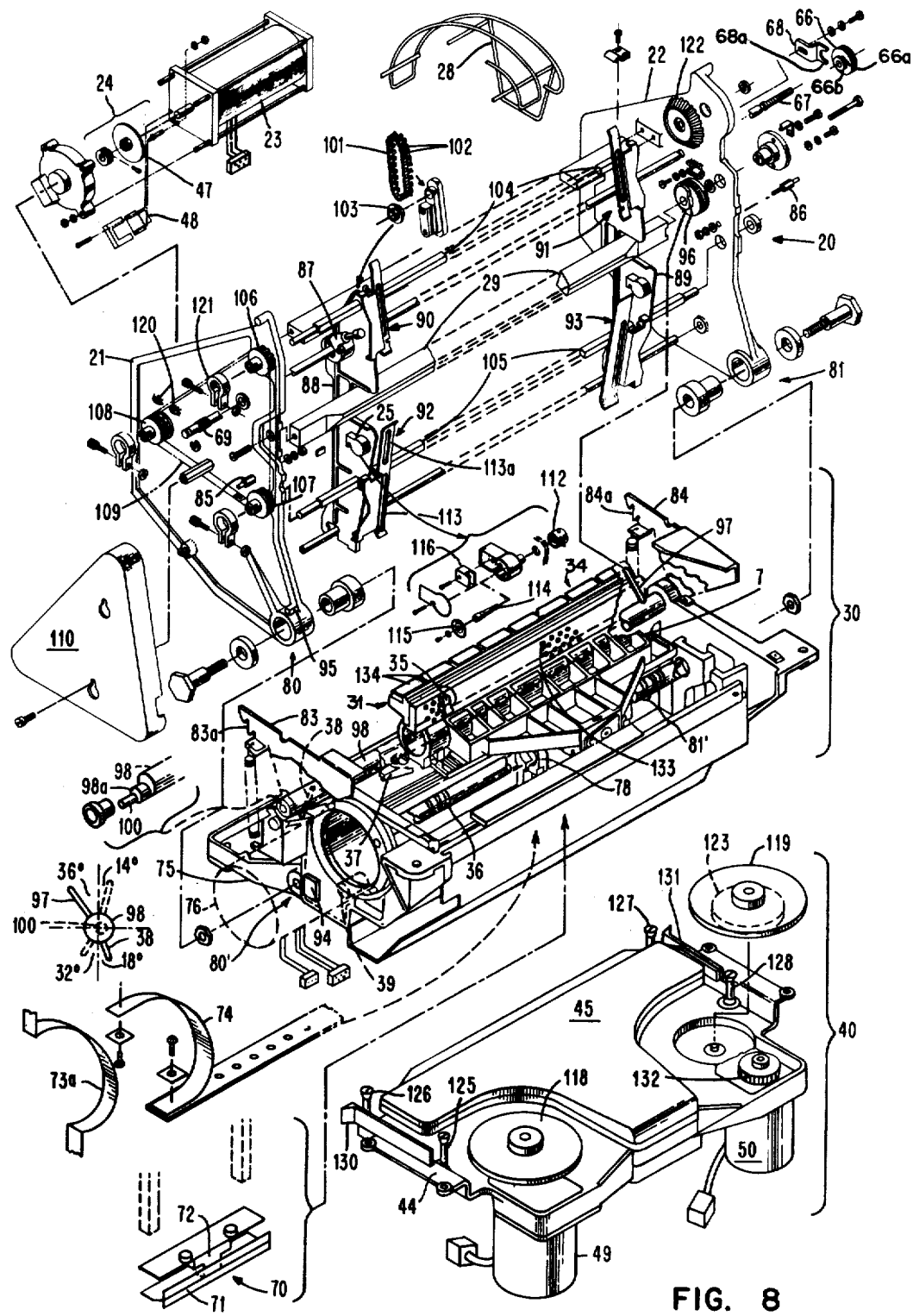
FIG. 8 is an exploded view of various printer assemblies including the forms feed assembly, the print assembly and the ribbon drive assembly.
Figure 9:
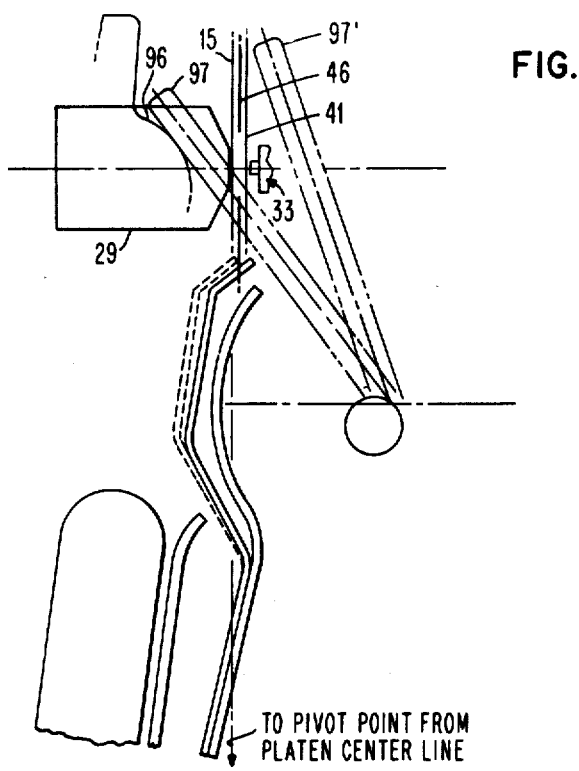
FIG. 9 is a cross-sectional view at the print line of the printer of FIGS. 2, 3, and 8.
Figure 10:
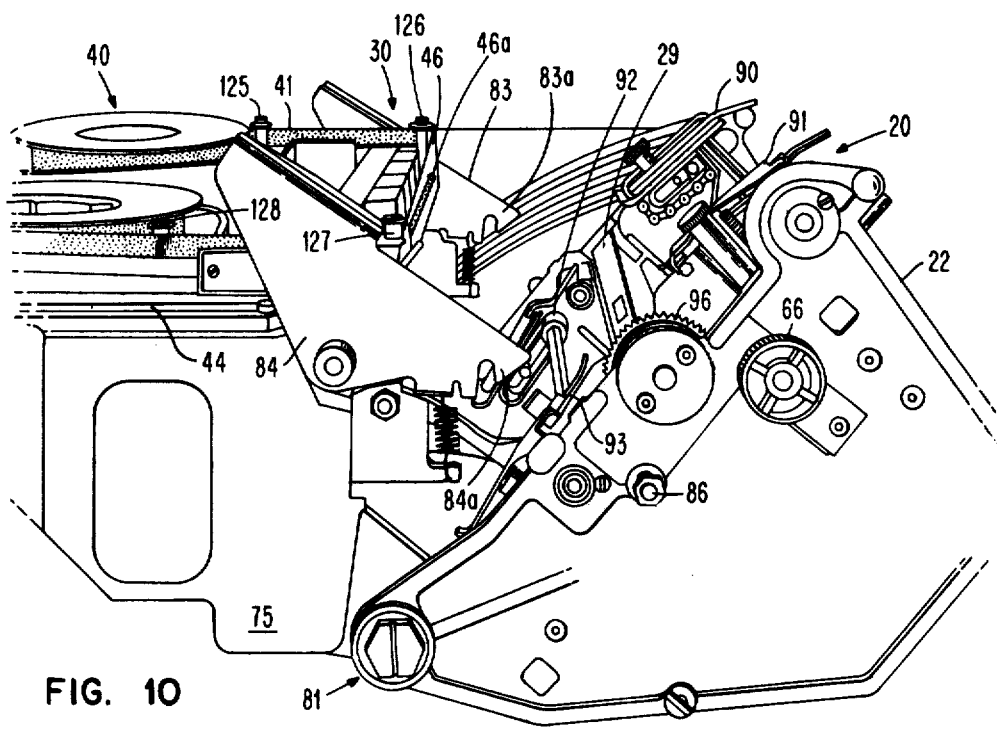
FIG. 10 is a right side elevation of various printer assemblies shown in FIG. 8.

FIGS. 8, 9 and 10, among others, show the details of construction of the forms feed assembly 20, the print assembly 30, the ribbon drive assembly 40, and various associated emitters. A general overview of these assemblies is first presented.

As best seen in FIGS. 8 and 10, forms feed assembly 20 has end plates (side castings) 21 and 22 which support the various forms feed mechanisms including a drive motor 23 to drive tractors 90-93, the motor 23 having a forms feed emitter assembly 24. The forms feed assembly 20 has a separate end of forms and jam detector emitter 25. Assembly 20 also includes a platen 29 located behind the forms 15 and against which the print wires 33 are actuated during printing. See FIG. 9.

The print assembly 30 includes a base casting 75 supporting various mechanisms including print motor 76, shown in phantom in FIG. 8 in order that other elements may be seen more easily, and connected to drive a print head carrier 31 with actuator block assembly 7 in a reciprocal fashion horizontally to effect printing on an inserted form 15. The print assembly 30 also drives the print emitter assembly 70 having emitter glass 71 and optical sensor assembly 72.

The ribbon drive assembly 40 includes a support casting 44, a cover 45, and drive motors 49 and 50.

Forms Feed Assembly

In order to load paper in the printer the forms feed assembly 20 pivots away from the base casting 75 at pivot points 80 (80') and 81 (81'), the latter pivot point being best seen in FIG. 10, to allow access to thread the forms 15 into position. Latches 83 and 84 are raised by the operator so that extremities 83a and 84a disengage eccentric pins 85 and 86 on the forms feed assembly 20. The forms feed assembly 20 then pivots away from the operator as viewed in FIGS. 3 and 8 and to the right as viewed in FIG. 10. This allows access to tractors 90–93 so that the operator may load paper. The forms feed assembly 20 is then reclosed and relatched by latches 83 and 84 for normal machine operation. During the time that the forms feed assembly 20 is pivoted back for service, a switch 94 prevents machine operation. Switch 94 is actuated by a tang 95 on forms feed assembly 20 when it is closed.

Referring to FIG. 8, the forms feed assembly 20 includes means for adjusting for forms thickness. As mentioned, the entire forms feed assembly 20 pivots back from the rest of the printer about pivot points 80 and 81. In the closed position the forms feed assembly 20 is in such a position that a spiral cam and knob assembly 96 engages a pin 97 on the main carrier shaft 98 of the print assembly 30. Pin 97 is movable, for example, to position 97' as illustrated in FIG. 9. Adjustment of the spiral cam and knob assembly 96 is such that it rotates the main carrier shaft 98. Assembly 96 is detented into a position selected by the operator. Associated with shaft 98 are eccentrics such as portion 98a on the left end of shaft 98 with tenon 100 onto which latch 83 is mounted. Rotation of shaft 98 thus moves latches 83 and 84 which changes the distance between assemblies 20 and 30 and thus the distance between the ends of print wires 33 and platen 29. This adjustment enables the printer subsystem 2 to accommodate forms 15 of various thicknesses. The printer can handle forms 15 from one part to six parts thickness.

The paper feeding is accomplished by the four sets of tractors 90–93 two above the print line and two below the print line. The individual tractors 90–93 include drive chains to which pins are attached at the proper distance to engage the holes in the form 15. As an example, tractor 90 has drive chain 101 with pins 102. Chain 101 is driven by a sprocket 103 attached to a shaft 104 which also drives the sprocket and chains for tractor 91. Tractors 92 and 93 are driven from shaft 105. Because the tractors 90–93 are above and below the print line, the printer is able to move the paper in either direction. The normal direction of forms drive is upwardly in FIGS. 3 and 8. However, it is possible to move the paper downwardly, as well.

Rotation of shafts 104 and 105 and forms feeding is accomplished by appropriate drive of motor 23 in the proper direction which in turn drives pulleys 106 and 107 (to which shafts 104 and 105 are connected) from motor pulley 108 by means of drive-timing belt 109. Cover 110 covers belt 109 and pulleys 106–108 during rotation. The forms feed emitter assembly 24 includes an emitter wheel 47 with marks to indicate rotation and a light emitting diode asssembly 48 that serve to indicate extent of rotation of motor 23 in either direction and as a consequence, the extent of movement of the forms 15 as they are driven by motor 23.

The capability of the printer to feed paper in both directions offers some advantages. For example, in order to improve print visibility at the time the Stop pushbutton 52 (on operator panel 26) is depressed by the operator, the paper may be moved up one or two inches above where it normally resides so that it can be easily read and can be easily adjusted for registration. When the Start pushbutton 53 (an operator panel 26) is depressed, the paper is returned to its normal printing position back out of view of the operator. The printer may also be used in those applications where plotting is a requirement. In this case a plot may be generated by calculating one point at a time and moving the paper up and down much like a plotter rather than calculating the entire curve and printing it out from top to bottom in a raster mode.

End of forms and jam detection is accomplished by assembly 25 having a sprocket 112 just above the lower left tractor 92. The teeth in sprocket 112 protrude through a slot 113a in the flop cover 113. Sprocket 112 is not driven by any mechanism but simply is supported by assembly 25. Sprocket 112 engages the feed holes in the paper as it is pulled past by the tractor assemblies. On the other end of the shaft 114 from sprocket 112 is a small optical emitter disc 115. The marks in disc 115 are sensed by an LED phototransistor assembly 116 and supplied to electronics 4 of the subsystem 2. Electronics 4 verifies that marks have passed the phototransistor assembly 116 at some preselected frequency when the paper is being fed. If the mark is not sensed during that time, the machine is shut down as either the end of forms has occurred or a paper jam has occurred.

The castings 88 and 89 supporting the tractors 90–93 are adjustable left or right in a coarse adjustment in order to adjust for the paper size used in a particular application. After they are properly positioned they are locked in place on shaft 67 by locking screws such as locking screws assembly 87.

All tractors 90–93 are driven by the two shafts 104 and 105 from motor 23 as previously described. Motor 23 adjusts in the side casting 21 in slots 120 in order to provide the correct tension for belt 109.

Besides the coarse adjustment, there is also a fine adjustment which is used to finally position in very small increments laterally the location of the printing on forms 15. This is done by a threaded knob 66 which engages shaft 67 to which both tractor castings 88 and 89 clamp. Shaft 67 floats between side castings 21 and 22 laterally. The threads in knob 66 engage threads on the right end of shaft 67. Knob 66 is held in an axially fixed position by a fork 68, the portion 68a engaging notch 66a formed by the flanged portion 66b of knob 66. Therefore knob 66 stays stationary and the threads driving through the shaft 67 force it laterally left or right, depending upon the direction in which knob 66 is rotated. Shaft 67 is always biased in one direction to take out play by a spring 69 on the left end of shaft 67. As the forms 15 leave the top of the tractors 90, 91, they are guided up and toward the back of the machine and down by the wire guide 28.

In order to insure that the distance between the pins 102 in the upper tractors 90, 91 is in correct relationship to the pins 102 in the lower tractors 92, 93 an adjustment is performed. This adjustment is made by inserting a gauge or piece of paper, not shown, in the tractor assembly which locates the bottom pins 102 in the correct relationship to the top pins 102. This is done by loosening a clamp 121 on the end of shaft 104. Once this position is obtained, then clamp 121 is tightened and in effect phases the top set of tractors 90, 91 to the bottom set 92, 93 so that holes in the forms 15 will engage both sets of tractors 90, 91 and 92, 93 correctly. Forms 15 may be moved through the tractor forms feed assembly 20 manually by rotating knob 122. Knob 122 simply engages the top drive shaft 104 of the upper tractor set and through the timing belt 109 (also shown in FIG. 13) provides rotational action to the lower tractor set, as well.

Print Assembly

In FIG. 8, print assembly 30 comprising a carrier 31, actuator block assembly 7 and support 78 accommodates all the print heads 34 with their wire actuators 35 and print wires 33. Also, see FIGS. 13 and 14–26. Actuator block assembly 7 is designed to hold from two up to eight or nine print head groups of eight actuators 35 each. Thus, a printer with eight print head groups, as shown in FIGS. 8 and 13, has sixty-four print wire actuators 35 and sixty-four associated print wires 33. Print wires 33 project through apertures 148, FIG. 13. Only two actuators 35 are shown positioned in place in FIG. 8. The other sixty-two actuators 35 would be located in apertures 133 only a few of which are depicted. To insure long life of the print wires 33, lubricating assemblies 134 containing oil wick assemblies 142 (See FIG. 14) are positioned in proximity to the print wires 33. The print wire actuators 35 fire the wires 33 to print dots to form characters. Carrier 31 is engaged with and is shuttled back and forth by a lead screw 36 driven by motor 76. Lead screw 36 drives carrier 31 back and forth through nuts, not shown, which are attached to the carrier 31. When carrier 31 is located at the extreme left, as viewed in FIGS. 3 and 8 (to the right as viewed in FIG. 13), this is called the "home or ramp position". When carrier 31 is moved to the home position, a cam 37 attached to the carrier 31 engages a pin 38, the pin 38 being attached to the main carrier shaft 98. If the machine has not been printing for some period of time, in the neighborhood of a few seconds, the printer control unit 3 signals the carrier 31 to move all the way to the left, in which case cam 37 engages pin 38 to rotate the main carrier shaft 98 approximately 15 degrees. The maximum rotation of shaft 98 is about 50° shown for pin 97 as 36° + 14° = 50° and for pin 38 as 32° + 18° = 50°. On each end of the shaft 98 are the eccentrically located tenons, such as tenon 100, previously described. Tenons, such as tenon 100, engage the latches 83 and 84 so that the distance between the print assembly 30 and the forms feed assembly 20 is controlled by the latches 83 and 84. As shaft 98 rotates, the eccentrically located tenons, such as tenon 100 associated with latches 83 and 84 separate the forms feed assembly 20 from the print assembly 30.

The purpose of motor 76, of course, is to move the carrier 31 back and forth in order to put the print actuators 35 and print wires 33 in the proper positions to print dots and form characters. Since the motion is back and forth, it requires a lot of energy to get the mass of carrier 31 and actuators 35 stopped and turned around at the end of each print line. A brushless DC motor is used. The commutation to the windings in the motor 76 is done external to the motor 76 through signals sent out of the motor 76 via a Hall effect device emitter 39. In other words, the emitter 39 within the motor 76 sends a signal out telling the printer control unit 3 that it is now time to change from one motor winding to the next. Therefore, there are no rubbing parts or sliding parts within the motor 76, and switching is done externally via electronics 4 based on the signals that the motor 76 sends out from its emitter 39. The motor 76 draws about 20 amperes during turnaround time and, because of the high current it draws and because of the torque constant required from the motor 76, it is built with rare earth magnets of Semarium cobalt which provide double the flux density of other types of magnets.

Semarium cobalt is not just used because of the higher flux density but also because its demagnetization occurrence is much higher and, therefore, more current can be sent through the motor 76 without demagnetizing the internal magnets. During printing, carrier 31 that holds the print actuators 35 goes at a velocity of approximately 25 inches per second. The turnaround cycle at the end of the print line requires 28 milliseconds approximately, resulting in a Gravity or "G" load in the neighborhood of 4 G's. The carrier 31, with all the actuators 35 mounted, weighs about eight and a half pounds.

The current necessary to fire the print actuators 35 is carried to the actuators 35 via the cable assemblies 73, FIGS. 7 and 13, one for each group of eight actuators 35. The cabling, such as cable 73a, FIG. 8, is set in the machine in a semicircular loop so that as carrier 31 reciprocates it allows the cable 73a to roll about a radius and therefore not put excessive stress on the cable wires. This loop in the cable 73a is formed and held in shape by a steel backing strap 74. In this case there is one cable assembly such as cable 73a, for each group of eight actuators 35 or a maximum of eight cable backing strap groups.

Ribbon Drive Assembly

The ribbon drive assembly 40 for the printer is shown in FIG. 8, but reference is also made to FIGS. 3, 9, and 13. Spools 42 and 43 are shown with spool flanges but may be structured without spool flanges and contain the ribbon 41. Spools 42 and 43 can be seen on either side of the machine near the front, FIG. 3 and are repectively driven by stepper motors 49 and 50. Spools 42 and 43 typically contain 150 yards of standard nylong ribbon 41 that is one and a half inches wide. Gear flanges 118 and 119, FIG. 8, support ribbon spools 42 and 43, respectively. Drive for spool 43, as an example, is from motor 50, pinion gear 132 to a matching gear 123 formed on the underneath side of gear flange 119 then to spool 43. In one direction of feed, the ribbon path is from the left-hand spool 42 past posts 125 and 126, FIGS. 3, 8 and 13, across the front of the ribbon drive assembly 40 between the print heads 34 and forms 15, then past posts 127 and 128 back to the right-hand ribbon spool 43. A ribbon shield 46 to be described in conjunction with FIGS. 11–13 is generally located between posts 126 and 127 and is mounted on the two attachment spring members 130 and 131.

Ribbon Shield

FIG. 11 illustrates ribbon shield 46 that is particularly useful in the printer described herein. FIG. 12 is a cross-sectional view along the line 12—12 in FIG. 11. Shield 46 has an elongated aperture 46a extending almost its entire length. The aperture 46a enables the print wires 33 to press against the ribbon 41 in the printer through the shield 46 in order to print on forms 15. Shield 46 has slits 46b and 46c at opposite extremities to permit easy mounting in the printer on spring members 130 and 131 of the ribbon drive assembly 40, FIG. 13.

Assembly View

FIG. 13 is an assembly view of the printer including forms feed assembly 20, print assembly 30, and ribbon drive assembly 40. Ribbon drive assembly 40 includes the two ribbon spools 42 and 43 which alternatively serve as supply and takeup spools. As mentioned, spools 42 and 43 typically contain 150 yards of standard nylon ribbon 41 that is one and one-half inches wide. If spool 42 is serving as the supply spool, ribbon 41 will be supplied past posts 125 and 126, through the ribbon shield 46 past posts 127 and 128 and thence to the takeup spool 43. Shield 46, FIGS. 11 and 13, and ribbon 41, FIG. 13, are illustrated slightly on the bias relative to horizontal which is their more normal relationship in the printer. The ribbon drive assembly 40 is also positioned on a slight bias relative to horizontal to accommodate the bias of shield 46 and ribbon 41. In this condition aperture 46a assumes a horizontal relationship with respect to the print wires 33 and forms 15. Thus, in FIG. 13, the rightmost end of shield 46 is somewhat elevated in relation to the leftmost end in order that aperture 46a is maintained in a relatively horizontal position with respect to the print actuators 35 in print assembly 30. A few of the groups of print wires 33 are indicated at a breakaway section of shield 46. As previously noted, the print wires 33 are reciprocated back and forth laterally in relation to a forms 15, not shown in FIG. 13, in order to effect the printing of characters. The reciprocation is by means of drive mechanisms activated from motor 76. The activating signals for the actuators 35 in print assembly 30 are supplied through cabling indicated at 73.

Actuator Block, Guide and Actuators

Figure 14:
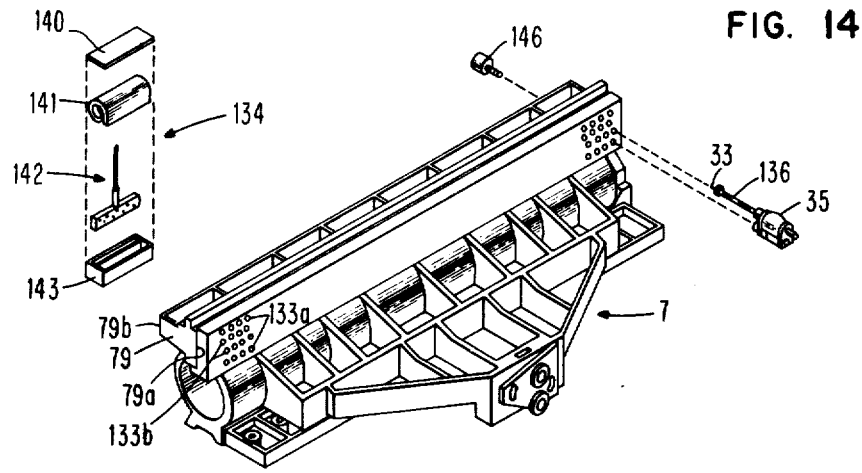
FIG. 14 illustrates a print wire block assembly and associated guide.

Enlarged views of the actuator block assembly 7, guide 79, print wire actuators 35, lubricating assemblies 134, and various related mechanisms are shown in FIGS. 14–23. Referring to FIG. 14, this better illustrates the arrangement of apertures 133 in actuator block assembly 7 which can accommodate eight print heads 134 with eight print wire actuators 35. Apertures 133a are used to mount actuators 35 while apertures 133b allow passage of barrels 136 of actuators 35 through actuator block assembly 7 and guide 79 up to the print line. A typical lubricating assembly 134 comprises a cover 140, felt element 141, wick assembly 142, and housing 143 that contains lubricating oil.

Figure 15:
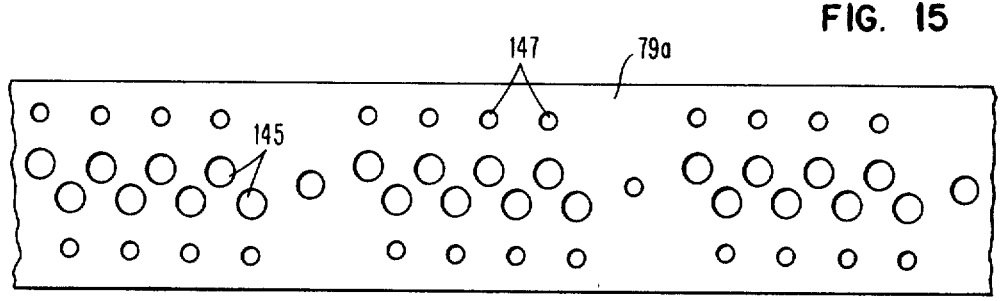
FIGS. 15 and 16 illustrate front and rear faces of the guide shown in FIG. 14.
Figure 16:
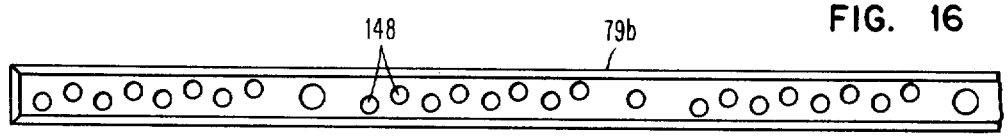

FIG. 15 illustrates a portion of face 79a of guide 79 while FIG. 16 illustrates a portion of face 79b of guide 79. Barrels 136 of actuators 35 pass through apertures 145 on face 79a of guide 79 and are retained by bolts such as bolt 146 passing through apertures 147 from the opposite side of guide 79. Individual actuator barrels 136 and print wires 33 project through apertures 148, FIGS. 13 and 16.

Figure 17:
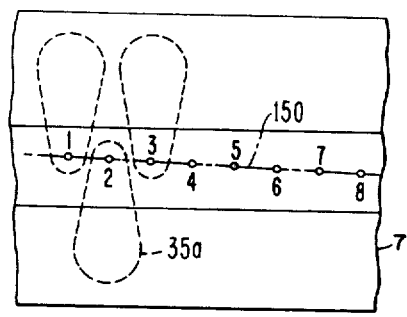
FIGS. 17–19 illustrate an alternative mounting of print wire actuators with an angled face on the block assembly.
Figure 18:
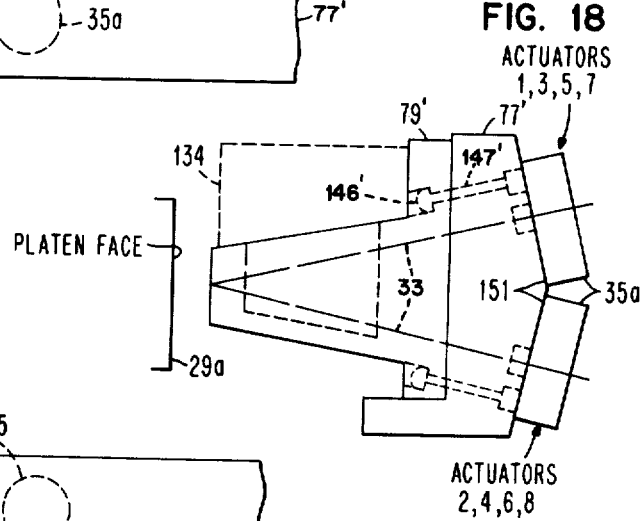
Figure 19:
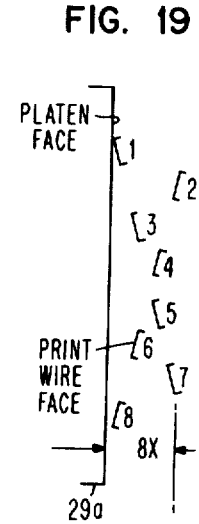
Figure 20:
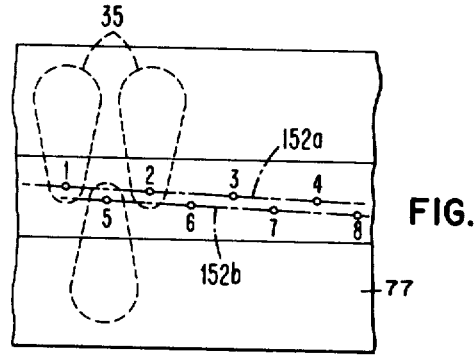
FIGS. 20-22 illustrate mounting of print wire actuators with a flat face on the actuator block assembly.
Figure 21:
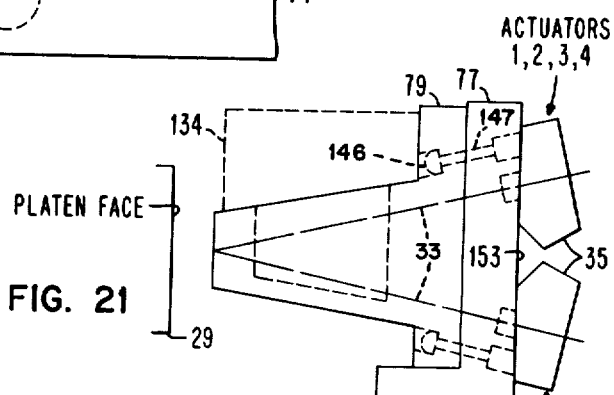
Figure 22:
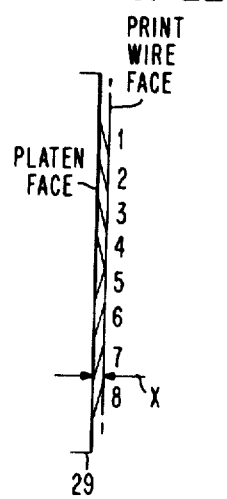

FIGS. 17–22 illustrate several arrangements which permit mounting of a greater multiplicity of actuators 35 (35a) in a given amount of space through actuator block 77 and (77') and guide 79 (79'). FIGS. 17–19 illustrate one possible mounting arrangement for the actuators 35a while FIGS. 20–22 illustrate the actual mounting arrangement previously described in conjunction with FIGS. 8, 13, and 14–16.

In FIGS. 17–19 which represent an alternative mounting arrangement. In this case, actuators 35a, actuator block 77' and guide 79' are retained by bolts such as bolt 146' passing through aperture 147'. Print actuators 35a and print wires 33 for one print head set of eight (1–8) are arranged on a straight slope 150. Slope 150, combined with actuator block 77' having a double angle configuration at 151, FIG. 18, results in a staggered print wire face-to-platen condition, FIG. 19. This print wire face-to-platen distance, shown as 8X, is critical to both the stroke and flight time of the print wires 33.

The preferred arrangement, FIGS. 20–22, has a number of attributes, including improved functioning, increased coil clearance, and ease of manufacture. In this method, print wires 33 arranged in a set 1–8 are mounted in two offset sloped subsets 152a and 152b forming a sloped serrated pattern. (See also FIGS. 15 and 16.) Subset 152a includes print wires 1–4 of the set while subset 152b includes print wires 5–8. This, combined with a straight surface 153 on actuator block 77 and angled actuators 35, FIG. 21, represent an in-line print wire face-to-platen condition as in FIG. 22. The print wire face-to-platen distance, shown as X, is at a minimum. This permits a higher printing rate and prevents wire breakage. The offset sloped print wire sets gives a greater clearance between wire positions which allows a larger actuator coil to be used.

Figure 24:
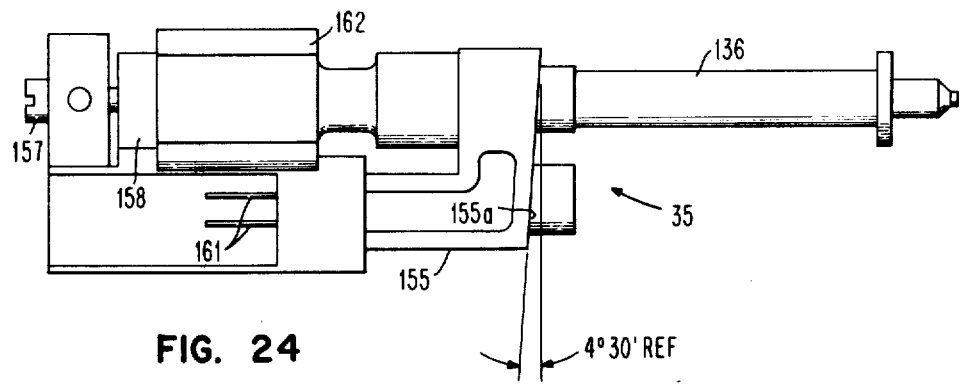

Use of a straight surface 153 instead of the double angle configuration 151 facilitates manufacturing of the actuator block 77 and thereby reduces cost. However, brackets 155 are still cut at an angle such as shown in FIG. 24. The angular relationships of the print actuators 35a with respect to the platen face in FIG. 18 and print actuators 35 with respect to the platen face in FIG. 21 are somewhat larger than would be encountered in an actual implementation but they are shown this way to make the relationships easier to see. In contrast, an actual angular relationship might be smaller such as the 4° 30' angle front face 155a on bracket 155 of actuator 35 in FIG. 24.

FIGS. 23–26 illustrate a preferred form of actuator 35. Actuator 35 operates on principles described and claimed in U.S. patent application Ser. No. 043,183, filed May 19, 1979, having R. W. Kulterman and J. E. Lisinski as inventors and entitled "Springless Print Head Actuator". This application is assigned to the same assignee as the present application. In the Kulterman actuator, a print wire is provided having an armature which is retained in home position by a permanent magnet. When printing of a dot is required, an electromagnet is energized which overcomes the magnetic forces of the permanent magnet and propels the print wire toward the paper.

Figure 23:
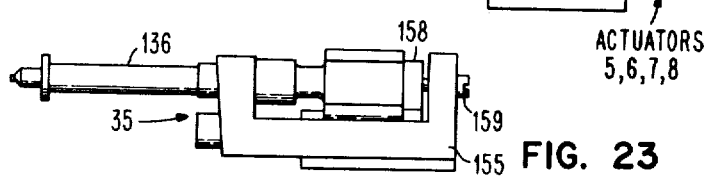
FIGS. 23-26 illustrate a print wire actuator, a plurality of which are mounted in the block assembly shown in FIG. 14.
Figure 26:
Figure 25:
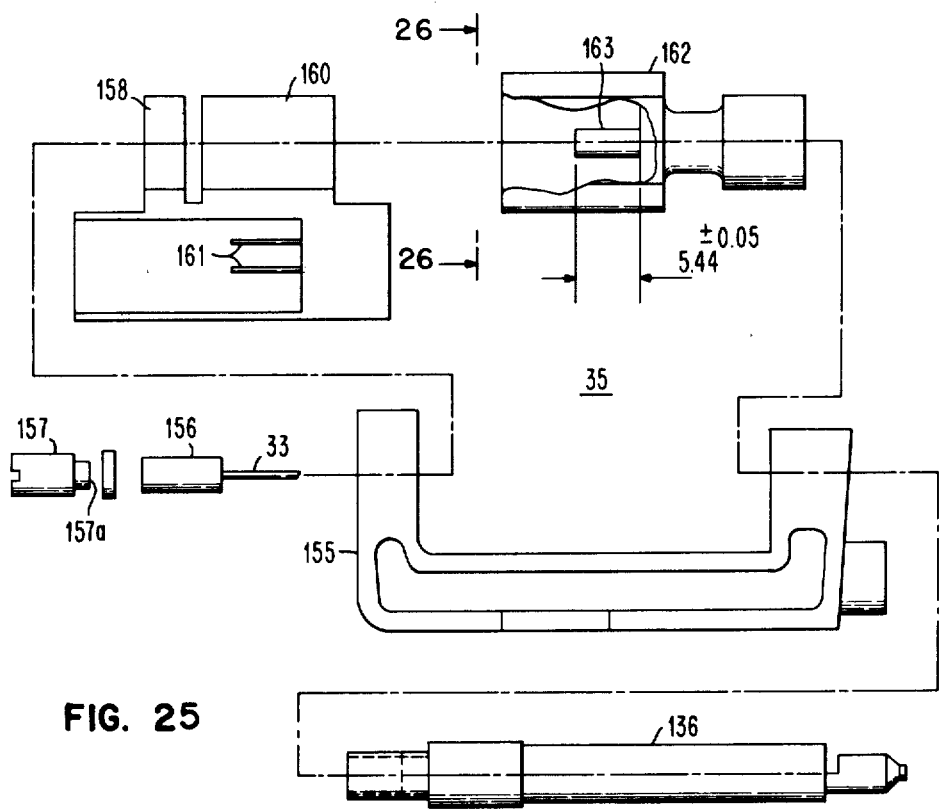
Figure 29:
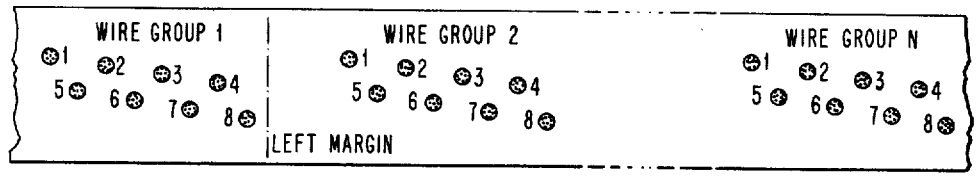
FIG. 29 illustrates the arrangement of print wires in groups relative to a left margin in the printer unit.

FIG. 23 illustrates one side elevation of the actuator 35, while FIG. 24 illustrates the opposite side elevation. The actuator 35 comprises a number of elements arranged in a generally concentric manner on bracket 155. It is noted that FIG. 24 is somewhat enlarged relative to FIG. 23. Reference is also made to FIGS. 25 and 26 for details of the individual components of the actuator 35.

Also, it is noted that some slight structural differences appear between the actuator 35 shown in FIGS. 23-26 and those illustrated in FIGS. 17-22, the actuators 35, 35a in FIGS. 17-22 being more diagrammatically illustrated. The actuator 35 includes a barrel 136 for supporting print wire 33 in proper relationship for printing when mounted in actuator block 77 and guide 79. Attached to the leftmost end of print wire 33 as viewed in FIG. 25 is an armature 156 which is arranged against a stop portion 157a of an adjustment screw 157 by forces exerted from a permanent magnet 158. A lock nut 159, FIG. 23, retains adjustment screw 157 in proper position. Thus, when not active, armature 156 and print wire 33 abut against stop portion 157a. When it is desired to actuate print wire 33, electromagnet 160 is rapidly impulsed from an external source by way of connectors 161. Energization of electromagnet 160 overcomes the magnetic flux forces of permanent magnet 158 moving armature 156 and print wire 33 to the right as viewed in FIG. 25 thus causing the rightmost end of print wire 33 which is in proximity to the forms 15, to print a dot on the forms 15. A bobbin housing 162 is made of metallic substances to provide a shielding effect with respect to the core of electromagnet 160. It is found that this has been beneficial when numerous print wire actuators 35 are mounted in position on actuator block 77 and guide 79 since it prevents stray impulses from reacting from one actuator 35 to another nearly actuator 35. This has proven to be extremely advantageous when multiple print actuators 35 are provided as in the present printer. A core element 163 provides a forward stop location for armature 156 in readiness for restoration by permanent magnet 158 against stop portion 157a as soon as current is removed from electromagnet 160.

FIG. 26 is an end elevation of housing 162 along the line 26—26 in FIG. 25.

Alternative Forms Feed Assembly

FIGS. 27 and 28 illustrate an alternative single direction forms feed assembly 170 which feeds forms such as forms 15 only in the upward direction as viewed in these figures. In contrast with the forms feed assembly 20 previously described in conjunction with FIG. 8, this forms feed assembly 170 has only a single upper set of tractors 171 and 172. A driving motor 173 provides driving force through gears 175 and 176 by way of timing belt 178. The various elements comprising the forms feed assembly 170 are supported in a left end plate 180 and a right end plate 181. FIG. 28 is a left end elevation of the forms feed assembly 170 illustrating the positional relationships of motor 173, timing belt 178 and other elements. A cover plate 182 covers timing belt 178 during operations. Driving of the pin feeds on the two tractors 171 and 172 is analogous to the driving of the pin feeds for forms feed assembly 20 illustrated in FIG. 8 and previously described. In forms feed assembly 170, the tractor drive includes a drive shaft 183.

Lateral support for the forms feed assembly 170 is provided by an upper support 185 and a lower support 186. The assembly 170 also includes a platen member 29a. Other elements such as knobs 122a, 66a, and 96a are analogous to their counterpart elements 122, 66, and 96 shown in FIG. 8. The forms feed assembly 170 mounts to the printer base casting 75 in FIG. 8 at pivot points 80a and 81a.

In place of the two lower tractors 92 and 93 in FIG. 8, this forms feed assembly 170 includes a pressure drag assembly 188 with compliant fingers 189. These fingers 189 exert physical pressure against the paper when in position against platen 29a and in the immediate vicinity of the printing station which comprises platen 29a.

At the same time that forms feed assembly 170 is opened for insertion of new forms 15, the drag assembly 188 is also opened, but while the forms feed assembly 170 moves toward the rear of the printer, the drag assembly 188 moves toward the front. Spring element 187 enables drag assembly 188 to adjust to allow the forms 15 to slide through when loading the forms 15. One additional cam element 190 cooperates with a follower 191 to provide adjustment of the pressure exerted by the drag assembly 188 on the paper for the purpose of accommodating various thicknesses of forms 15.

The assembly 170 includes an End of Forms sprocket assembly 192 that could also serve to detect paper jams and that works in an analogous fashion to assembly 25 with sprocket 112 shown in FIG. 8.

Figure 30:
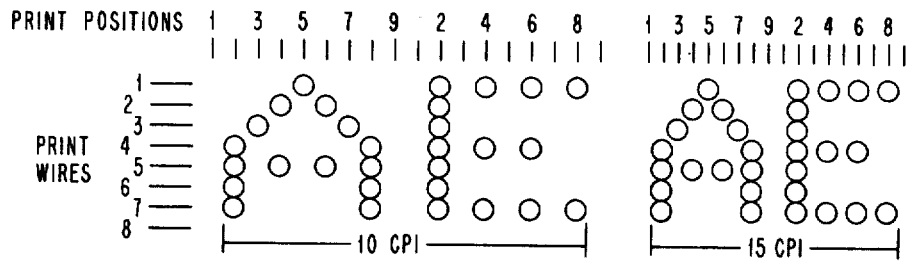
FIG. 30 illustrates printing of characters at 10 characters per inch and 15 characters per inch.

Printing of Characters, Relationships of Print Wires, Character Locations and Emitters Characters that are printed are formed by printing dots on the paper. These dots are printed by wires 33 that are mounted in groups of eight on a carrier 31 that moves back and forth adjacent to the print line. Printing is bidirectional with complete lines of print formed right-to-left and left-to-right. See FIGS. 29, 30, 33A and 33B. A character is formed in a space that is eight dots high by nine dots wide. As shown in FIG. 30, two of the nine horizontal dot columns (1 and 9) are for spacing between characters. Any one wire 33 can print a dot in four of the seven remaining horizontal dot positions (2 through 8). The printer can print 10 characters per inch or 15 characters per inch.

Most of the characters printed use the top seven wires 33 in the group to print a character in a format (or matrix) that is seven dots high and seven dots wide. The eighth (bottom) wire 33 is used for certain lower case characters, special characters, and underlining.

The number of print wire groups varies according to the printer model, and typically can be 2, 4, 6 or 8 groups. Printing speed increases with each additional wire group.

There are 16 character sets stored in the printer control unit 3. Any of these sets may be specified for use by the using system program.

Figure 31:
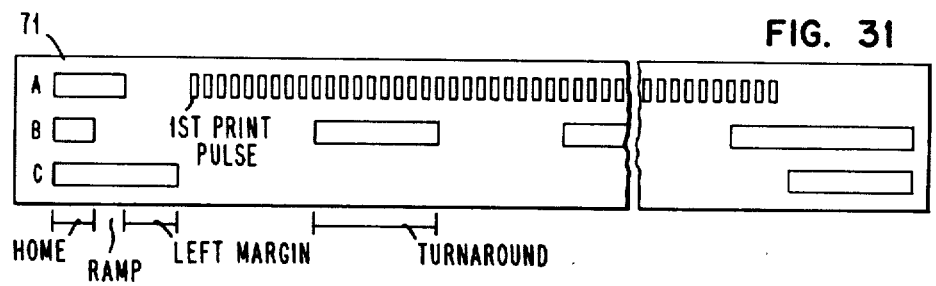
FIGS. 31 and 32 illustrate the print emitter and its operating scheme.

FIG. 31 is a representation of the emitter glass 71 also shown in FIGS. 7 and 8 and associated with the print assembly 30. It has sections called "Ramp", "Home", and "Left Margin". These are coded sections, designated Track A, Track B, and Track C. Track B is sometimes referred to as the "Turnaround" track. "Home" is indicated by all three tracks A,B,C, being clear. "Ramp" is when Track A and Track C are clear, but Track B is opaque. "Left Margin" is when only Track C is clear, and Tracks A and B are opaque. Left Margin can be told from Right Margin because Track B is clear on Right Margin whereas Track B is opaque on Left Margin. For convenience, glass 71 is shown in a more normal representation with the left margin areas to the left and the right margin areas to the right. In actuality, the emitter glass 71 is physically located in the machine with the right-hand part in FIG. 31 toward the left and the left-hand part in FIG. 31 toward the right as viewed in FIGS. 7 and 8. This is due to the fact that the associated optical sensor assembly 72 is physically located at the rightmost area of the emitter glass 71 when the print assembly 30 is in home position, and glass 71 actually is moved past the optical sensor assembly 72 from left to right as the print assembly 30 moves from left to right away from home position.

Figure 32:
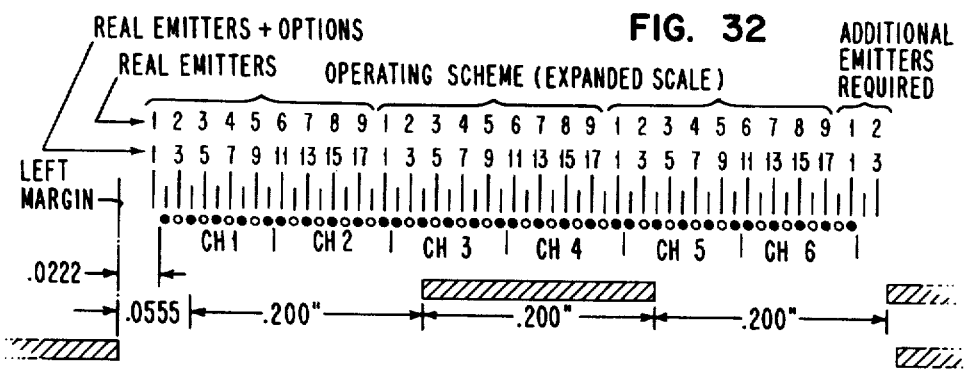

FIG. 32 illustrates the development of emitter pulses from the emitter glass 71 shown in FIG. 31, the signals being termed "real emitters" when actually sensed from Track A. "Option" emitters (sometimes referred to as "false" emitters) are developed electronically in the printer control unit 3. The use of emitter assembly 70 in keeping track of printing location is described. The emitter assembly 70 tells the electronics 4 when the wires 33 are in a proper position to be fired to print the dots in correct locations. It essentially divides the print line into columnar segments, each one of which is available to the electronics 4 to lay down a print dot. Track A, the basic track which controls the printing of dots has spacings of 0.0222 inches. This corresponds to two print columns distance on the emitter assembly 70 in a normal print cycle and for ten characters per inch one optional mark referred to as an "option" is inserted halfway in between each real emitter.

Figure 69:
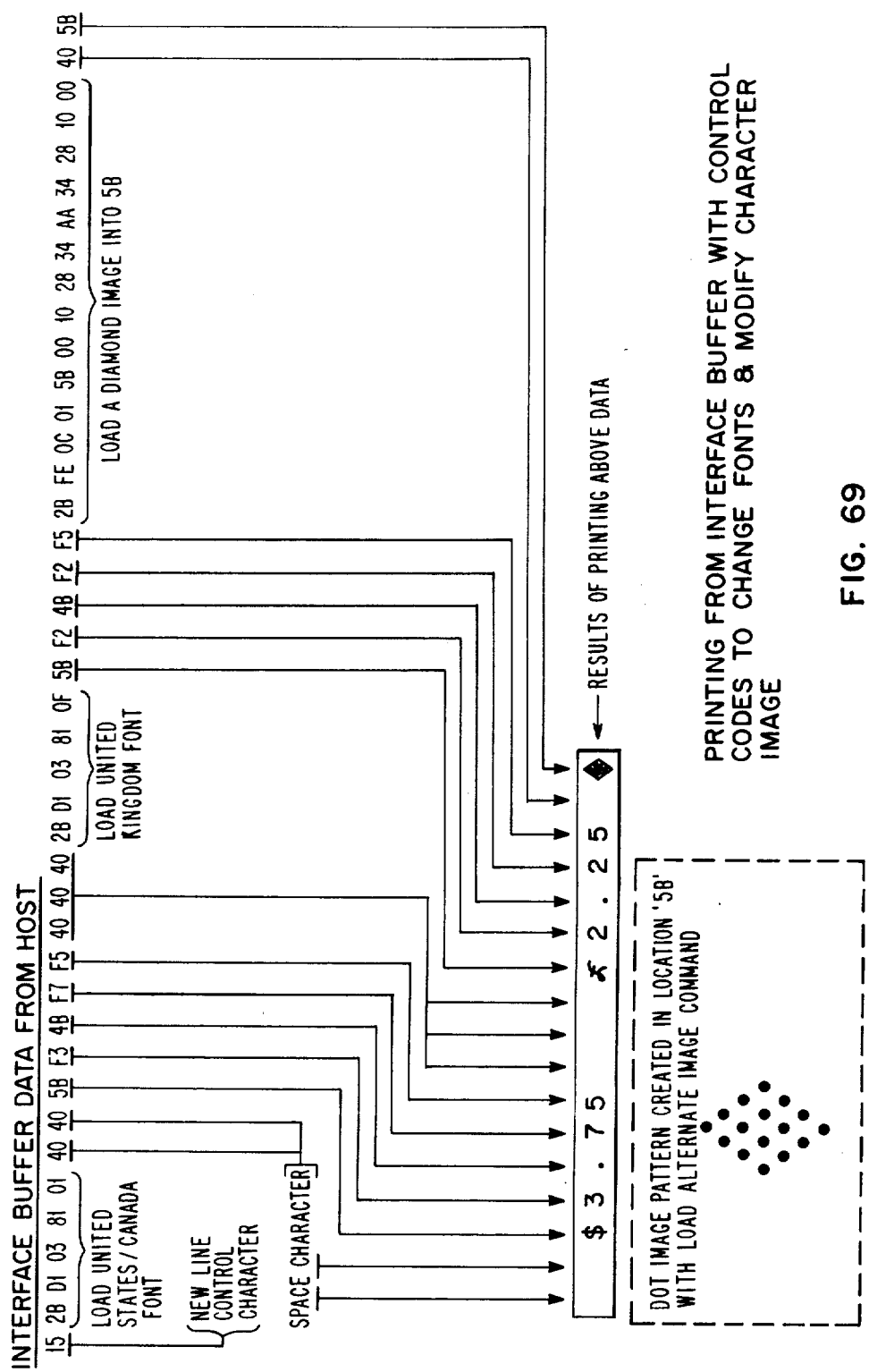
FIG. 69 illustrates the printing of characters in a line of information involving a font image change and selection of a special image.

Each emitter track A, B, C, actuates one pair of light emitting diode-photo transistor (LED-PTX) sensors, not shown, (but fully described in conjunction with FIG. 69 of the William W. Boynton et al patent application Ser. No. 086,484 noted above) within sensor assembly 72. Track A provides print initiation pulses, Track B provides turnaround information, and Track C indicates if the print heads 134 are in either left or right margin.

If the line to be printed is shorter than the maximum print line length, typically 13.2 inches, then a signal for turnaround (reversal of print motor 76 direction) is given as soon as the last character has been printed. The motor 76 now decelerates until it comes to a stop, and then immediately accelerates in the reverse direction until nominal speed is reached.

To keep track of the print head position, the number of emitter pulses of Track A are counted by a counter, not shown. The count derived from Track A keeps increasing regardless of whether the print assembly 30 moves to the right or left. In order to indicate the true position of the print assembly 30, provision is made electronically to convert this count so that the count increases when the print assembly 30 moves in one direction and the count decreases when moving in the opposite direction.

In order to accomplish this, Track B has been added. It is assumed that the print assembly 30 is moving to the right. After the last character has been printed and the signal for turnaround has been given, the print assembly 30 will continue to move to the right and the count will increase. However, as soon as the next transition has been reached on Track B, the count is frozen. The print assembly 30 now comes to a stop and reverses. When it again passes the transition where the count was frozen, the emitter counts will now be subtracted and a true position indication is maintained by the counter, now shown, for Track A.

The length of the Track B segments are chosen to be longer than the distance it takes the print assembly 30 to come to a stop. The higher the print head speed and the longer the turnaround time, the longer must be the Track B segments. Thus, if the line is shorter than 132 characters at ten characters per inch, the carrier 31 need not travel all the way to the right end of the print line. It may turn around soon after the printing is completed.

Figure 33A:
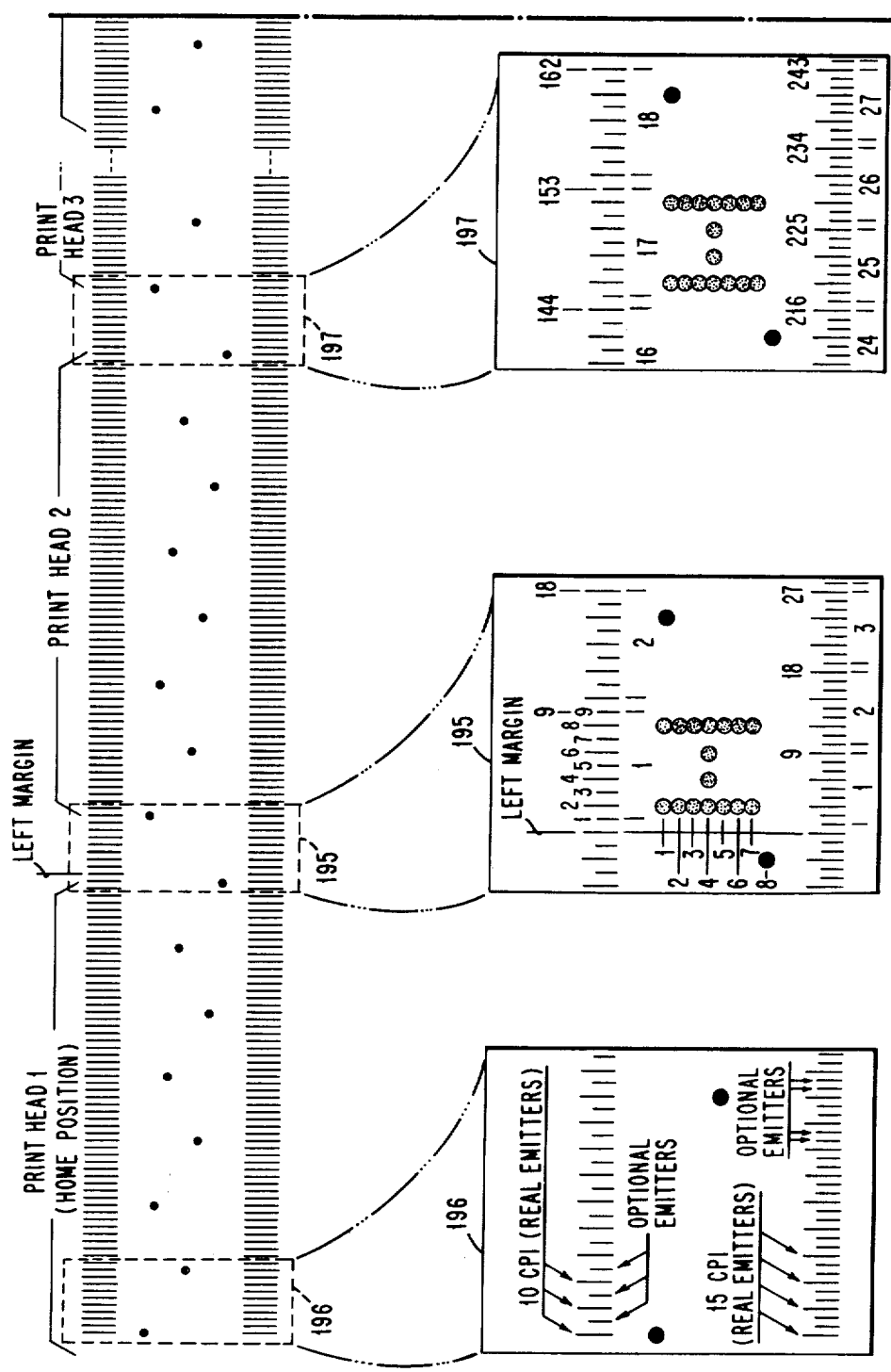

FIGS. 33A and 33B, when arranged as shown in FIG. 34, comprise a diagram showing the physical relationship of the print heads 134 when in the home position relative to character locations on a form 15 to be printed. In addition, the emitter relationships are shown.

In FIG. 33A, print head 1, comprising eight print wires 33, is normally to the left of the nominal left margin when in home position. Print head 2 lies to the right of the left margin when the print assembly 30 is in home position and the other print heads 2-8 up to eight, as an example, are physically located at successively further positions to the right in relation to the form 15. The print wires 33 are arranged in a sloped serrated pattern and are displaced two character positions apart horizontally and one dot location apart vertically. In order to print the character "H" as shown in inset 195, it is necessary that all of the print wires 33 in print head 1 sweep past the "H" character location to effect printing of the individual dots. As each wire 33 passes by and reaches the appropriate position for printing of its assigned dot locations in a vertical direction, it is fired. Thus, formation of characters takes place in a flowing or undulating fashion insofar as the printing of the dots is concerned. That is, an entire vertical column of dots as in the left-hand portion of the character "H" is not formed all at once but is formed in succession as the eight wires 33 in print head 1 sweep past that column. This is true of the printing of all other character columns, as well. As a result of this, each print head 1-8 is required to pass at least far enough so that all of the wires 33 in that print head 34 will be able to print both the first vertical column of dots in the first character required as well as the last column of dots in the last character to be printed in the group of character locations assigned to that print head 1-8.

Accordingly, print head 1, during printing movement of carrier 31, prints all of the characters that normally would appear underneath print head 2 when the print heads 1-8 are in their home position. The printing of dots associated with print head 2 takes place under the home position for print head 3 and so on.

Inset 196 illustrates the relationship of real and optional emitters, sometimes referred to as "false" emitters, for both ten characters per inch (CPI) and fifteen characters per inch (CPI). During the printing of characters at ten characters per inch, real emitters are found as indicated. These are physical real emitters derived from the emitter glass 71 as the print assembly 30 sweeps from left to right or right to left during printing. The same real emitters are used for printing at fifteen characters per inch. However, when printing is at ten characters per inch, one additional (optional) emitter is necessary between each successive pair of real emitters to form the individual characters while, if characters are printed at fifteen characters per inch, two additional (optional) emitters are required between each successive pair of real emitters to handle the printing of dots for those characters.

Inset 197, FIG. 33A, illustrates the character locations associated with the rightmost print wire 33 of print head 2 and the leftmost print wire 33 of print head 3. Print heads 4-7 are not shown since the relations essentially repeat those shown with respect to print heads 1-3. The rightmost wires 33 of print head 8 are shown in Inset 198, FIG. 33B. In addition, Inset 199 shows that for ten characters per inch, 132 characters can be accommodated in a full print line while for fifteen characters per inch, 198 characters are accommodated.

Figure 35:
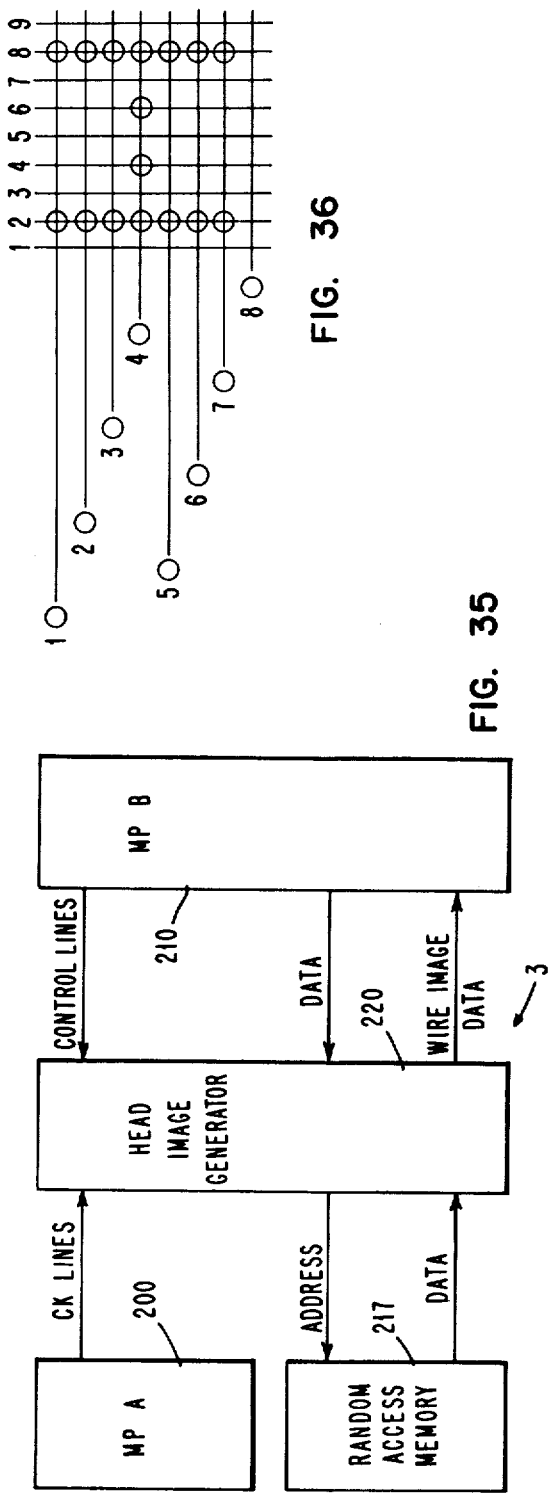
FIG. 35 is a generalized block diagram of the printer control unit shown in FIG. 1.

FIG. 35 is a highly diagrammatic block diagram of the general relationship of various system and control unit components including the two microprocessors 200 and 210 (Also designated MPA and MPB), the Head Image Generator 220 and the random access memory 217 and indicates how the information is transferred that is generated by the Head Image Generator 220 to print dots on the paper by actuation of the actuators 35.

The microprocessors 200 and 210 may be of the type described in U.S. patent application Ser. No. 918,223 filed June 23, 1978, now U.S. Pat. No. 4,179,738 which issued Dec. 18, 1979 having P. T. Fairchild and J. C. Leininger as inventors and entitled "Programmable Control Latch Mechanism for a Data Processing System".

Figure 37:
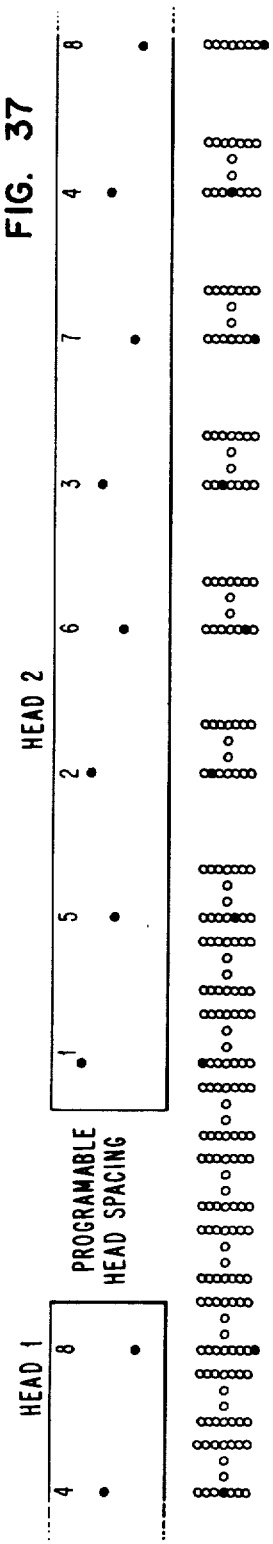

Microprocessor 200 handles communications; microprocessor 210 handles the control of the subsystems. Microprocessor 200 by way of Head Image Generator 220 sets up in memory 217 the count and the text buffer that is to be printed at a selected addressable location. The information is then passed over to microprocessor 210 or the buffer that is to be used. The count is passed to the Head Image Generator 220 and also the address in memory 217 which is the text buffer to be printed. Head Image Generator (HIG) 220, knowing the buffer to be printed, accesses memory 217 and defines the dots for the characters to be printed at each of the successive columns assigned to each print head 34 as print carrier 31 moves during printing. HIG 220 passes the data to the Control microprocessor 210 giving it all the dots to be printed at that particular time. This is represented in FIG. 37 which includes a portion of head 1 and all of head 2. FIG. 37 illustrates printing at ten characters per inch. A string of "H's" is assumed to require printing. The darkened dots of the "H's" represent the wires 33 above them that will actually print that dot. For example, in print head 1, wire 4 prints the fourth dot down in the first column of the leftmost "H". This is the second slice of firing for that particular character with another three actuations being required for wire 4 to complete the horizontal bar portion of the "H". The other seven wires 33 in print head 1 fire at appropriate times to complete their assigned horizontal rows in that character. At head 2, wire 1 is over an "H"; there is no wire 33 over the next "H"; and wire 5 is over the third "H". If printing was at fifteen characters per inch, there would be no wires 33 over two characters between wires 1 and 5 of head 2, rather than just one character as illustrated.

Figure 36:
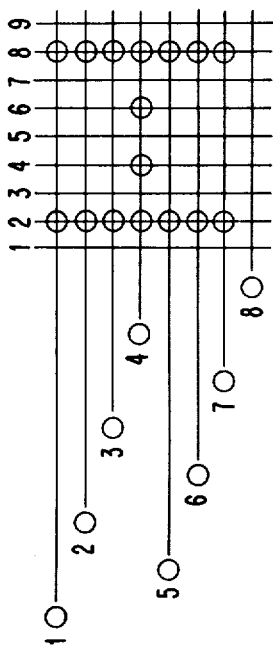
FIGS. 36 and 37 further illustrate the arrangement of dots to form characters and the relationship of the print wires to the various character locations.

The wire layout of "1 5 2 6 3 7 4 8" in FIG. 37 relates to the layout in FIG. 36 where it is shown how an "H" is laid out in relation to the actual wire slices.

Printer Attachment

The printer subsystems may be connected by an interface cable to a controlling device (controller). The printer can be connected to the controlling device itself, or to another printer (or work station unit) with additional cabling.

Controlling Device

The controlling device to which the printer subsystem 2 is attached may be a host computer system 1, FIG. 38, or a controller 8 at a remote work station, FIG. 39. In either case, all information transfers (exchanges) between the controlling device and the printer control unit 3 are started from the controlling device by a command. Information transfers ordinarily are not initiated by the printer subsystem 2.

In some applications, the printer subsystem 2 may be directly connected to a host computer system, as in FIG. 38. In such applications, all commands (operational and formatting) are supplied by the computer, along with the data to be printed. Responses from the printer are sent directly to the computer 1 from the printer control unit 3.

In other applications, FIG. 39, the printer subsystem 2 may be connected to work station controller 8, which in turn is remotely connected to a host computer system 1 by a communications network—such as Systems Network Architecture/Synchronous Data Link Control (SNA/SDLC). In such applications, information (data) to be printed and printer formatting commands are transferred from the computer system 1 to the work station controller 8. The work station controller 8 then generates the operational commands and transfers all this information to the printer subsystem 2. Responses from the printer subsystem 2 are sent to the work station controller 8 then to the computer system 1 by the communications network.

Cable Through Connector

The Cable Through Connector feature, FIG. 40, connects multiple printers subsystems 2, 2a or other work station units on the same interface cable line to the host system 1 or controller (not shown in FIG. 40).

Units with this feature have address-setting switches and an additional cable connector. The customer assigns a unique address to each unit on the cable connector line and sets the address switches at installation times. The feature is not needed on the last unit on the line. The number of units that can be connected to the same line depends on the capability of the controlling device.

With this feature, the maximum cable length restriction is from the controlling device to the last unit on the line.

Audible Alarm

An audible alarm can be provided to produce a tone that alerts the operator to conditions that require operator attention.

Interface Cable

The interface cable may be either coaxial or twinaxial. Representative maximum cable lengths from the controller to the last device on the interface are:

Coaxial cable—610 m (2000 ft.)

Twinaxial cable—1525 m (5000 ft.)

The type of cable selected depends on the requirements of the controlling device to which the printer subsystem is attached.

Information Transfer

Data Stream

All information transferred between the controlling device, such as host system 1, FIG. 41, and the printer subsystem 2 is in the form of a serial "stream" of information bits, FIG. 41. Contained in this stream are:

Bit synchronization patterns

Frame synchronization patterns

Data frames

The bit and frame synchronization (sync) patterns establish timing control between the controlling device and the printer. The data frame is the unit of information used to transfer all commands, data to be printed, and status information.

The data stream can flow in either direction on the interface cable—but only in one direction at a time (half-duplex). The controlling device always initiates the data stream flow for either direction. Only one device on the interface can be communicating with the controlling device at a time.

The data stream flows on the interface for each transfer of single or multiple frames of information. The cable carries no signal between information transfers.

In a typical information transfer from controller to printer, the information stream may be a mixture of operational commands, formatting commands, and data to be printed. Blocks of up to 256 frames may be included in the information stream for a given transfer.

The information stream for any information transfer always begins with the bit-sync and frame-sync patterns, and ends with an end-of-message code in the last frame of the sequence. The end-of-message code causes turnaround on the cable, allowing status information to be transferred in the opposite direction on the cable on the next sequence.

Information Frame

The basic unit of information transfer is a 16-bit information frame. The information frame is used for transferring all commands, data, and status information between the controlling device and the printer subsystem 2. A Receive mode from controller 8 to printer subsystem 2 is illustrated in FIG. 42 and a Transmit mode from printer subsystem 2 to controller 8 is illustrated in FIG. 43.

The 16 bits of the information frame are assigned the following significance: Bits 0 through 2, the fill bits, always 000, are for timing control. Bit 3, the parity bit, is set to maintain an even bit count (even parity) in each frame.

Bits 4, 5, and 6 are the address bits for selecting a specific printer (or other work station unit) attached to the interface. Up to seven units can be addressed by combinations of these bits (000 through 110 are valid addresses). A bit combination of 111 indicates an end-of-message and causes line turnaround.

Bits 7 through 14 are for commands, data or status information. Bit 15, always on, is a synchronization bit.

Printer Addressing

Printer addresses are coded in bits 4, 5, and 6 of the information frame, FIG. 44. The address for a single printer on the interface cable is 000. With the Cable Connector feature, addresses can range from 000 through 110. Addresses of printers attached with the Cable Connector feature are set by the customer. A bit combination of 111 is used as an end-of-message indicator in the last frame of a transfer sequence and, therefore, cannot be used as a valid address.

The first frame following any signal turnaround on the cable is a command frame containing a valid printer address (000 through 110) for selecting a specific printer on the interface cable. Each successive frame following a command frame is then checked for the end-of-message code (111).

All response frames from the printer to the controlling device, except the end-of-message frame, contain the address of the selected printer.

Printer Responses

All information transfers between the controlling device and the printer are initiated from the controlling device by command frames. The printer, however, does transfer information to the controller on request. These transfers are called printer "responses".

In general, printer response frames are requested by the controller to determine the readiness (or "status") of a printer for accepting data from the controller. A variety of printer operational and error conditions are reported to the controller by means of printer response frames. These conditions are described in detail in the section below entitled "Status and Error Information".

Printer Control Unit

The printer control unit 3 (See FIGS. 1 and 35, as examples) connects the printer to the interface cable from the controlling device, controls the flow of information to and from the controlling device and controls all internal printer functions.

Figure 56:
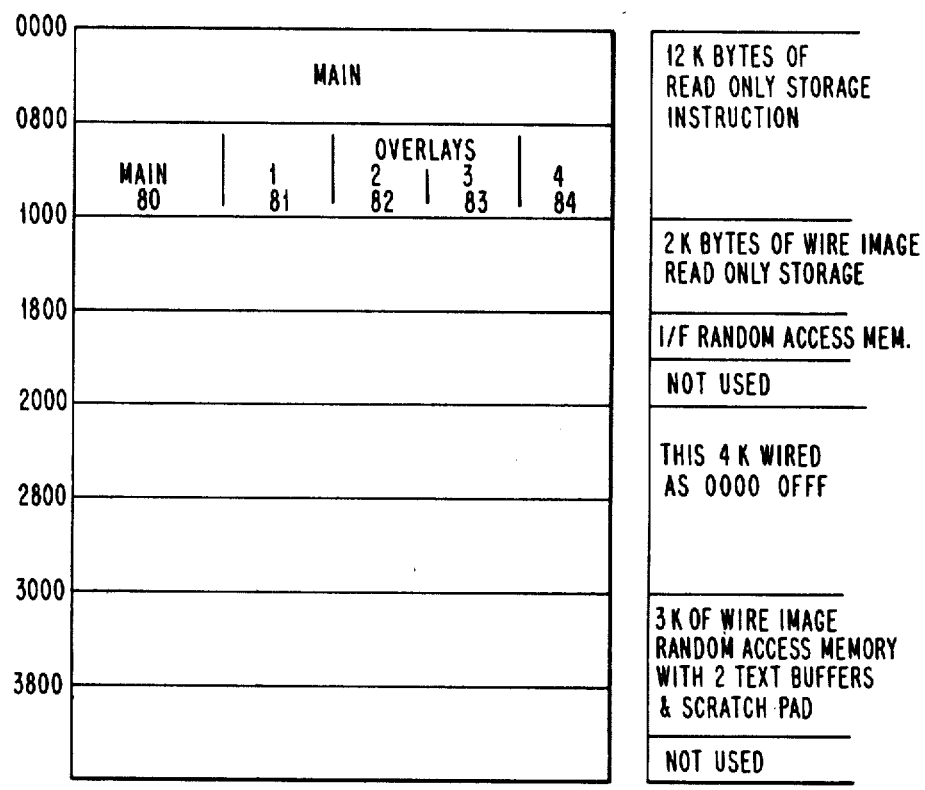
FIG. 56 illustrates the layout of Read Only Storage and Random Access Memory used in conjunction with the communications microprocessor.

When data is received for printing, the printer control unit 3 formats the data into print lines, using formatting commands (control codes) embedded in the data stream. Two print-line text buffers indicated in FIG. 56 are used so one line can be printed while the next line is being formatted. This comprises a "lookahead" function which allows bidirectional printing for maximum throughput.

Information Codes

All 256 8-bit codes of the Extended Binary Coded Decimal Interchange Code (EBCDIC) are recognized by the printer control unit 3. In a data stream hexadecimal codes of 00 through 3F represent formatting commands, 40 through FE represent data (FF is always a blank character.)

All of these codes may be used to represent characters.

Operational Commands

Figure 47A:
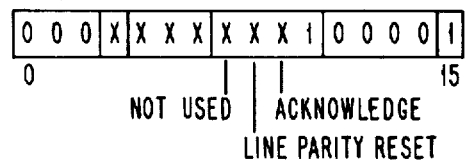
FIGS. 47A and 47B illustrate representative operational and formatting commands.

Operational commands, listed in Table I below, determine the printer function to be performed, such as Write Data, Read Status, etc. Also, see FIGS. 45 and 47A. FIG. 47A illustrates a representative operational command: "Poll." Some operational commands require an additional command or data frame. In these cases, the next frame transmitted must contain that command or data frame. Operational commands are embedded in the data stream wherever required for proper control of the printer.

Operational Command Sequence

The diagram in FIG. 46 illustrates a representative sequence of events between a controlling unit and the printer subsystem 2 to effect printing of data.

TABLE I

| OPERATIONAL COMMAND SUMMARY | | |
|---|---|---|
| Command Name | Hex Code* | Function |
| Poll | X0 | Poll causes a one-frame status response from the printer until a Set Mode command is issued; thereafter, Poll initiates a two-frame status response. Bit 8 set to 1 resets line parity error indication. Bit 9 notifies the printer to send |

TABLE I-continued

OPERATIONAL COMMAND SUMMARY

| Command Name | Hex Code* | Function |
|---|---|---|
| Read Device ID | 0C | current status frames. Initiates the transfer of the ID (Identifier) frame from the printer to the controlling device. Must be followed by an Activate Read command. |
| Read Status | 88 | Initiates the transfer of one frame of outstanding status from the printer. Must be followed by an Activate Read Command. |
| Activate Read | 00 | Required to complete Read Device ID or Read Status operations. This command signals the hardware that data is to start a transfer and is not placed in the command queue. |
| Write Data | 1E | Causes the printer to store all data frames after the Activate Write. |
| Activate Write | 01 | Causes printing of data frames that follow this command. This command signals the hardware that data is to start a transfer. This is not placed in the command queue. |
| Write Control Data | 05 | Resets exception or outstanding status. |
| Set Mode | 13 | Must be issued before the printer accepts any other command except Poll and Reset. Followed by a data frame that defines the interval between frames. |
| Reset | 02 | Resets printer to a power-on reset condition. |
| Clear | 12 | Clears all print data buffers. |
| End-of-Queue (EOQ) | 62 | Marks end of command queue loading. |

*Bits 7 through 14 of a data frame

Formatting Commands

Formatting Command Function

Figure 47B:
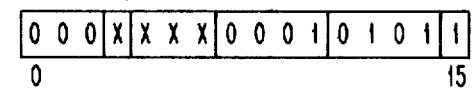

Formatting commands, shown in Table II below, control forms movement and line length. They are embedded in the information stream that follows the Write Data command, FIG. 45. Also, See FIG. 47B which illustrates a representative formatting command: "New Line."

Some formatting commands require more than one frame. A code in the first frame identifies multiple frame commands. In some cases the code in the second or third frame further defines the total number of frames to be used. The formatting command codes are also referred to as "standard character string" (SCS) codes. SCS is an SNA control-character subset.

TABLE II

FORMATTING COMMAND SUMMARY

| Command Name and Abbreviation | Frame Sequence (Hex Code/Parameter) | | | | | | Description |
|---|---|---|---|---|---|---|---|
| | 1 | 2 | 3 | 4 | 5 | 6 | |
| Null (NUL) | 00 | | | | | | No Operation performed. |
| Carriage Return | 0D | | | | | | Moves the print position to the first position of the current line. |
| New Line | 15 | | | | | | Moves the print position to the first position of the next line. |
| Interchange Record Separator (IRS) | 1E | | | | | | Same as New Line. |
| Line Feed (LF) | 25 | | | | | | Moves the print position to the same horizontal position of the next line. |
| Form Feed (FF) | 0C | | | | | | Moves the print position to the first position of the next page. |
| Bell (BEL) | 2F | | | | | | Turns off Ready, turns on Attention and the audible alarm, and stops printing. |
| Absolute Horizontal Position (AH) | 34 | C0 | NN | | | | Moves the print position to the horizontal position specified in the parameter frame. The parameter frame NN immediately follows the AH command. |
| Absolute | 34 | C4 | NN | | | | Moves the print |

TABLE II-continued
FORMATTING COMMAND SUMMARY

| Command Name and Abbreviation | Frame Sequence (Hex Code/Parameter) | | | | | Description |
|---|---|---|---|---|---|---|
| | 1 | 2 | 3 | 4 | 5 | 6 |
| Vertical Position (AV) | | | | | | position specified in the parameter frame. The parameter frame NN immediately follows the AV command. |
| Relative Horizontal Print Position (RH) | 34 | C8 | NN | | | Moves the print position horizontally towards the end of the line from the current print position the number of columns specified in the parameter frame. The parameter frame NN immediately follows the RH command frame. |
| Relative Vertical Print Position (RV) | 34 | 4C | NN | | | Moves the print position vertically towards the bottom of the page from the current print position the number of lines specified in the parameter frame. The parameter frame NN immediately follows the RV command frame. |
| Set Horizontal Format (SHF) | 2B | C1 | NN | HH | | Sets the print line length to the value specified in the parameter frames. The parameter frames NN and HH immediately follow the C1 command frame. |
| Set Vertical Format (SVF) | 2B | C2 | NN | VV | | Sets the page length to the value specified in the parameter frames. The parameter frames NN and VV immediately follow the C2 command frame. |
| Set Graphic Error Action (SGEA) | 2B | C8 | NN | GG | UU | Sets the unprintable character option and defines the default graphic that is specified in the parameter frames. The parameter frames NN, GG, and UU immediately follow the C8 command frame. |
| Transparent (TRN) | 35 | NN | | | | Permits the codes normally used as control characters to be used as printable characters. The parameter frame NN specifies the number of frames that follows the 35 command frame. |

TABLE II-continued
FORMATTING COMMAND SUMMARY

| Command Name and Abbreviation | Frame Sequence (Hex Code/Parameter) | | | | | | Description |
|---|---|---|---|---|---|---|---|
| | 1 | 2 | 3 | 4 | 5 | 6 | |
| Subscript (SBS) Not available for single direction paper feed. | 38 | | | | | | Line feeds 1.41 mm (4/72 in) to print subscript characters. |
| Superscript (SBS) Not available for single direction paper feed. | 09 | | | | | | Reverse line feeds down 1.41 mm (4/72 in.) to print superscript characters. |
| Set Character Distance (SCD) | 2B | D2 | 04 | 29 | P1 | P2 | Sets the character density to 10 or 15 cpi as specified in the P1 and P2 parameter frames. |
| Set Baseline Increment (SBI) Not available for single direction paper feed. | 2B | D2 | 04 | 15 | P1 | P2 | Sets the depth of one line of print to .176 mm (1/44 in.). |
| Set CGCS through Local ID (SCL) CGCS - Coded Graphic Character Set | 2B | D1 | 03 | 81 | P1 | | Loads 1 of 16 graphic character sets specified in the P1 parameter frame. |
| Absolute Move Baseline (AMB) Not available for single direction paper feed | 2B | D3 | 04 | D2 | P1 | P2 | Moves the print position forward in the vertical direction from the current print position to the new print position specified in the P1 and P2 parameter frames. |
| Relative Move Baseline (RMB) Not available for single direction paper feed. | 2B | D3 | 04 | D4 | P1 | P2 | Moves the print position forward or backward in the vertical direction from the current print position to the new print position specified in the P1 and P2 parameter frames. |
| Load Alternate Characters (LAC) | 2B | FE | NN | MM | | | Data allows customer designed fonts or characters to be loaded for printing. |
| Set Line Density (SLD) | 2B | C6 | NN | P1 | | | Selects vertical line density of 6 or 8 lines per inch or any distance in multiples of 1/72 inch up to 255. |

Status and Error Information
Poll Response Frames

Figure 48:
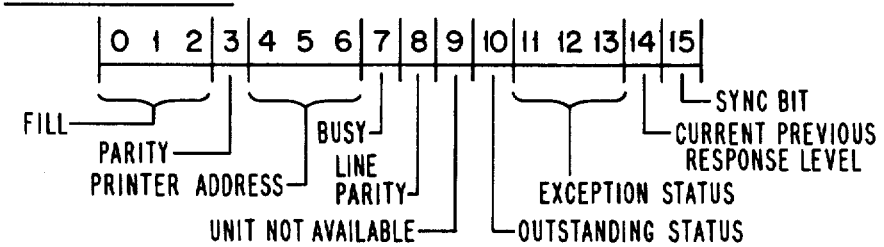
FIGS. 48 and 49 illustrate frame layout for status reports during a Poll operation.

Following a power-on reset (POR), the printer subsystem 2 responds to controller polling with a single status frame, FIG. 48. The printer continues to respond to controller polling with a single status frame until the printer receives a Set Mode command.

Figure 49:
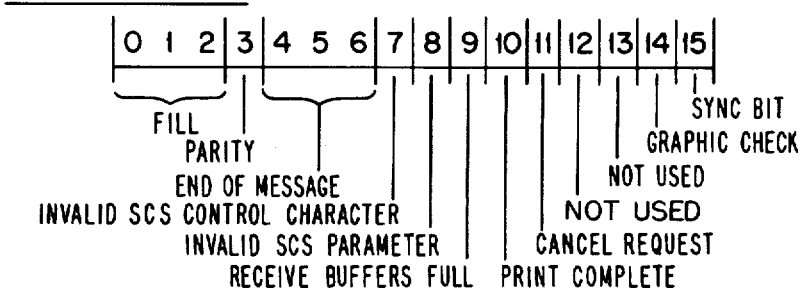

After receiving a Set Mode command, the printer responds to polling with two status frames, the second of which is shown in FIG. 49.

Status information described in frame 1, FIG. 48, is the same in either case.

Bits 0, 1, 2—Fill.
    These bits are always set to 000 and are used for timing control.
Bit 3—Parity.
    This bit is used to maintain an even bit count (even parity).
Bits 4, 5, 6—Printer address.
    These bits are used for selecting a specific printer attached to the interface. Up to seven printers can be addressed by the combinations (000 through 110). A bit combination of 111 indicates an end-of-message and causes line turnaround.
Bit 7—Busy.
    0 = Not busy when operational command queue is empty.
    1 = Busy when operational command queue is not empty or an activate command is received.
Bit 8—Line parity.
    0 = No line parity error is detected in a received frame.
    1 = Line parity error is detected in a received frame.
Bit 9—Unit not available.
    0 = Unit available (the Ready light is on).
    1 = Unit not available.
Bit 10—Outstanding status.
    0 = No outstanding status.
    1 = Outstanding status (available by using the Read status command).
    Bits 11, 12, and 13 indicate a variety of exception status conditions. Until the exception status is reset, only Poll, Set Mode, and Reset commands are processed. The Write Control Data Command (if the exception status is not power-on transition) is also processed. The power-on transition exception status is reset by the Set Mode command. The exception status conditions are reset by the Write Control command (see "Write Control Data").

| Bit 11 | Bit 12 | Bit 13 | Meaning |
|---|---|---|---|
| 0 | 0 | 0 | No exception status exists. |
| 0 | 0 | 0 | Activate lost - caused by a line parity error following a Write Data, Read Status, or Read Device ID. |
| 0 | 1 | 0 | Invalid activate command - caused when a Write Activate follows a Read Status or Read Device ID or, a Read Activate following a Write Data. |
| 0 | 1 | 1 | Reserved. |
| 1 | 0 | 0 | Invalid command - caused when a command is outside the operational command set or more than 240 microsecond interframe interval has been specified. |
| 1 | 0 | 1 | Input queue or input buffer overrun - caused when more than 16 commands and associated data frames or more than 256 data frames have been sent. |
| 1 | 1 | 1 | Power-on transition-causes only status frame 1 to be sent in response to a Poll command. |

Bit 14—Current/Previous response level.
    When bit 14 goes from 0 to 1 or 1 to 0, the using system determines that the response frame is current status. When bit 14 is unchanged from the previous response, the using system determines that the response frame is previous status. Any change in the response frame changes bit 14 from its previous state. Bit 14 is set to 0 after power-on.
Bit 15—Sync.
    A synchronization bit that is always set to 1. Frame 2 contains information shown in FIG. 49.
Bit 0 through 6—Same as Poll status frame 1.
Bit 7—Invalid SCS (standard character string) control.
    0 = No Invalid SCS Control Code is detected.
    1 = Invalid SCS Control Code is detected. Reset by a Reset or Clear command.
Bit 8—Invalid SCS (standard character string) parameter.
    0 = No Invalid SCS parameter is detected.
    1 = Invalid SCS parameter is detected. Reset by a Reset or Clear command.
Bit 9—Receive buffers full.
    Used by the using system to determine when data can be sent to the printer.
    0 = Receive buffers are not full.
    1 = Receive buffers are full.
Bit 10—Print complete.
    The print complete bit is set to 0 when the printer detects an Active Write command. The print complete bit is set to 1 by Power-on reset, a Clear command, a Reset command, or when all input data is printed.
    0 = Printing is in progress.
    1 = Printing is completed.
Bit 11—Cancel Request.
    The Cancel request bit is set to 1 when the operator presses the Cancel key on the Operator Panel. This bit is reset by the next Poll command (with Acknowledge bit set to 1), a Reset or Power-On reset.
    0 = No cancel request.
    1 = Cancel request.
Bit 12—Not used.
Bit 13—Not used.
Bit 14—Graphic check.
    This bit set to 1 indicates that an undefined character has been detected in the data stream. This bit is reset by the next Poll command (with Acknowledge bit set to 1), a Reset or Power-On reset.
    0 = No graphic error is detected.
    1 = Graphic error is detected.
Bit 15—Same as Poll status frame 1.

Read Status Response Frame

One response frame is sent for every Read Status command. The response frame, sent only after the Activate Read command is received, contains a hex code that defines the status condition within the printer.

The hex code corresponds to the last two digits of the error code that may be available as a system error message (depending on the using system). The first digits of these hex codes are also automatically displayed on the printer operator panel 26 when the error occurs.

The defined conditions are:

| Hex Code | Error Condition |
|---|---|
| 11 | Printer controller error |
| 12 | Cable adapter error |
| 31 | Head drive problem |
| 32 | Margin emitter not detected |
| 34 | Turnaround emitter not detected |
| 35 | Print emitter not detected |
| 36 | Head busy (cannot be reset) |
| 37 | Printer control unit |
| 38 | Overcurrent |
| 41 | Forms drive problem (undetermined area) |
| 42 | Forms busy (cannot be reset) |
| 43 | Forms emitter B not detected |

-continued

| Hex Code | Error Condition |
|---|---|
| 44 | Forms emitter A not detected |
| 45 | Run latch failure (printer control unit) |
| 46 | Printer control unit |
| 47 | Overcurrent |
| 48 | Emitter sequence wrong |
| 80 | Ribbon jam |
| 81 | Ribbon jam (diagnostic mode) |
| 82 | Ribbon problem |
| 83 | Head Image Generator error |

Printer General Block Diagram

Figure 50:
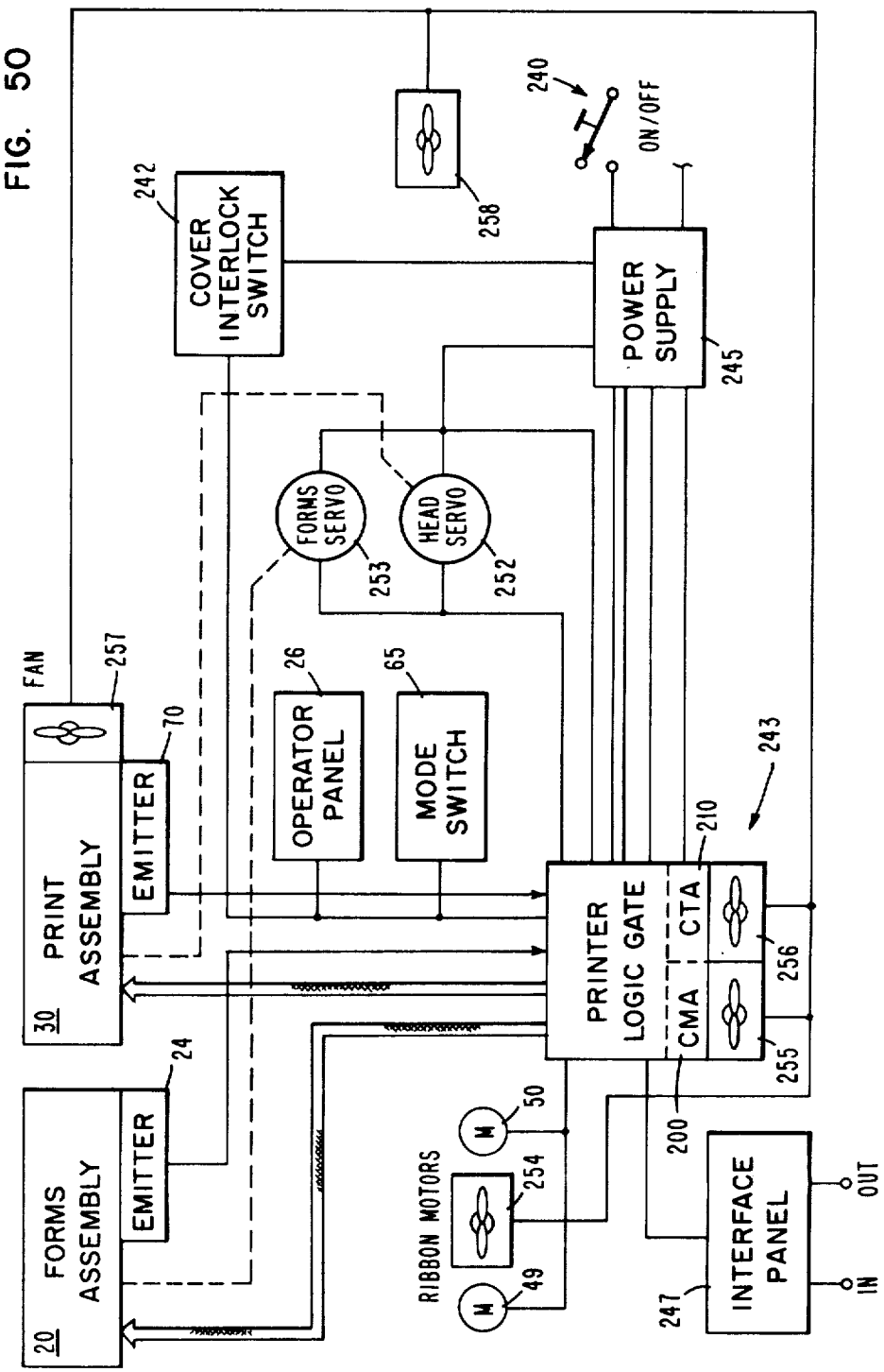
FIG. 50 is a block diagram of various circuit components used in the printer subsystem of FIGS. 1 and 2.

FIG. 50 illustrates various printer blocks of interest. A power supply 245 supplies the unit with all the power to drive and to control. The on/off switch 240 controls power supply 245 being on and off. From the power supply 245 the cover interlock switch 242 enables and disables the 48-volt drive which controls much of the printer logic 243. Logic 243, once enabled, looks at operator panel 26 for information as to the operations to be performed. Mode switch 65 tells the logic 243 which type of operation in testing procedures should be run. Print assembly 30 is controlled by the printer logic 243 along with the forms feed assembly 20. Emitter devices 24 and 70 supply positional information to the printer logic 243. The printer logic 243 also controls and talks with the interface panel 247 and passes information on the other parts of the printer. The ribbon motors 49 and 50 are controlled in an on/off fashion by printer logic 243 which accepts inputs from the ribbon drive assembly 40 to determine when the end of ribbon 41 has occurred. Head servo 252 is a control block that insures that the print head 34 is in the proper position at the proper time for the actuators 35 to fire. Forms servo 253 is a control block that moves the forms 15 to desired locations. Fans 254–258 are used to control temperature within the machine. As indicated in connection with FIG. 35, printer logic 243 includes two microprocessor adapter blocks 200 and 210. The first one included is the Communications adapter CMA 202 which accepts input and passes it to the second one which is the Control adapter CTA 211 that actually controls the printer. These will be discussed in connection with FIGS. 51A and 51B.

Microprocessor Control—Printer Subsystem

Figure 51A:
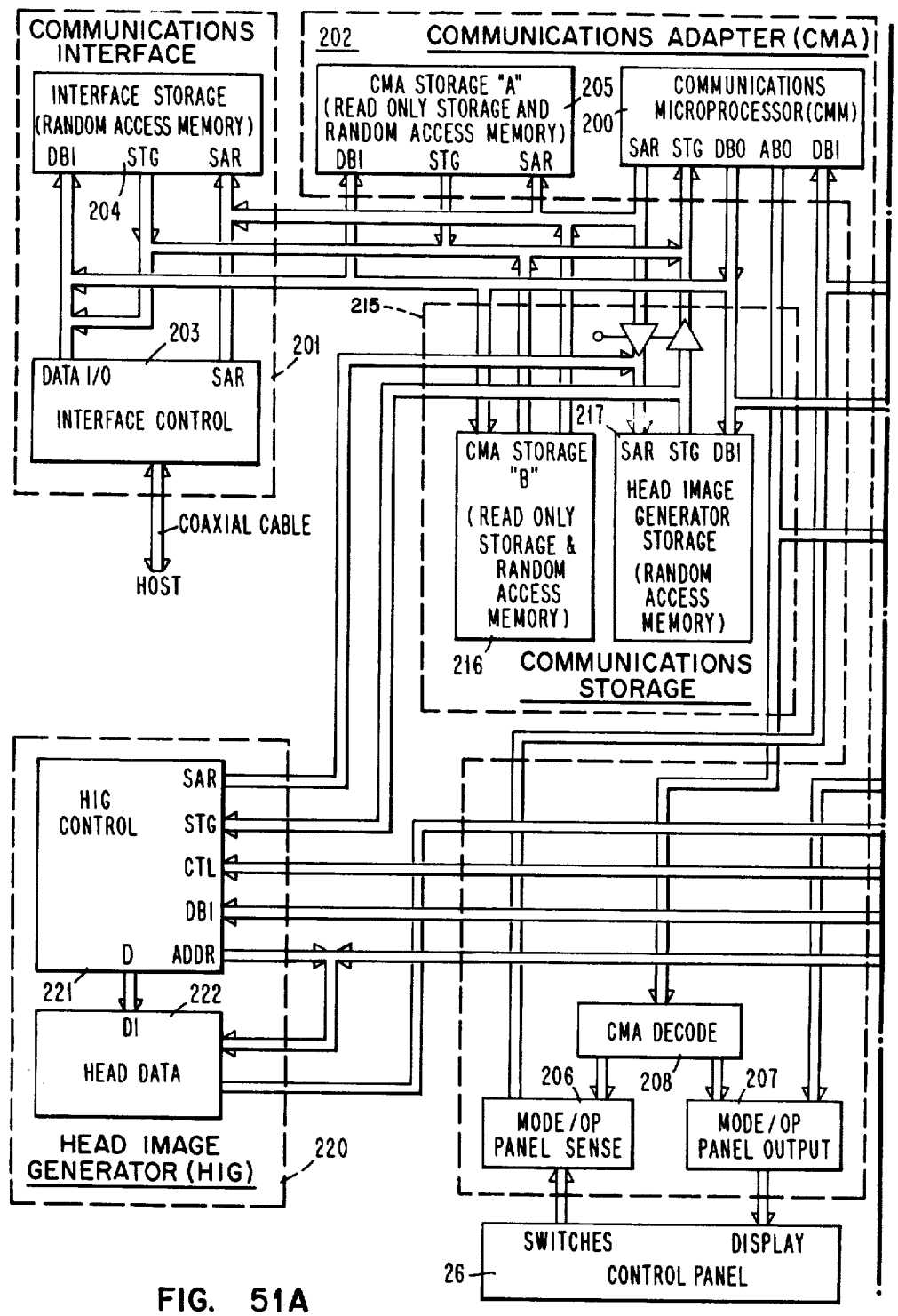
FIGS. 51A and 51B, when arranged as shown in FIG. 52, comprise a block diagram of the printer control unit including a Communications microprocessor (CMM) and a Control microprocessor (CTM) as well as a number of elements in the printer unit.
Figure 51B:
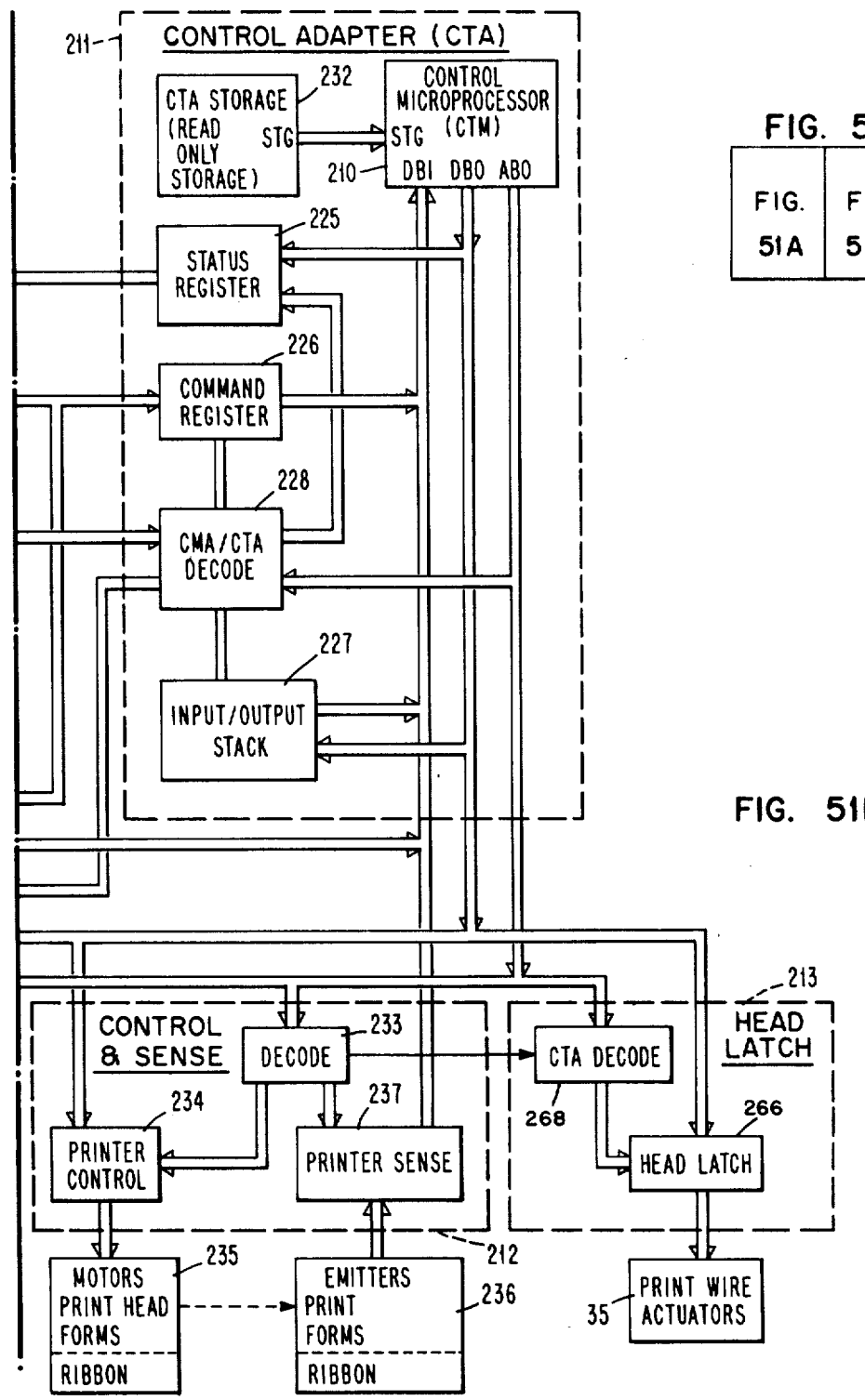

Two microprocessors 200 and 210 are provided for the printer subsystem 2, each having its assigned functions and both can operate concurrently to accomplish the required functions. FIGS. 51A and 51B join together as shown in FIG. 52 to illustrate the details of the Printer Control Unit 3 and Electronics 4, FIG. 1. Various abbreviations used herein are listed in Table III below:

TABLE III

| ABO | - | Address Bus Out |
|---|---|---|
| CMA | - | Communications Adapter Card |
| CTA | - | Control Adapter Card |
| CTL | - | Control |
| D | - | Data |
| DI | - | Data In |
| DBI | - | Data Bus In |
| DBO | - | Data Bus Out |
| HIG | - | Head Image Generator |
| MODE/OP | - | Mode/Operation |
| ROS | - | Read Only Storage |
| SAR | - | Storage Address Register |

TABLE III-continued

| STG | - | Storage Bus In |
|---|---|---|

There are actually seven main blocks comprising the Printer Control Unit 3 representing seven printed circuit cards. The first block is the Communications Interface 201 between the host system 1 and digital printer electronics 4. Interface 201 communicates with the Communications Adapter (CMA) 202 which is a microprocessor card that takes the host information and compiles it into a form that can be used by the rest of the printer. The CMA 202 includes Communications microprocessor CMM 200. From there, the information is passed on to the Head Image Generator 220 card for building images for the printer. There is another microprocessor card that is the Control Adapter Card (CTA) 211. The CTA 211 includes Control microprocessor CTM 210. The Control Adapter 211 handles the processed information from the Communications Adapter 202, controls all the mechanical elements of the printer, such as the motors 23, 76, and receives emitter signals indicating positions of the mechanical elements. Adapter 211 handles communication with the actual hardware through the Control and Sense card 212 and the Head Latch card 213 that stores the data to be outputted to the wire actuators 35.

Within the Communications Interface 201 are two blocks. One is the Interface Control block 203; the other is the Interface Storage block 204. The Interface Control block 203 interprets the information coming from the host system 1 in an analog signal form, processes it into digital form, and generates the necessary timing signals to be able to store this information in the Interface Storage 204. The Interface Storage 204 is a Functional Storage Unit (FSU) random access memory which is sized at one K (1K) bytes. All data and commands from the host system 1 go into this Interface Storage 204; it acts as a buffer for the Communications Adapter 202. Within the Communications Adapter card 202, there are five blocks. There is the Communications microprocessor 200 (CMM) and its corresponding storage 205 designated "A" which includes both random access memory and read only storage (ROS). There is a Mode/Op Panel and Sense block 206 that can read the panel 26, a Mode Op Panel Output block 207 to output displays to the panel 26, and Decode Logic 208 for these functions. The Communications Adapter 202 translates the information that the host system 1 has sent over through high-level or hand-shaking type procedures and translates it into much more simple terms such as characters to be printed or carriage returns, or line feeds—any other mechanical type control that needs to be performed. Its program is stored in the Read Only Storage (ROS) of the CMA "A" storage 205. There are 6K bytes in this ROS. The CMA 202 also handles Hardware Operator commands involving printing the printer on-line, taking it off-line and displaying any type of status information through the display 59 on the Mode Operator Panel 26.

The Communications Storage 215 has two blocks entitled CMA Storage "B" designated 216 and Head Image Generator (HIG) Storage 217. Storage "B" block 216 contains up to 14K bytes of ROS storage in FSU technology for the Communications Adapter microprocessor 200. The random access memory storage 217 has 3K bytes for the Head Image Generator 220 and is where the Communications microprocessor 200 stores character images to be printed. The character images in storage 217 are used by the Head Image Generator 220 to generate actual images for the slanted heads 134. Also, in the block of Random Access Memory 217 are two text buffers and some scratch pad storage indicated in FIG. 56.

Because of the staggered slant geometry of the print heads 34 and the multiple head configuration, a fairly complex Head Image Generator 220 (HIG) is required to convert conventional character dot format to a slanted format. HIG 220 processes the character images as they would normally appear in a 37 straight-up" format, but slants them for the Head Latch block 213 to supply to the print wire actuators 35. This is done through hardware routines that are performed in the Head Image Generator 220. There are basically two blocks 221, 222 in the Head Image Generator 220, one block being the Control block 221 that actually performs the hardware routines to take the unslanted image and slant it. There is also a Data block 222 that is a small storage unit in which the Head Image Generator 220 stores the slanted information currently being worked on. The Control Adapter 211 can then read this storage 222 and output to the print wire actuators 35 through Head Latch 213. This is the slanted data.

The Control Adapter (CTA)) 211 has six blocks within it. The Control microprocessor (CTM) 210 receives inputs from various sensors, e.g., ribbon reverse/jam, forms jam, head position, linear encoder, forms position encoder, as well as print commands and data from CMM 200 and HIG 220 and generates print wire firing signals and various control signals to control the forms feed assembly 20, print assembly 30, print wire actuators 35, and ribbon drive assembly 40. The Control microprocessor (CTM) 210 has a ROS storage 232 that is 12K bytes of FSU ROS to contain its programs or routines. Certain communication registers including Status register 225 and Command register 226 allow the Communications Adapter 202 and the Control Adapter 211 to communicate with one another. Through these registers 225, 226 go commands such as Print commands, Forms commands, Carriage Returns, and the actual decoded messages that the host system 1 has sent over. An Input/Output stack 227 is used as a local storage, that is, it is a small random access memory for the Control Adapter 211 to store intermediate data and there is some associated decoding. The Decode block 228 handles the timing relationships for the Communications Adapter 202 and Control Adapter 211 to be able to talk to one another asynchronously.

The Control and Sense card 212 handles the information from the Control Adapter card 211 and interfaces with the actual printer electronics 4 to control by way of Decode block 233 and Printer Control block 234 the head motor 76, the forms motor 23, and the ribbon motors 49 and 50 represented by block 235. Through blocks 236 and 237 it senses the positional state of printer electronics 4 and mechanics such as the print emitters, forms emitters, etc.

The Head Latch card 213 is another interface card from the Control Adapter 211 that latches up the wire image data, the slanted data that is received from the Head Image Generator 220, and outputs it at the correct time to the print wire actuators 35 so that the dots get printed in the correct place on the form 15. It includes the CTA Decode block 268 and Head Latch block 266.

A typical print operation is now described. It is assumed that a single print line is provided by the host system 1 with a Forms Feed and Carriage Return at the end which is a typical situation. This information comes over in a serial stream from the host system 1 as analog signals into the Communications Interface 201 which digitizes the analog signal and stores it in its Interface Storage 204 in the form of characters to be printed. A command informs the Communications Adapter 202 that this is a line to be printed and that it has Line Feed and Carriage Return commands. The Communications Adapter 202 seeing this information appear, will take the characters to be printed out of the Interface Storage 204 and put them into a selected text buffer (FIG. 56) in CMA Storage "B" 216 on Communications Storage card 215. It then tells the Control Adapter 211 that it has information in a text buffer to be printed.

The Control Adapter 211, after receiving the information initially tells the Head Image Generator 220 (HIG) that there is data in the selected text buffer that needs to be slanted. Head Image Generator 220 then slants this information, while the Control Adapter card 211 starts the printer in motion; that is, it starts moving the print head carrier 31. It moves the carrier 31 through commands given to the Control and Sense card 212, and it looks for print emitter signals, or emitter signals which tell the Control Adapter 211 when to fire wires 33; it checks for these signals coming from the Control and Sense card 212. When these signals appear, the CTM 210 retrieves the slanted wire information from the HIG 220 and passes it to the Head Latch card 213 and fires the wires 33 to print dots. The Control Adapter 211 for each print emitter that it sees, asks the Head Image Generator 220 for a new set of slanted data. This is outputted to the Head Latch card 213 and is repeated until the entire text buffer has been printed, that is, all the information that the host system 1 sent over. Once the Communications Adapter 202 has seen that this has taken place, that is, the printing has been done, it passes the Forms command to the Control Adapter 211. Control adapter 211 decodes this command and gives a command to the Control and Sense card 212 to move forms 15 a certain number of forms emitters. It senses these forms emitters through the Control and Sense card 212 again.

Figure 53:
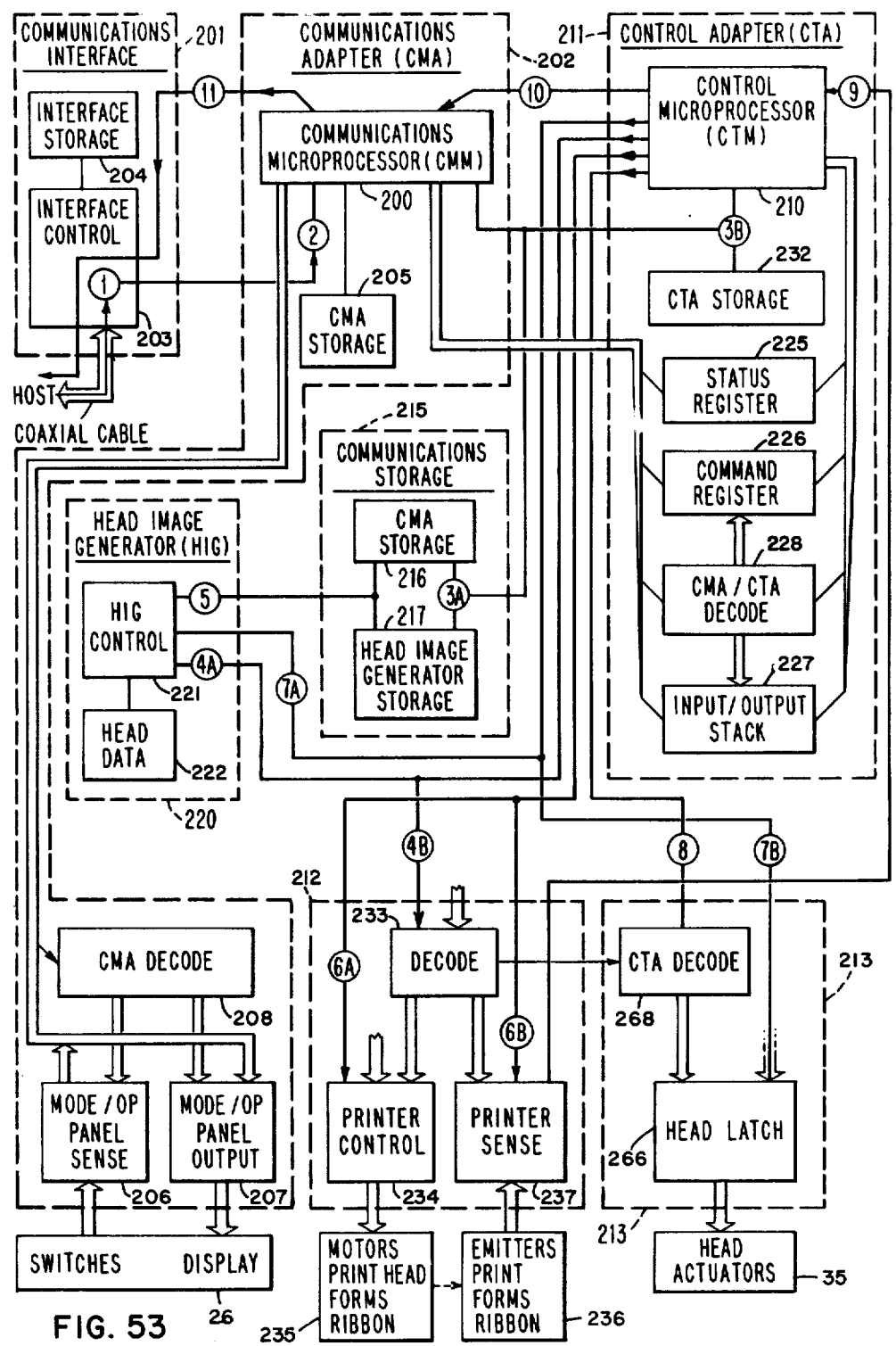
FIG. 53 illustrates a typical data transfer and printing operation in the printer subsystem.

This is further illustrated in FIG. 53. A typical operation is assumed to come from the host system 1 to the printer control unit 3. [Steps (paths) are illustrated by numbers in circles.] Path 1 represents receipt of the data and commands by interface 201. By path 2, the interface 201 prepares it and passes it on to the CMA 202. CMA 202, essentially in two operations, strips off printable characters and by the path labeled 3A transfers the characters to the text buffers in CMA Storage 216. Initially, font information is stored in HIG Storage 217. At the same time essentially by path 3B, the CMA 202 supplies print commands to the CTA 211 to start the operation. Next are two operations 4A and 4B. CTA 211 initiates operation 4A to HIG 220 which simply says there is data in the text buffer at a certain address, begin HIG operations. At the same time, the path 4B is effective to tell the Control and Sense card 212 to start any of a number of possible operations of the printer, such as: to move the heads 134 off the ramp, move the forms 15 as necessary, do not move the forms 15, move head 134 to a certain absolute position or relative position, etc. Item 5 is a path from HIG 220, a flow from the HIG 220 to the storage blocks 216 and 217 which essentially fetches the data and the font information, that is the hexadecimal representation of the data that it is supposed to operate on to start its wire image generation. Path 6A represents verification by CTA 211 of electromechanical printer operations. This involves checking out the emitters, for example, timing out on the printer emitters, etc. to determine that the printer is prepared to print and ready to fire reported back by path 6B.

Item 7 (two paths, 7A and 7B) represents fetching of data from the HIG 220 which is the head latch image that is transferred to the head latch card 213 and some checking is done on it at that point by the CTM 210.

Item 8 represents CTA 211 signalling the head latch block 213 to fire. This is a pedestal signal to fire the wires 33. Prior to that point, CTA 211 has to have received a print emitter at step 6B in order to issue the pedestal firing signal.

Step 9 represents a feedback signal from the Control and Sense Card 212 and from the head latch card 213 back to CTA 211. CTA 211 will recheck the Control and Sense Card 212 verifying that the operation was performed that was expected to be performed.

Step 10 is communications from the CTA 211 to the CMA 202 indicating that the operation that the CMA 202 initiated was accomplished without errors. If there were errors, CMA 202 will be so advised. CMA 202 then compiles status or error information and presents it at Step 11 to the Interface 201 as a poll response to the host system 1.

Communications Microprocessor (CMM) Operations

Figure 54:
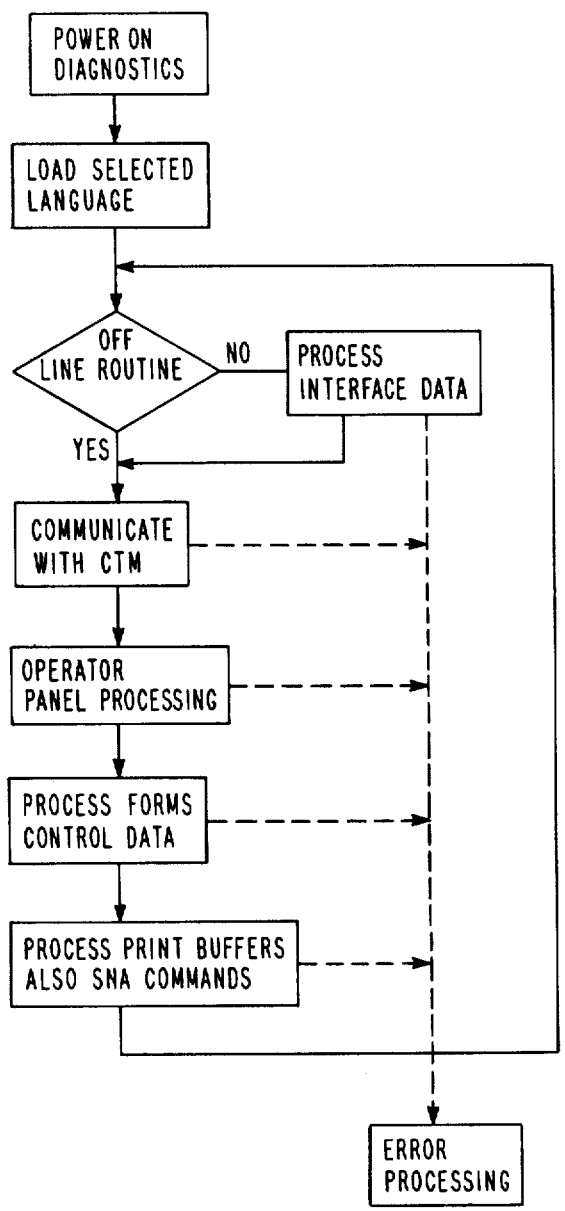
FIG. 54 is a generalized flowchart of the program routines for the Communications microprocessor (CMM) shown in FIG. 51A.

The Communications Microprocessor 200 (CMM) Flowchart, FIG. 54, represents its general operation and starts with the Power On Diagnostics being run. At the conclusion of the Power on Diagnostics, the selected language is loaded into a font section (portion of Memory 216, FIG. 51A) for processing and printing. A decision is now made as to whether the Mode Switch 65 is in the off-line or on-line position. If it is in the on-line position, then the interface data is processed, or information coming from the host system 1 or going to the host system 1, is processed and prepared. If an off-line routine was indicated, then this process is skipped. In any case, the chart continues to the next block no matter which off-line routine is processed. This block represents communication with the Control microprocessor 210 (CTM). This allows the CMM 200 to receive any errors or information that needs to be passed to the host system 1 and it allows the CMM 200 to pass data and commands such as data to be printed, forms, spacing, etc. on to the CTM 210. Next, the Operator Panel 26 is accessed to determine whether the Start button 53, Stop button 52, or other buttons 51, 54, 55 or 60 have been depressed for entry of information from the Operator Panel 26. Next, the Process forms or Control data block is checked to determine the movement of forms 15 resulting from commands sent to the CTM 210. Next is to Process the text buffers which includes SNA commands or the off-line routines. The CMM 200 places them in the proper text buffer to be printed by the CTM 210 and directs the CTM 210 to pick this information up and place it on the paper as dots. All of these routines have a means of communicating with the error processing routine. At the end of the routine, the CMM 200 checks for on-line or off-line status and continues the process again.

Control Microprocessor (CTM) Operations

Figure 55:
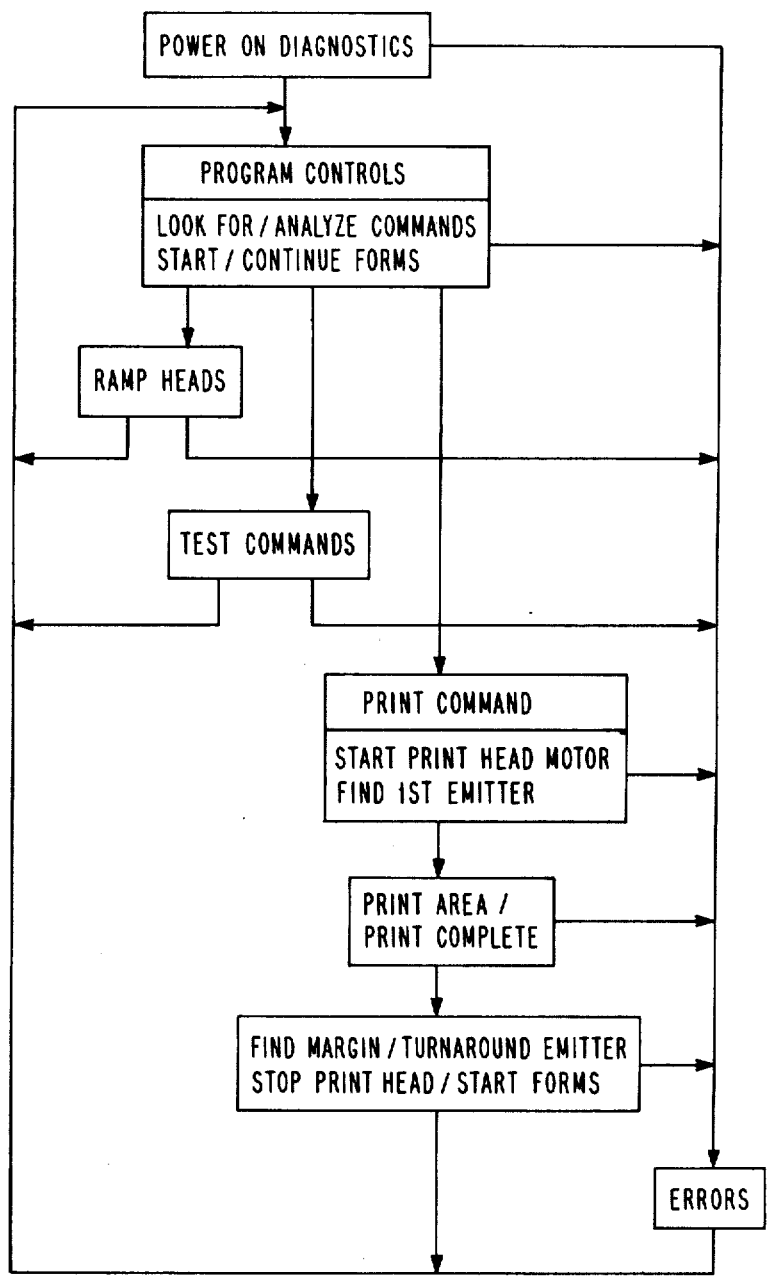
FIG. 55 is a generalized flowchart of the program routines for the Control microprocessor (CTM) shown in FIG. 51B.

FIG. 55 is an overall block diagram of the Control microprocessor 210 (CTM) operations. The CTM 210 goes through Power On Diagnostics upon Power Up and then upon successful completion of that proceeds to Program Controls. The function of this is to look for and analyze commands from the Communications microprocessor 200 (CMM) and start or continue forms operation. Initially, a check is made by the Ramp Heads block that print heads 34 are in the home or ramp position. A check is then made by Test Commands block for servicing or customer tests that may be required. When a command is determined to be a Print Command, CTM 210 starts the print head motor 76 and looks for the first print emitter. Upon finding the first print emitter, CTM 210 goes into the Print block and stays in that area printing the line of data until it reaches Print Complete representing complete printing of the line. Then CTM 210 goes into the margin routines to find the margins or a turnaround emitter. Once the margins or the turnaround emitter are determined, CTM 210 stops the print head 34, starts the forms 15 and returns to Program Control to look for and analyze further commands. If CTM 210 receives additional commands from the CMM 200, upon completion of the forms operation, it starts the next print operation. Out of any of these blocks, if an error is detected, CTM 210 exits and goes into an error routine to determine what and where the error is. It notifies the CMM 200 of the error. The CMM 200, based on the type of error, will either retry the command or stop the operation of the printer and notify the host system 1.

Layout of Read Only Storage and Random Access Memory

FIG. 56 shows the layout of the Read Only Storage (ROS) and Random Access Memory locations utilized by Control Adapter 202 and primarily located in the Communications Storage 215. Some of these locations are also utilized by the Head Image Generator 220.

In the left portion of FIG. 56 addresses 0000–3800 are shown as they would apply in the machine. These are four-digit hexadecimal (Base 16) addresses. The microprocessor 200 uses the three low order (rightmost) digits. The first addresses are 0000 to 0800 which would indicate a 2K or 2048-byte segment of memory. This is executable code containing the main program entry point. From 0800 to 1000, there are multiple segments of code by the same address called "overlays". Each overlay is accessed by an OUT command with a number associated with it. There are five separate overlays that can be accessed within the addresses 0800 to 1000; the first overlay being the main overlay of 80; the second one, overlay 81; the third one, 82; the fourth one; 83; and the fifth one, 84. Only one of these overlays 80–84 may be accessed at a specific time until another OUT command selects another overlay.

The addresses 1000 to 1800 are basically still addresses 000 to 800, but serve as data memory versus executable memory. This is where the 2K (2048) bytes of wire image ROS are placed. This is the compressed images used for printing and is where all 16 fonts, or representative images, are stored in the compressed mode to be uncompressed later into Random Access Memory. Starting at location 1800 is where the Interface Random Access Memory Buffers are located, Buffer 1 being at 1800, Buffer 2 at 1900. Each buffer is 256 bytes long. No memory is located from locations 2000 to 3000. A select byte called the X-byte, if off, will select locations 0000 to 2000, and if on, will select locations 2000 to 4000. There are data bytes and instruction bytes in the machine, with the X-byte affecting both data and instructions. With this capability, the Interface Buffer is selected with the X-byte off; the Text Buffer is selected with the X-byte on. By internal wiring, any access to any memory in locations 2000 to 3000 will access locations 0000 to 1000. This prevents having to duplicate code when the X-byte changes. Otherwise, it would be necessary to have another Read Only Storage with exactly the same code in both places. By wiring one ROS as if it were in both places, the microprocessor 200 executes this code independently of the X-byte.

Starting at 3000, there are 3K (3072) bytes of Random Access Memory in which the wire images are built from the 2K bytes of wire image ROS located at 1000. The addresses starting at 3000 are the addresses used for all wire images. In effect, the subsystem is using three digits, which would be 000 to 8FF in this wire image random access memory. All images are stored as 9 slices. By using the first of the three digits to indicate the slice, the next two digits represent the EBCDIC or Extended Binary Coded Decimal Interchange Code value of the characters as sent over by the host 1 or other source. For example, if the first slice of the letter "C" is required, which is an EBCDIC C3, then the subsystem looks in location 0C3 for the first slice of the image, 1C3 for the second slice of the image, etc. for the letter "C". The last portion of the memory is not used.

This is basically the layout of memory, both Random Access and Read Only Memory for use of the Communications microprocessor 200 and Head Image Generator 220.

Processing Data CMM/CTM

Figure 57:
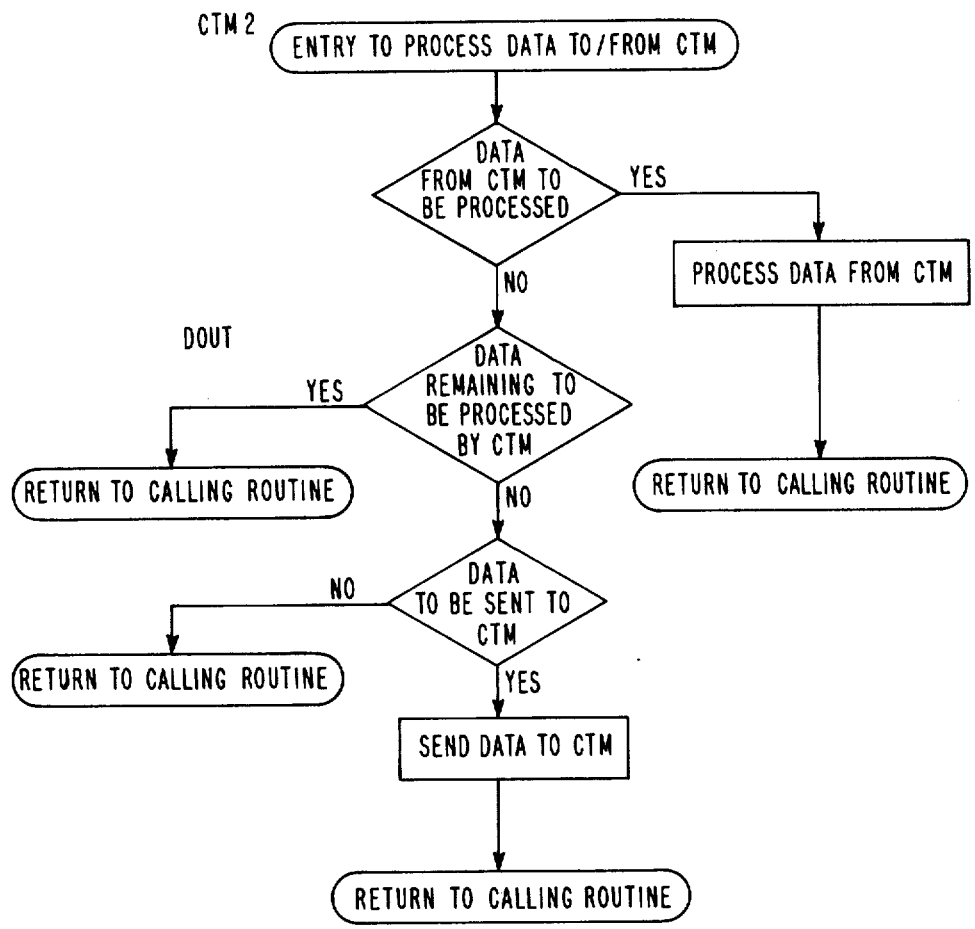
FIG. 57 illustrates a routine for transfer of information between the communications microprocessor and the control microprocessor in the printer subsystem.

FIG. 57 basically covers the processing of data going to the CTM 210 or coming from the CTM 210 to the CMM 200. At the entry of this routine, which is called CTM2, the first decision made is, is there data coming from the CTM 210 to be processed; if so, that data is processed and a return is made to the calling routine. If there is no data coming from the CTM 210, then the question is asked, is there data remaining to be processed by the CTM 210, which has been sent previously. If the answer is "yes", then a return is made to the calling routine to process that data. If there is no data to be processed from a previous entry, then a check is made to see if there is data to be sent to the CTM 210 presently. If there is nothing to send, then a return is made to the calling routine. If data is to be sent to the CTM 210, the data is picked up and placed on the buses over to the CTM 210 and returned to the calling routine. At this point, the routine is capable of processing any data going in or out from the CMM 200. FIG. 57 represents a normal routine to process data. For example, if a buffer has been built from data sent from the host system of FIG. 1, then the information is passed to the CTM 210 as to which text buffer is to be printed, at which density it is to be printed and the count of characters to be printed. If it's a forms command, then the number of emitters that the forms 15 are to move are sent in this command. It is a means of communicating between the two microprocessors 200, 210.

Printer Font Selection and Compression

Routines are now described that enable the storage of a multiplicity of language fonts in limited memory space. The routines feature the storage and accessing of present and future character fonts in the Printer in compressed mode and enables expansion of the compressed images to a form necessary for printing of characters.

The font selection and compression is designed for the printer subsystem 2 so that font control tables in storage may have their contents replaced with a new font design without any requirement for microcode change.

Figure 58:
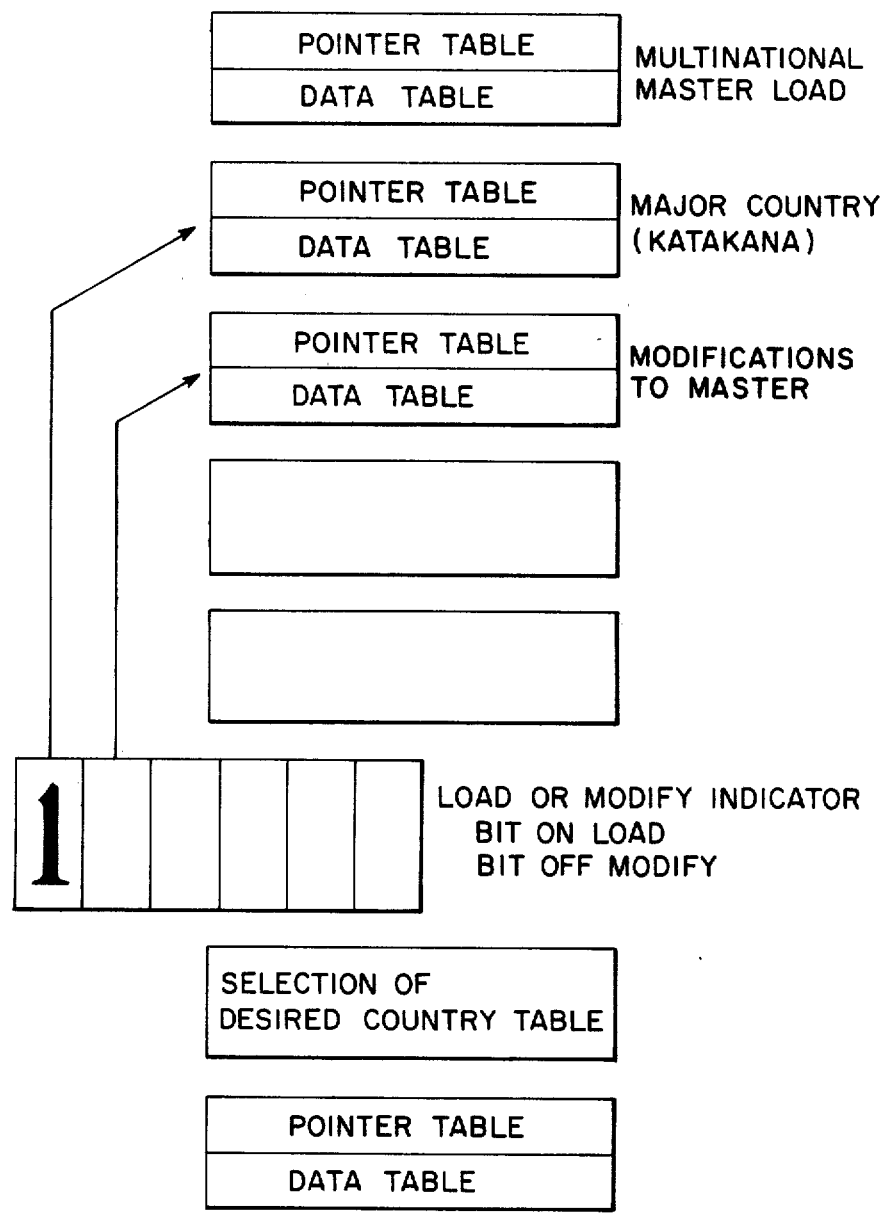
FIG. 58 is a generalized representation of the font storage and selection scheme used herein.
Figure 59:
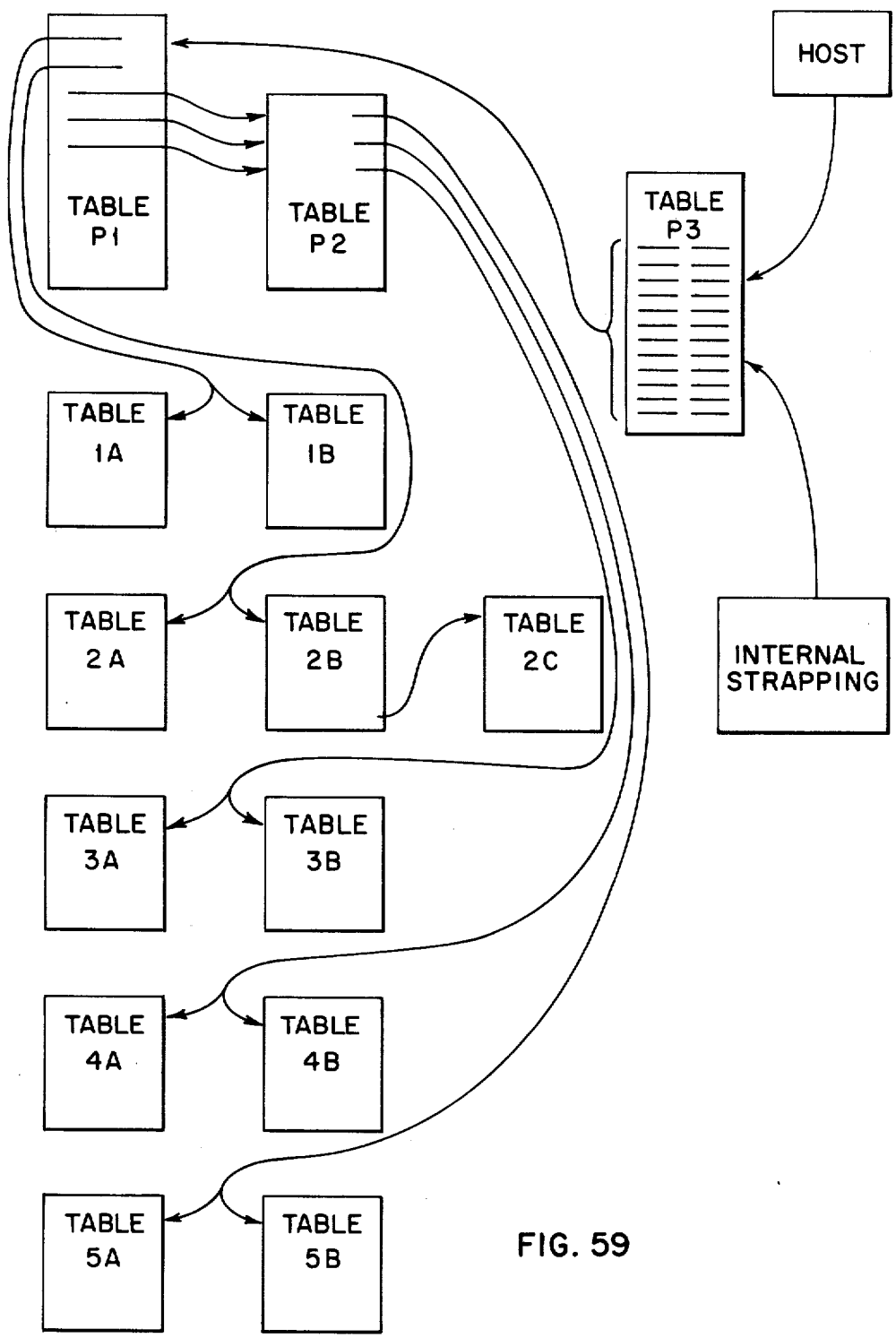
Figure 60:
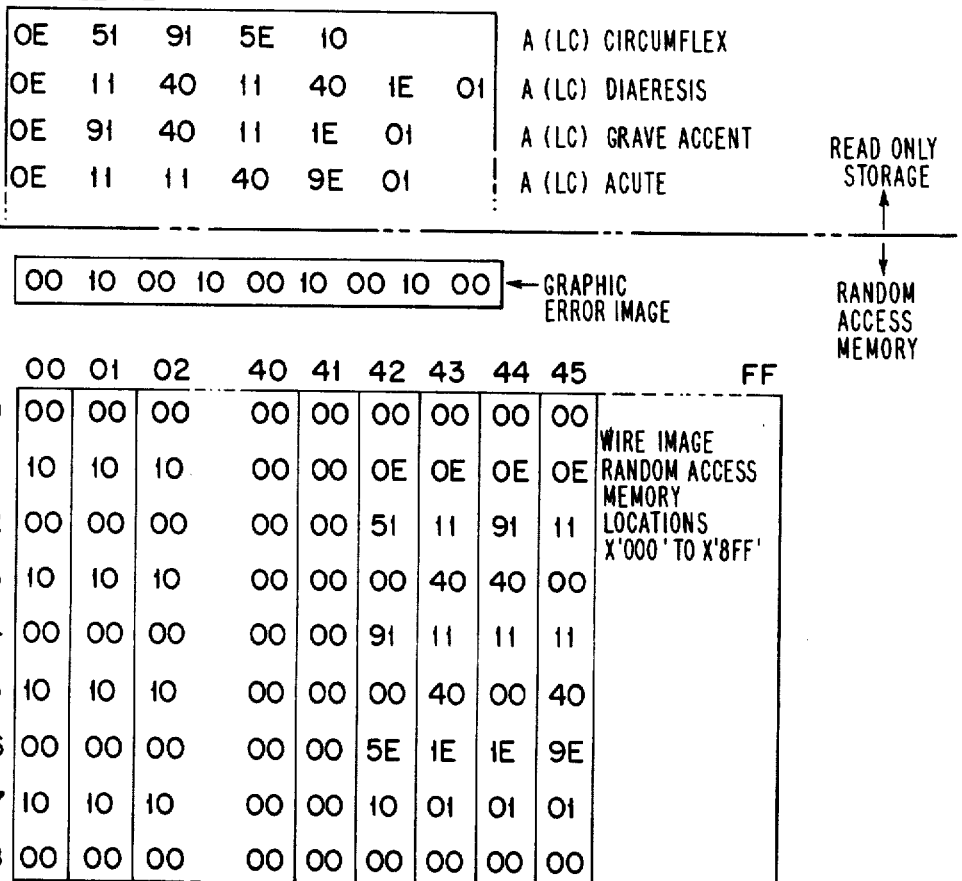

FIG. 58 illustrates the arrangement of pointer and data tables in a general form while FIGS. 59-61 provide more details of the font selection, compression and expansion operation.

FIG. 58 is a layout of the Read Only Storage wire image tables showing that the first group of tables is for the Multinational master load with a pointer table and a data table. The Multinational table is a 192 character font that contains most of the other country images, and they are usually designated as a 92-character set country. This means that not all the images are used in the country loads and the Multinational is a composite of all of these. It thus can be modified to handle whatever is desired for a particular country. All unused ones then are indicated as graphic error images. The next table is the Major country, and in the present situation, it is assumed to be the Katakana language. It has its pointer table and data table. This second table is called "Major" because it is a major change to the Multinational. In other words, images are added that are not found in Multinational. The third table is called the "Modifications to Master" and has some of the images in the Multinational languages that are moved from one location to another. As en example, the United States uses the dollar sign and Great Britain uses the pound sign in the same storage location. This is called a modification to the Multinational. When a Major Country transfer is involved, such as Katakana, then the appropriate Japanese symbol is used for the money sign. There are two blank areas in FIG. 58 for two other major countries, if desired, in Storage.

A register layout in the lower portion of FIG. 58 indicates whether the multinational table is to be modified for a Major Country, as described, or for a Modification Country. If the bit is on, the Multinational will be overlaid with a Major Country; if the bit is off, it will be modified from the Master Country. There is also a table which provides the internal representation of the desired country versus external desired country which enables an external country selection of anywhere from zero (0) through (FE) or 254 possible identifiers while internally there is a maximum of 16, (0) through (F).

The host machine or internal strapping may require font loading of a particular font during printing. Table P3, FIG. 59, contains up to 16 font selections. Tables P1 and P2, FIG. 59, contain the pointers to fonts to be selected.

In normal operations, a base load may be loaded from Tables 1A and 1B. These are shown in greater detail in FIG. 60. A decision is now made to see if the base load is required or if another font is selected. If the base load is required, then loading is complete. If not, then the decision is made via Table P2, FIG. 59, to see if the required font is a rearrangement of images or new images are to be loaded.

If the images are to be rearranged, then Tables 2A, 2B, and 2C, shown in greater detail in FIG. 61, are used. Table 2A is a "bit sensitive" table used to select the desired font. If the bit is on in Table 2A, then Table 2B indicates the from/to character image position. Example from Table 2B: First entry says to move the image for EBCDIC character "B0" to the location for image "4A".

After all matches are made in Table 2A, the end of the table is found. This now causes the graphic error pass using Table 2C, FIG. 61.

Tables 2C, 1A, 3A, 4A and 5A all use the same format. If the rightmost bit in each byte is off, the the other 7 bits indicate "Move a Byte" from Tables 1B, 3B, 4B or 5B for each bit that was on in the 1A, 3A, 4A or 5A Table. If the bit was off, then loading of a blank (00) is indicated. If the rightmost bit is on, then the six middle bits are count bits. If the leftmost bit is off, then the count is Skips for loading. If the leftmost bit is on, then the count is Skips for loading and Required Graphic Error Image load on the second pass. Table 2C is now used as a second pass to place the graphic error character in the proper image locations.

If the images are to be loaded in place of some of the base load, then Tables 3A and 3B, or 4A and 4B or 5A and 5B are utilized. These will load in two passes using the procedure described above. The first pass loads the images while the second pass inserts the proper graphic error images.

Figure 62A:
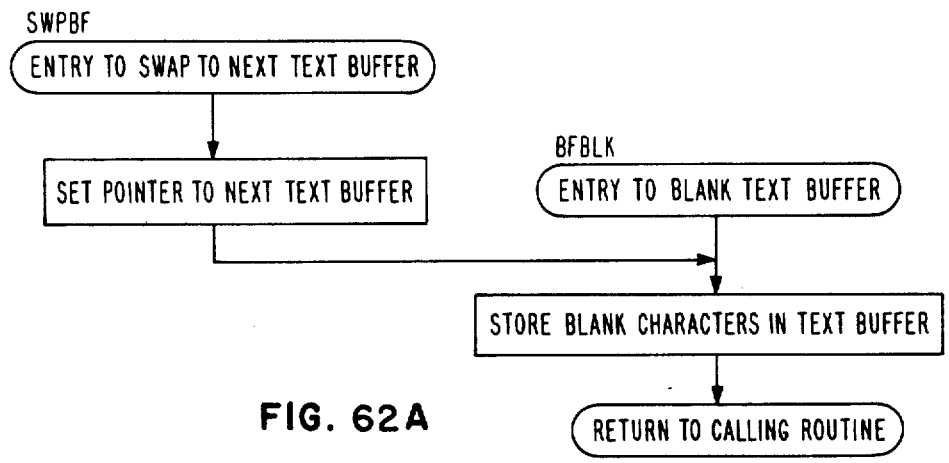
FIGS. 62A-62C illustrate related routines involving the selection and blanking of the text buffers as well as saving and return to the overlays.
Figure 62B:
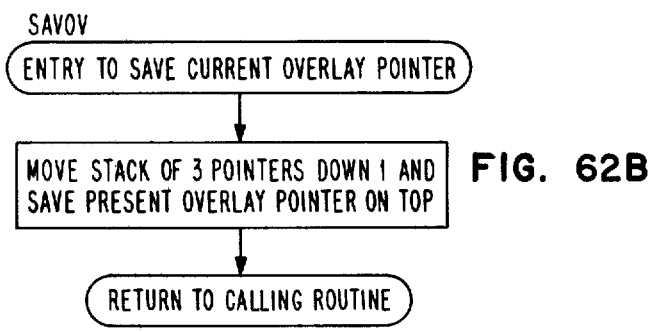
Figure 62C:
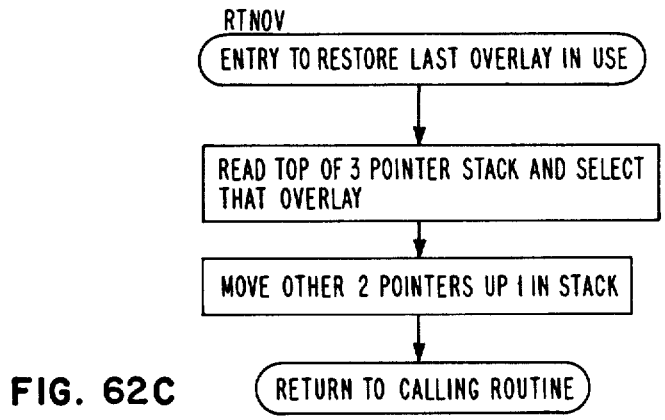

FIGS. 62A-62C illustrate three related routines. The first one is a multiple entry routine, FIG. 62A. The first entry is for swapping to the next Text Buffer. The Pointer is selected for the next Text Buffer; then, the second entry point is available. This entry point is for blanking the presently selected Text Buffer. At this point the next Text Buffer is selected and the routine is at the Text Buffer just used to blank it. Blank characters are stored in the current Text Buffer and then a return is made to the calling routine. The next routine, FIG. 62B, is the Save Overlay Routine which allows a return back to the code in an overlay when another overlay has been selected. This makes use of a stack of three pointers and upon entry moves the top two pointers down one and places the current overlay pointer on the top and then returns to the calling routine. The reverse routine of this Save Routine is the Return Routine, FIG. 62C, which reads the top of the three pointer stack and then selects that particular overlay that was on top of the stack. After this overlay as been selected, the stack is now moved up, or the bottom two pointers are moved up one in the stack and a return is made to the calling routine.

Reference is now made to FIG. 63 entitled "Loading Characters from Compressed Tables". This illustrates the scheme used to create wire images for use by the printer. There are two separate tables to build each character. The first table is called the Load Table; the second table is the Data Table. The Load Table indicates the usage of the the data in the Data Table. For example, in the Load Table there is a byte which is broken into eight bits—Bits 0 through 7. If Bit 7 is on and Bit 0 is off, then this byte indicates a Skip Count or the amount of characters to skip before coming to the next one. Bits 1 through 6 are the count bits where Bit 6 is equal to a value of 1; Bit 5 is equal to a value of 2; Bit 4 is equal to a value of 4 and so on until Bit 1 which is equal to a value of 32. If Bit 0 is on along with Bit 7 this indicates that there is a graphic error count. A graphic error is defined as a character that is not normally printed in the selected font. A good example is the control characters which are 00 through 3F. If printed in transparent mode, which means that they are not decoded into control characters, they are printed as hyphens until the graphic error is changed to some other character. This graphic error character count for loading into the table is the same as the skip count. If the skip bit is not on, in other words bit 7 is off, then bits zero through 6 indicate whether the data from the data table is loaded or whether a blank or zero is loaded for the slices of the vertical sections of a particular image for a character coming from the data table or coming as blanks. An example is a byte which has a value of '9A' or 1001 1010; this indicates that slice 1 and slice 9 are already blank due to blanking of the complete character image or font storage area in the random access memory. With this example, the second byte for the slice of that particular character would come from the Data table. The next two slices are loaded as blanks; the following slice for the fifth slice would be from the Data table; the sixth slice, from the Data table; the seventh slice would be blank and the eighth slice would be from the Data table. In this manner, four slices have been loaded from the Data table to create a total of nine slices for the full image. This compression scheme allows all the images to be compressed into one 2K (2048) byte area of Random Access or Read Only Storage.

The command string shown in FIG. 64 selects 1 of 16 pre-determined character sets that the printer subsystem 2 uses to print data. This formatting command is Set Coded Graphic Character Set (CGCS) through Local Identification (ID). The first frame (hex 2B) designates the sequence as a formatting command string. Frame two (hex D1) is the command class. Frames three (hex 03) and four (hex 81) are the command type. The fifth frame (P1) is the LC code for a designated character set. The printer subsystem 2 loads this character set from permanent storage into the print image buffers. All print data uses the stored character set until it is changed by another Set CGCS through Local ID command, a Load Alternate Characters command (described below), or a Power-On Reset which loads the base character set.

| LC Code (PI) | Character Set |
|---|---|
| FF | Base (Default) (set by jumper) |
| 00 | Multi-lingual |
| 01 | United States |
| 02 | Austria/Germany |
| 03 | Belgium |
| 04 | Brazil |
| 05 | Canadian French |
| 06 | Denmark/Norway |
| 07 | Finland/Sweden |
| 08 | France |
| 09 | Italy |
| 0A | Japan-English |
| 0B | Japan-Katakana |
| 0C | Portugal |
| 0D | Spain |
| 0E | Spanish Speaking |
| 0F | United Kingdom |

All other codes are treated as a base (default) value and a no-operation takes place. The character set previously loaded into the print image buffers is unchanged.

The Load Alternate character command, FIG. 65, allows the user to load from 1 to 25 characters into an alternate character buffer. The third frame NN is a frame count and must be in multiples of ten. A character image requires 10 frames. It can not exceed 250 (plus 1 for count frame) to avoid input buffer overrun.

The data that follows the count frame must be in groups of ten frames with the following organization.

Frame One—the EBCDIC code that causes the character image to print in subsequent print operations.

Frames Two through Ten—the codes for each vertical column of dots in the 8×9 print matrix, which define the print wires to be activated for the remaining eight vertical columns of the character.

Figure 66:
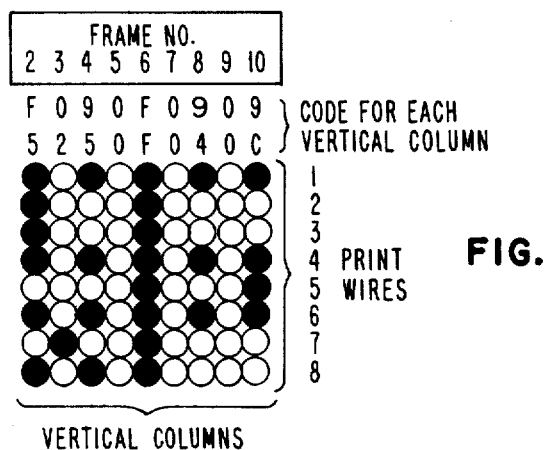

From FIG. 66, it can be seen that each print wire 1-8 is represented by a particular bit in each frame of data. Therefore, a hex 00 will not activate any print wires, a hex 01 activates print wire 8, hex 02 activates print wire 7, and so forth until a hex FF that activates all print wires 1-8 in a given column of the 8×9 print matrix.

Figure 67:
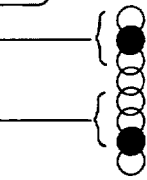

For example, a hex 42 in frame two causes print wires 2 and 7 to activate in vertical column one of the 8×9 print matrix, as shown in FIG. 67.

Programming considerations: If the count frame (NN) equals hex 00, no-operation results. If the count frame is a value that is not a multiple of 10 plus 1 for count frame, zeros (or blanks) are filled in for the right most columns to the next higher multiple of 10. If the count frame is higher than 251, data in excess of 251 frames is disregarded and invalid SCS parameter status is reported. If the value of frame one in the ten frame character image is hex FF, the next nine frames are disregarded and not loaded into the print image buffer.

In horizontal rows, adjacent dots must not be planned for a character image. Horizontally adjacent dots provide inconsistent results because, depending upon the direction of the print mechanism movement, the left or right adjacent dot is disregarded. This rule also applies to dot positions in columns that are normally between characters (vertical columns one and nine).

Figure 68:
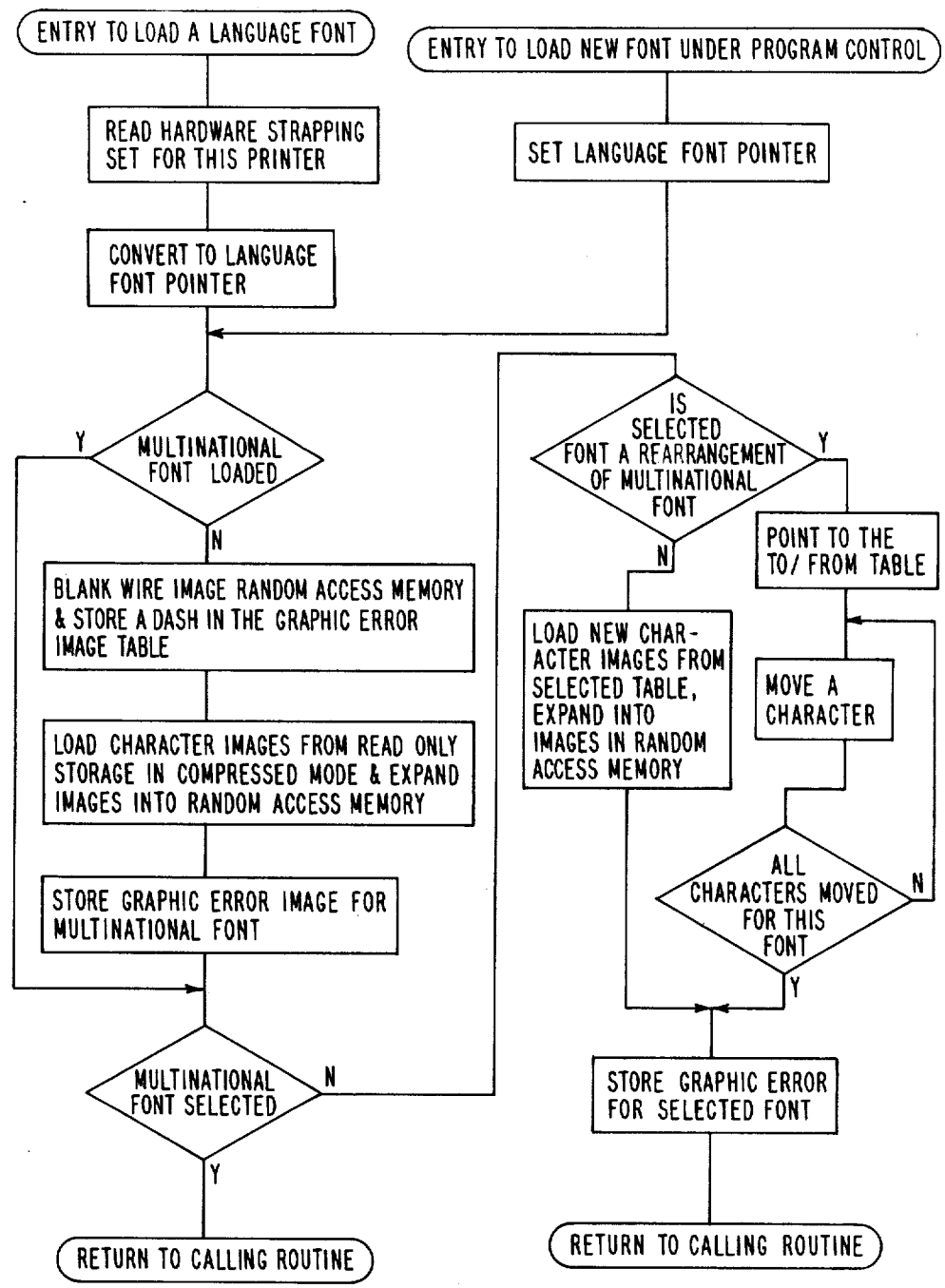
FIG. 68 illustrates the routine for font selection and modification.

FIG. 68 illustrates the method used for loading or reloading of a country font from the Read Only Storage into the Random Access Memory 217 where the Head Image Generator 220 can then read characters to cause the printer unit to print the desired characters. At the entry point, the hardware strapping which is set for the particular printer is read. This strapping value is converted to a language font pointer. The question is then asked, "Is this a Multinational Font loading?" The multinational language is the basis for all the loads in the printer subsystem 2 described herein. If the answer is No to Multinational being loaded, then the Random Access Memory 217 is completely blanked and a dash is stored in the Graphic Error Image table, the dash being the normal image used when none other is presented. After the blanking, the graphic error image is the image for that particular font that is not defined and not printed. The printing for that particular character will be the dash or if another graphic error image is defined, it will be that image. After this, the characters are loaded from the Read Only Storage where they are in compressed mode and they are expanded into the Random Access Memory 217 and stored. This was described in the loading characters from compressed tables chart. After the characters are all loaded, the table is then rescanned looking for graphic error image pointers in which the graphic error image is now stored in the Random Access Memory 217. Then the question is again asked, "Is the Multinational Font Selected?" If it is, the loading is done and a return made to the calling routine. If the Multinational font is not selected, then the question is asked, "Is the selected font a rearrangement of the Multinational font?" Rearrangement means moving a character from one position to another position. An example of that is the use of a dollar sign in a specific location in a printer in the United States where a printer in Great Britain would use a pound sign in the same location. If the answer is No, then new characters are loaded from another selected table and expanded into the Random Access Memory 217. After all these new characters are stored, again the table is rescanned and graphic error images are selected for that font. Upon completion of this, a return is made to the calling routine. If the selected font is a rearrangement of Multinational, then a pointer is set to the To/From table which indicates which character is moved from where to where. Each character is moved from the originating location where it will be used for that font and the question is again asked or is asked, "Are all characters moved for this font?" If No, the routine continues to move characters. If Yes, then graphic error images are again stored for this particular font and a return made to the calling routine. The other entry for this load is the reload capability which could be from the SNS or SNA commands to cause a different country to be loaded other than what the strapping is set for. Upon entry, the language font pointer is set to that desired font and then the reload location is accessed where the question is asked again, "Is Multinational Font loaded?" This is similar to the question, "What was the strapping for this particular printer?". The routine continues in the same manner.

FIG. 69 shows the printing from the Interface Buffer with embedded control codes. A code to change the image of a character is demonstrated by a simulated interface buffer with data. At the top, the buffer starts with a "15" which is interpreted as a New Line control character that causes the printer wherever it is to go to the next line at the start of the line. The next control sequence, 2B, D1, (2B D1 03 81 01), is interpreted as a Load United States/Canada Font into the Random Access Memory 217. Following this, there are two 40's which are interpreted as printing a blank. A (5B) is next and under the United States/Canada Font prints as a dollar sign. The next four characters which are a (F3 4B F7 F5) will print in sequence a three, period, seven, five (3.75) with the total characters being printed as "$3.75". Next in sequence are three "40" commands which are three blank spaces. Following is another control sequence. This is (2B D1 03 81 0F) which causes a loading of the United Kingdom font. A (5B) is printed as done previously, but since the United Kingdom font was loaded, (5B) is now a pound sign instead of a dollar sign. This is the next printable character that is printed. The following four characters (F2 4B F2 F5) are interpreted to a "2.25" to be printed after the pound sign. The next control command sequence is a sequence to cause the image in the Random Access Memory 217 for location (5B) to be modified to a diamond image. This sequence is (2B FE 0C 01 5B 00 10 28 34 AA 34 28 10 00). The last nine bytes are the characters that cause the dots to be generated in the diamond image. The following character is a 40 which will print as a blank. Then the (5B) is printed again which prints as a diamond. This finishes the sequence of this particular buffer that has been simulated. The printed page has seventeen characters printed in one line. These are actually printed in three separate passes on that particular line by the print heads 34. Below the printed results are an enlarged picture of the generation of the diamond image. This shows how the diamond is created from the control code in the Interface Buffer.

Operation Codes

A number of operation codes are utilized by the microprocessors 200, 210. These are listed below.

| ALU OP CODES | | |
|---|---|---|
| -- MODE VALUE -- | | |
| REG TO REG 0__ | | |
| DAR TO DAR 1__ | | |
| REG TO DAR 2__ | | |
| DAR TO REG 3__ | | |
| MSK TO REG 4__ | | |
| MSK TO DAR 5__ | | |
| Function OP Codes | | |
| Add | A | __0__ |
| Add Carry | AC | __1__ |
| Move | M | __2__ |
| Clear (0) | CLR | __2__ |
| Subtract/Borrow | SB | __3__ |
| Subtract | S | __4__ |
| Compare | C | __5__ |
| Subtract Summary | SS | __6__ |
| Compare Summary | CS | __7__ |
| And | N | __8__ |
| Set Bit Off | SBF | __8__ |
| Test | T | __9__ |
| And Summary | NS | __A__ |
| Test Summary | TS | __B__ |
| Or | O | __C__ |
| Set Bit On | SBN | __C__ |
| Shift Right | SR | __D__ |
| Exclusive Or | X | __E__ |
| Shift Right Circular | SRC | __F__ |
| Conditional Branches | | |
| Branch Not Carry, Branch High | BNC,BH | C__ODD |
| Branch Carry, Branch Less Than Or Equal | BC,BLE | D__EVEN |
| Branch Not Zero, Branch Not Equal, Branch True | BNZ,BNE,BT | E__ODD |
| Branch Zero, Branch Equal, Branch False | BZ,BE,BF | F__EVEN |
| Unconditional Branches | | |
| Branch and Wait | BAW | C__EVEN |
| Branch | B | D__ODD |
| Branch and Link | BAL | E__EVEN |
| Branch Via Link | RTN | F001 |
| Return and Link | RAL | F201 |
| Branch Via DAR | BVD | F301 |
| Select Data Address Registers (DAR's) and Storage (STG) | | |
| Select Memory Data Low | SDL | FC01 |
| Select Memory Data High | SDH | FE01 |
| Select Memory Inst Low | SIL | F481 |
| Select Memory Inst High | SIH | F489 |
| Select Data Bit X Off | SXF | F441 |
| Select Data Bit X On | SXN | F445 |
| Select Main DARS | SMD | F501 |
| Select Aux DARS | SAD | F701 |
| Input/Output, Load/Store Ops | | |
| Input From Device | IN | 68__ |
| Sense Device | SNS | 69__ |
| Output To Device | OUT | 78__ |
| Direct Input and Output | DIO | 7A__ |
| Load Registers | LDR | 89XY |
| Load Registers and DAR+1 | LDRP | 8BXY |
| Load DAR | LDD | 84XY |
| Load DAR and DAR+1 | LDDP | 86XY |
| Load Memory Indexed | LDI | 8A0__ |
| Memory to I/O Device | MIO | 8C__ |
| Memory to I/O Device and DAR+1 | MIOP | 8E__ |
| Load Link Register | LDL | 8000 E |
| Load Link Register and DAR+1 | LDLP | 8200 E |
| Load Absolute Address | LDA | 9__ |
| Store Registers | ST | A9XY |
| Store Registers and DAR+1 | STRP | ABXY |
| Store DAR | STD | A4XY |
| Store DAR and DAR+1 | STDP | A6XY |
| I/O Data To Memory | IOM | AC__ |
| I/O Data To Memory and DAR+1 | IOMP | AE__ |
| Store Memory Indexed | STI | AA0__ |
| Store Link High Order (Even Byte) | SLH | A000 |
| Store Link High Order and DAR+1 | SLHP | A200 |
| Store Link Low Order (Odd Byte) | SLL | A100 |
| Store Link Low Order and DAR+1 | SLLP | A300 |
| Store In Absolute Address | STA | B__ |

Microprocessor Registers

Each of the microprocessors 200 and 210 has a number of internal registers listed below that are used for various purposes such as work registers. Although not illustrated in the drawing, the register layout is handled in a similar fashion to that shown in FIG. 59 of the Boynton et al application.

As a convenience, the register assignments for the Communications microprocessor are listed below.

| Communications Microprocessor Registers | | | |
|---|---|---|---|
| WORK0 | EQU | R0 | Work Register |
| WORK1 | EQU | R1 | Work Register |
| WORK2 | EQU | R2 | Work Register |
| WORK3 | EQU | R3 | Work Register |
| WORK4 | EQU | R4 | Work Register |
| WORK5 | EQU | R5 | Work Register |
| WORK6 | EQU | R6 | Work Register |
| WORK7 | EQU | R7 | Work Register |
| WORK8 | EQU | R8 | Work Register |
| WORK9 | EQU | R9 | Work Register |
| WORKA | EQU | R10 | Buffer Indicator Register |
| WORKB | EQU | R11 | Work Register |
| WORKC | EQU | R12 | Work Register |
| POINT | EQU | R13 | Pointers Not in Load Mode |
| EBC | EQU | X'8' | Switch Set to Print EBCDIC |
| PASS2 | EQU | X'4' | Pass Count for Dummy Forms in SBI |
| DHOLD | EQU | X'2' | Hold LED Display |
| COVER | EQU | X'1' | Cover Platen Open Indicator |
| HOST1 | EQU | R13 | (Alternate Use) Host Country Selected Switch |
| HARD1 | EQU | R14 | Hardware Country Selected Switch |
| LOAD1 | EQU | R15 | Random Access Memory Type of Load Switch |
| | | 0 | Nothing Loaded to Random Access Memory and IPL Mode |
| | | 1 | Multinational Loaded to Random Access Memory |
| | | 2 | Country Overlay of Multinational |
| | | 4 | Mode Switch Modification to Character Set |
| | | 8 | Modification to Character Set |
| DATA0 | EQU | D0,D0 Aux | Address Registers |
| DATA1 | EQU | D1,D1 Aux | Address Registers |
| DATA2 | EQU | D2,D2 Aux | Address Registers |
| DATA3 | EQU | D3 | Buffer Pointer DAR |
| DATA4 | EQU | D4 | Work DAR |
| DATA5 | EQU | D5 | Work DAR |
| DATA6 | EQU | D6 | Work DAR |
| DATA7 | EQU | D7 | Work DAR |
| DATA8 | EQU | D8 | Work DAR |
| DATA9 | EQU | D9 | Work DAR |
| BFNUM | EQU | D10 | Buffer Pointer Indicator |
| GECK | EQU | X'8' | In Graphic Error Mode Indicator |
| BFUSE | EQU | X'4' | Buffer Cleared Indicator |
| BFN2 | EQU | X'2' | Text Buffer 2 Indicator (0=1, 1=2) |
| RAMP | EQU | X'1' | Rest for home or Ramp Indicator |
| LSCON | EQU | D11 | Last Console Setting /F = In Load Mode |

-continued

Communications Microprocessor Registers

| Name | | | |
|---|---|---|---|
| FMIND | EQU | D12 | Forms Indicator |
| PGUP | EQU | X'8' | Page Up for Display Indicator |
| D2LD | EQU | X'4' | Mask To Test for 2nd Data Load |
| CAN | EQU | X'2' | Cancel Button Held Indicator |
| TRANS | EQU | X'1' | In Transparent Mode Indicator |
| IND | EQU | D13 | Indicators |
| NEG | EQU | X'8' | Negative Skip Indicator |
| XSKIP | EQU | X'4' | More To Skip Indicator |
| PTHLD | EQU | X'2' | Print One Line and Hold |
| PTDON | EQU | X'1' | Print of One Line Done |
| PTRST | EQU | X'3' | Above Two Bits Together |
| CMCTL | EQU | D14 | Command Control Byte |
| D1LD | EQU | X'8' | Mask To Test for 1st Data Load |
| D2LD | EQU | '4' | Mask To Test for 2nd Data Load |
| D3LD | EQU | X'C' | Mask To Test 1st and 2nd Data Load |
| RESN1 | EQU | X'1' | Mask To Test for 1st Resend |
| RESN2 | EQU | X'2' | Mask To Test for 2nd Resend |
| RESND | EQU | X'3' | Mask To Test for Either Resend |
| NOLD | EQU | X'F' | Mask To Test for No Command |
| MVADJ | EQU | D15 | Adjustment Control Byte |
| RLRD1 | EQU | '9' | Roll and Ready Indicator Together |
| ROLLD | EQU | X'8' | Roll Display Indicator |
| CHGD | EQU | X'4' | Change To Next Sequence Indicator |
| ADJP1 | EQU | X'2' | Change Density Mask |
| RDY1 | EQU | X'1' | Software Ready Indicator |
| RAMIN | EQU | X'OFFB' | End of Random Access Memory in ROS Slot |

Equates for Communications Microprocessor

A number of equivalent terms or "equates" are used in the program listings for the Communications microprocessor 200. These are as follows:

| Name | Definition |
|---|---|
| ADRAM | START OF DATA IN RANDOM ACCESS MEMORY |
| BAL01 | SAVE BAL RETURN OVERLAY POINTER |
| BAL02 | SAVE BAL RETURN OVERLAY POINTER |
| BAL03 | SAVE BAL RETURN OVERLAY POINTER |
| BFCPI | CHARACTER PER INCH - LOOP POSITION |
| | 0 = 10 A6 |
| | 1 = 15 A6 |
| | 2 = 10 A8 |
| | 3 = 15 A8 |
| | 4 = ABCD |
| | BIT 0 OFF = 10 CPI — PRESENT MODE |
| | BIT 0 ON = 15 CPI — PRESENT MODE |
| | BIT 1 OFF = 10 CPI — HOST MODE |
| | BIT 1 ON = 15 CPI — HOST MODE |
| BFN2 | TEXT BUFFER 2 INDICATOR (0 = 1, 1 = 2) |
| CTYSL | COUNTRY SELECT EQUATE TABLE |

-continued

| Name | Definition |
|---|---|
| GECHR | X'09' BYTES FOR GRAPHIC ERROR |
| GETAB | X'20' BYTES FOR GRAPHIC ERROR TABLE |
| GETEN | END OF GRAPHIC TABLE PLUS ONE |
| LANG | LANGUAGE SWITCH |
| LOAD1 | LARGE COUNTRY #1 |
| LOAD2 | LARGE COUNTRY #2 |
| LOAD3 | LARGE COUNTRY #3 |
| MLTLD | START OF DATA MODIFICATIONS |
| MODIN | LOAD MODIFY MASK |
| MODLD | FIRST POINTER TO MODIFIED CHARACTERS |
| RNIND | RETURN/HEAD INDICATOR SAVE BYTE |
| OVLYM | SELECT MAIN OVERLAY MEMORY |
| OVLYN | OVERLAY NUMBER IN OVERLAY |
| OVLY1 | SELECT OVERLAY 1 MEMORY |
| OVLY2 | SELECT OVERLAY 2 MEMORY |
| OVLY3 | SELECT OVERLAY 3 MEMORY |
| OVLY4 | SELECT OVERLAY 4 MEMORY |
| RNIND | RETURN/HEAD INDICATOR SAVE BYTE |
| R01SV | SAVE REG 0-1 WHEN OVERLAY PTR SAVE |
| TBF10 | DATA IN TEXT BUFFER 1 (10 CPI) |
| TBF15 | DATA IN TEXT BUFFER 1 (15 CPI) |

Labels

The following labels are used by the Communications microprocessor 200. These serve, for example, as pointers for addressing or for branching purposes.

| Labels | Labels | Labels |
|---|---|---|
| BLANK | LDSEL | SKPCH |
| BLDGE | LDTPT | SKPGE |
| BTMSK | LD012 | SLCNX |
| BUF15 | LOADT | STCNT |
| CKMOR | MOVBT | STRBK |
| CKOTR | MOVCH | SUIND |
| CLRGE | MULGE | SWPBF |
| CMPND | NIBCK | TBEND |
| DLOAD | NOTED | TBSKP |
| DONE | NXSLC | TCY1 |
| DUMLD | PLNSK | TCY2 |
| FLBK | RELOX | TEST2 |
| GEMOV | RESTK | TEST3 |
| INCPT | RTNOV | TES2 |
| LANSW | SAVOV | TES3 |
| LDCHR | SD012 | TGECK |
| LDCY1 | SELBF | TLD3 |
| LDCY2 | SETBT | TXBF1 |
| LDCY3 | SETGE | XCOMM |
| LDGET | SET1 | |
| LDMOR | SHFTB | |

Program Listings

Program listings (source statements) that relate to the flowcharts and routines described herein are presented below:

| Label | Op Code | Arguments | Comment |
|---|---|---|---|
| | | FIND OUT WHAT LANGUAGE THE HARDWARE IS SET FOR | |
| LOAD | | E ENTRY | |
| LOAD | EQU | , | |
| | SXN | , | |
| | NOP | , | |
| | LDA | RNIND | LOAD HOST INDICATOR |
| | M | POINT,WORK0 | SAVE THE RETURN INDICATORS |
| | STA | RNIND | |
| LANSW | IN | LANG | GET THE LANGUAGE INDICATOR |
| | M | X'0',WORK1 | ZERO REG |
| SLANG | SXF | , | POINT TO W/1 ROS |
| | NDP | , | |
| | LDAR | CTYSL | POINT TO TABLE |
| | M | CTYSL,D2,4 | SET UP ADRS IN DAR'S |
| | M | CTYSL,D1,3 | |

-continued

| Label | Op Code | Arguments | Comment |
|---|---|---|---|
| | M | CTYSL,D0,2 | |
| LDSEL | LDRP | WORK2,WORK3 | LOAD A SELECTION |
| | C | WORK0, WORK3 | IS IT SELECTED LANGUAGE |
| | CS | WORK1,WORK2 | |
| | BNE | CMPND | |
| | LDRP | WORK1,WORK0 | LOAD INTERNAL LANGUAGE NUMBER |
| | B | SUIND | GO LOAD IMAGES |
| CMPND | C | X'F',WORK3 | TEST FOR END OF TABLE AND DEFAULT |
| | CS | X'F;,WORK2 | |
| | BNE | INCPT | GO INCREMENT POINTER IF NOT END |
| | B | LANSW | GO LOAD DEFAULT LANGUAGE |
| INCPT | A | X'1',D2 | INCREMENT POINTER |
| | AC | X'0',D1 | |
| | B | LDSEL | CONTINUE THROUGH STACK |
| SUIND | EQU | | |
| | M | WORK0,HOST1 | PRELOAD HOST SWITCH |
| | M | WORK0,HARD1 | SET HARDWARE SWITCH |
| | M | X'0',LOAD1 | SET LOADING INDICATOR |
| | CHECK FOR A HARDWARE OR HOST SELECTION | | |
| RELOX | T | X'1',LOAD1 | IS MULTINATIONAL LOADED |
| | BF | DLOAD | IF NOT GO LOAD IT |
| | SET UP FOR HOST SELECTION (HOST = HARD INIT) | | |
| CKOTR | C | X'0',HOST1 | CHECK FOR MULTI SELECTED |
| | BE | DONE | LOADING DONE IF SO |
| | M | HOST1,WORK0 | ELSE SET UP FOR MODIFICATION |
| | SET THE ADDRESSES INTO DARS | | |
| | SXF | , | |
| | SMD | , | |
| | LDAR | MODIN | POINT TO THE MODIFY INDICATORS |
| | M | MODIN,D2,4 | SET UP ADRS IN DAR'S |
| | M | MODIN,D1,3 | |
| | M | MODIN,D0,2 | |
| | LDRP | WORD3,WORK1 | GET THE FIRST NIBBLE |
| | M | MODLD,D2,4 | POINT TO THE MOD TABLES |
| | LDRP | WORK1,WORK2 | GET THE TABLE ADDRESS |
| | LDD | D0,D1 | GET THE DATA ADDRESS |
| | CLR | D2 | THE ADDRESS |
| | M | X'0',D2 | SET REG/DAR TO ZERO |
| | SAD | , | |
| | M | WORK1,D0 | POINT TO THE TABLE |
| | M | WORK2,D1 | AND COMPLETE |
| | CLR | D2 | THE ADDRESS |
| | M | X'0',D2 | SET REG/DAR TO ZERO |
| | CHECK FOR COUNTRY LOAD OR MODIFY | | |
| | M | X'2',LOAD1 | INDICATE MULTINATIONAL MODIFIED |
| | C | X'1',WORK0 | TEST FOR LOAD OR MODIFY |
| | BNE | TEST2 | NOT COUNTRY 1 IF BRANCH |
| | T | X'4',WORK3 | TEST MASK |
| | BT | LDCY1 | GO LOAD LARGE COUNTRY #1 |
| TEST2 | C | X'2',WORK0 | TEST FOR LOAD OR MODIFY |
| | BNE | TEST3 | NOT COUNTRY 2 IF BRANCH |
| | T | X'2',WORK3 | TEST MASK |
| | BT | LDCY2 | GO LOAD LARGE COUNTRY #2 |
| TEST3 | C | X'3',WORK0 | TEST FOR LOAD OR MODIFY |
| | BNE | BTMSK | NOT COUNTRY 3 IF BRANCH |
| | T | X'1',WORK3 | TEST MASK |
| | BT | LDCY3 | GO LOAD LARGE COUNTRY #3 |
| | SET UP THE MASK TO CHECK EACH MOVE FOR SELECTED COUNTRY | | |
| BTMSK | M | X'8',WORK1 | SET UP BIT MASK |
| | CLR | WORK2 | |
| | M | X'0',WORK2 | SET REG/DAR TO ZERO |
| | CLR | WORK3 | |
| | M | X'0',WORK3 | SET RAG/DAR TO ZERO |
| | CLR | WORK4 | |
| | M | X'0',WORK4 | SET REG/DAR TO ZERO |
| SETBT | A | X'0',WORK0 | RESET CARRY BIT |
| | SR | WORK1,WORK1 | SHIFT BIT THROUGH REG'S |
| | SR | WORK2,WORK2 | TILL POINTING TO PROPER COUNTRY |
| | SR | WORK3,WORK3 | |
| | SR | WORK4,WORK4 | |
| | S | X'1',WORK0 | COUNT DOWN |
| | BNZ | SLTBT | DO IT AGAIN IF NOT ZERO |

-continued

| Label | Op Code | Arguments | Comment |
|---|---|---|---|
| | | CHECK FOR BIT MASK IN FIRST BYTE | |
| | C | X'0',WORK1 | CHECK FOR COUNTRY'S 2-3 |
| | CS | X'0',WORK2 | CHECK FOR COUNTRY'S 4-7 |
| | BNE | LDMUR | GO MOVE CHAR'S IF NOT ZERO |
| | | SET UP FOR BIT MASK IN SECOND BYTE | |
| | SAD | , | |
| | LDRP | WORK0,WORK1 | DUMMY LOAD TO POINT TO 2ND BYTE |
| | M | WORK3,WORK1 | MOVE MASK BITS TO TEST REG'S |
| | M | WORK4,WORK2 | MOVE MASK BITS TO TEST REG'S |
| | | TEST FOR COUNTRY COMPARE ON MASK OR END OF TABLE | |
| LDMOR | SXF | | |
| | SAD | , | |
| | LDRP | WORK3,WORK4 | GET MASK |
| | C | X'F',WORK3 | TEST FOR END OF TABLE |
| | BNE | NOTED | NOT END |
| | C | X'F',WORK4 | TEST FOR END OF TABLE |
| | BE | BLDGE | IF FF END OF TABLE LOAD GRAPHIC ERR |
| NOTED | T | WORK1,WORK3 | TEST FOR A MOVE |
| | BT | MOVCH | BRANCH IF MOVE |
| | T | WORK2,WORK4 | TEST FOR A MOVE |
| | BT | MOVCH | BRANCH IF MOVE |
| | | INCREMENT POINTERS - NO COMPARE | |
| | LDRP | WORK3,WORK4 | DUMMY READ OF TABLE MASK |
| | SMD | , | |
| | LDRP | WORK3,WORK4 | DUMMY LOAD OF DATA |
| DUMLD | LDRP | WORK3,WORK4 | DUMMY LOAD OF DATA |
| | B | LDMOR | GO TRY TO LOAD MORE |
| | | ENTRY FOR RELOAD | |
| RELOD | SXN | . | |
| | NDP | , | |
| | LDA | RNIND | POINT TO RETURN INDICATOR |
| | M | POINT,WORK0 | SAVE THE RETURN INDICATORS |
| | STA | RNIND | AND STORE IT |
| | M | WORK1,HOST1 | SET THE HOST INDICATOR TO PROPER REG |
| | B | RELOX | CONTINUE PROCESSING |
| | | PREPARE TO CLEAR RANDOM ACCESS MEMORY IMAGE AREA | |
| DLOAD | : | P | PREPARE TO CLEAR RANDOM ACCESS MEMORY WIRE IMAGE |
| DLOAD | SXN | | |
| | M | X'1',LOAD1 | SET DEFAULT LOADED INDICATOR |
| | CLR | WORK0 | SET ZEROS |
| | M | X'0',WORK0 | SET REG/DAR TO ZERO |
| | LDAR | ADRAM | POINT TO FIRST CHAR IMAGE IN RANDOM ACCESS MEMORY |
| | M | ADRAM,D2,4 | SET UP ADRS IN DAR'S |
| | M | ADRAM,D1,3 | |
| | M | ADRAM,D0,2 | |
| | | STORE BLANKS TILL DONE | |
| CLEAR: | P | | STORE BLANKS |
| BLANK | STRP | WORK0,WORK0 | STORE BLANK |
| | C | X'9',D0 | CHECK FOR END |
| | BNE | BLANK | CONTINUE TILL ALL BLANK |
| | | CLEAR THE GRAPHIC ERROR POINTER TABLE | |
| | LDAR | GETAB | POINT TO GRAPHIC ERROR (G.E.) TABLE |
| | M | GETAB,D2,4 | SET UP ADRS IN DAR'S |
| | M | GETAB,D1,3 | |
| | M | GETAB,D0,2 | |
| CLRGE | STRP | WORK0,WORK0 | STORE BLANK IN G.E. TABLE |
| | C | GETEN,D1,3 | CHECK FOR END OF TABLE |
| | BNE | CLRGE | CONTINUE IF MORE |
| | | GO GET THE MULTI-NATIONAL TABLE ADDRESSES | |
| | SXF | , | |
| | SMD | , | |
| | LDAR | MLTD | GET THE ADDRESS OF MULT. TABLES |
| | M | MLTLD,D2,4 | SET UP ADRS IN DAR'S |
| | M | MLTLD,D1,3 | |
| | M | MLTLD,D0,2 | |
| LOADT | : | P | POINT TO MULTI-NATIONAL TABLE |
| LOADT | LDRP | WORK0,WORK1 | GET THE TABLE ADDRESS |

-continued

| Label | Op Code | Arguments | Comment |
|---|---|---|---|
| | LD | WORK2,WORK3 | GET THE DATA ADDRESS |
| | SAD | , | SELECT AUX DAR |
| | M | WORK0,D0 | POINT TO TABLE |
| | M | WORK1,D1 | |
| | CLR | D2 | |
| | M | X'0',D2 | SET REG/DAR TO ZERO |
| | SMD | , | SELECT MAIN DAR |
| | M | WORK2,D0 | POINT TO DATA |
| | M | WORK3,D1 | |
| | CLR | D2 | |
| | M | X'0',D2 | SET REG/DAR TO ZERO |
| | | SET POINTERS TO THE BEGINNING OF RANDOM ACCESS MEMORY | |
| | CLR | WORKB | SET POINTERS TO RANDOM ACCESS MEMORY |
| | M | X'0',WORKB | SET REG/DAR TO ZERO |
| | CLR | WORKC | |
| | M | X'0',WORKC | SET REG/DAR TO ZERO |
| LDTPT | : | P | POINT TO START OF RANDOM ACCESS MEMORY |
| LDTPT | SCF | | |
| | SAD | , | SELECT AUX DAR |
| | LDRP | WORK0,WORK1 | GET A POINTER |
| | | TEST FOR THE END OF THE TABLE | |
| | C | X'F;,WORK1 | TEST FOR END OF TABLE (1ST PART) |
| | BNZ | TBSKP | IF NOT F GO TEST FOR SKIP |
| | C | X'F',WORK0 | TEST FOR END OF TABLE (2ND PART) |
| | BZ | TGECK | IF BOTH "F" END OF TABLE |
| TBSKP | T | X'1',WORK1 | TEST FOR A SKIP |
| | BF | LDCHR | BRANCH IF NOT A SKIP |
| | | SET UP SKIP COUNT | |
| | SR | WORK0,WORK0 | MOVE COUNT 1 TO RIGHT |
| | SR | WORK1,WORK1 | AND SHIFT OUT SKIP BIT |
| | N | X'3',WORK0 | REMOVE GRAPHIC ERROR BIT (IF ANY) |
| | A | WORK1,WORKC | ADD COUNT TO SAVED POINTERS |
| | AC | WORK0,WORKB | |
| | B | LDTPT | GO GET NEXT TABLE ENTRY |
| | | SET UP TO LOAD GRAPHIC ERROR | |
| TGECK | SMD | , | |
| | T | X'1',LOAD1 | IS MULTI LOADED |
| | BT | MULGE | GO POINT TO MULTI G.E. TABLE |
| | | IF OVERLAY OF MULTINATIONAL THEN FIND WHICH GRAPHIC ERROR (G.E.) TABLE | |
| | LDA | MODIN | GET THE 3 MODIFY INDICATORS |
| | T | X'4',WORK0 | IS FIRST LARGE COUNTRY INDICATED |
| | BT | TCY1 | GO SEE IF COUNTRY 1 LOADABLE VS MOD |
| TES2 | T | X'2',WORK0 | IS FIRST LARGE COUNTRY INDICATED |
| | BT | TCY2 | GO SEE IF COUNTRY 2 LOADABLE VS MOD |
| TES3 | T | X'1',WORK0 | IS FIRST LARGE COUNTRY INDICATED |
| | BF | TBEND | GO SEE IF COUNTRY 3 SELECTED VS MOD |
| | C | X'3',HOST1 | GO SEE IF COUNTRY 3 SELECTED |
| | BE | TLD3 | SET UP TO LOAD G.E. FOR COUNTRY 3 |
| TBEND | T | X'1',LOAD1 | IF MULTI IN GO CHECK GOR OVERLAY |
| | BT | CKOTR | GO CHECK IF MULTI TO MODIFIED |
| | | RETURN TO THE CALLER | |
| DONE | SXN | , | SET X BIT ON FOR NEXT ROUTINE |
| | NOP | , | |
| | LDA | RNIND | LOAD THE RETURN INDICATOR |
| | M | HOST1,WORK1 | LOAD RETURN INDICATOR |
| | STA | RNIND | SAVE HIST INDICATOR |
| | M | WORK0,POINT | RESET REGISTER |
| | B | RTNOV | GO RETURN TO PROPER MEMORY |
| TCY2 | C | X'2',HOST1 | GO SEE IF COUNTRY 2 |

-continued

| Label | Op Code | Arguments | Comment |
|---|---|---|---|
| | BNE | TES3 | SELECTED<br>GO TEST FOR COUNTRY 3 |
| TLD2 | M | LOAD2,D2,4 | POINT TO G.E. TABLE |
| | B | LDGET | GO STORE BLANK IF NONE |
| TCY1 | C | X'1',HOST1 | GO SEE IF COUNTRY 1 SELECTED |
| | BNE | TES2 | GO TEST FOR COUNTRY 2 |
| | | POINT TO PROPER GRAPHIC ERROR (G.E.) TABLE | |
| TLD1 | M | LOAD1,D2,4 | POINT TO G.E. TABLE |
| | B | LDGET | GO STORE BLANK IF NONE |
| TLD3 | M | LOAD3,D2,4 | POINT TO G.E. TABLE |
| | B | LDGET | GO STORE BLANK IF NONE |
| MULGE | M | MLTLD,D2,4 | POINT TO G.E. TABLE |
| LDGET | M | MLTLD,D0,2 | POINT TO G.E. TABLE |
| | M | MLTLD,D1,3 | POINT TO G.E. TABLE |
| | LDRP | WORK0,WORK1 | GET G.E. TABLE ADDRESS |
| | M | WORK0,D0 | SET ADDRESS |
| | M | WORK1,D1 | |
| | CLR | D2 | |
| | M | X'0',D2 | SET REG/DAR TO ZERO |
| | | MOVE GRAPHIC ERROR CHARACTER TO RANDOM ACCESS MEMORY | |
| BLDGE | CLR | WORKB | POINT TO RANDOM ACCESS MEMORY |
| BLDGE | M | X'0',WORKB | SET REG/DAR TO ZERO |
| | CLR | WORKC | |
| | M | X'0',WORKC | SET REG/DAR TO ZERO |
| SKPGE | SXF | , | |
| | SMD | , | |
| | LDRP | WORK0,WORK1 | GET SKIP/G.E. COUNT |
| | C | X'F',WORK0 | TEST FOR END OF TABLE |
| | BNE | STONT | |
| | C | X'F;,WORK1 | |
| | BE | TBEND | LOADING FINISHED IF FF FOUND |
| STCNT | SR | WORK0,WORK4 | SET COUNT |
| | SR | WORK1,WORK5 | |
| | N | X'3',WORK4 | REMOVE G.E. INDICATOR BIT |
| | T | X'1',WORK1 | TEST FOR A SKIP |
| | BF | SKPCH | GO INCREMENT POINTER (1 CHAR) |
| | T | X'8',WORK0 | TEST FOR G.E. COUNT |
| | BF | PLNSK | GO INCREMENT POINTER (PLAIN SKIP) |
| | BAL | SD012 | SAVE ADDRESS OF SKIP/G.E. TABLE |
| SETGE | LDAR | GECHR | POINT TO G.E. CHAR |
| SETGE | M | GECHR,D2,4 | SET UP ADRS IN DAR'S |
| | M | GECHR,D1,3 | |
| | M | GECHR,D0,2 | |
| | SXN | , | |
| | SAD | , | |
| | M | X'0',D0 | POINT TO WI RANDOM ACCESS MEMORY |
| | M | WORKB,D1 | |
| | M | WORKC,D2 | |
| GEMOV | SMD | , | |
| | LDRP | WORK0,WORK1 | LOAD A SLICE OF G.E. |
| | SAD | , | |
| | ST | WORK0,WORK1 | AND STORE IT IN RANDOM ACCESS MEMORY |
| | A | X'1',D0 | INCREMENT TO NEXT SLICE IN RANDOM ACCESS MEMORY |
| | C | X'9',D0 | GO GET NEXT SLICE IF NOT DONE |
| | BNE | GEMOV | |
| | CLR | WORK6 | ZERO WORK REG |
| | M | X'0',WORK6 | SET REG/DAR TO ZERO |
| | M | D1,WORK2 | GET EBCDIC VALUE |
| | M | D2,WORK3 | |
| | A | WORK3,WORK3 | SHIFT LEFT 1 |
| | AC | WORK2,WORK2 | TO GET EBCDIC VALUE DIVIDED BY 8 |
| | AC | WORK6,WORK6 | |
| | SMD | , | |
| | M | GETAB,D1,3 | POINT TO G.E. TABLE |
| | M | GETAB,D2,4 | POINT TO G.E. TABLE |
| | A | WORK2,D2 | AND THE PROPER BYTE |
| | AC | WORK6,D1 | |
| | M | WORK3,WORK6 | SAVE BIT POINTER |
| | SR | WORK3,WORK3 | SET UP COUNT (0-7) |

-continued

| Label | Op Code | Arguments | Comment |
|---|---|---|---|
| | N | X'3',WORK3 | SET COUNT WITHIN NIBBLE (0-3) |
| | M | X'8',WORK2 | SET UP A BIT TO BE OR'ED IN TO TABLE |
| SHFTB | C | X'0',WORK3 | TEST FOR BIT IN PROPER POSITION |
| | BE | NIBCK | GO FIND OUT WHICH NIBBLE |
| | A | X'0',WORK2 | CLEAR CARRY BIT |
| | SR | WORK2,WORK2 | SHIFT BIT TO NEXT POSITION |
| | S | X'1',WORK3 | COUNT DOWN |
| | B | SHFTB | GO CHECK FOR PROPER POSITION |
| | LOAD A CHAR IMAGE TO RANDOM ACCESS MEMORY | | |
| LDCHR | M | D0,DATA7 | SAVE TABLE ADDRESS |
| | M | D1,DATA8 | |
| | M | D2,DATA9 | |
| | M | X'1',D0 | POINT TO WI RANDOM ACCESS MEMORY |
| | M | WORKB,D1 | |
| | M | WORKC,D2 | |
| | M | X'940',WORK7 | SET TO COUNT SLICES |
| | M | X'8',WORK8 | SET TEST BIT |
| NXSLC | CLR | WORK2 | PREPARE A DEFAULT |
| NXSLC | M | X'0',WORK2 | SET REG/DAR TO ZERO |
| | CLR | WORK3 | |
| | M | X'0',WORK3 | SET REG/DAR TO ZERO |
| | T | WORK8,WORK0 | TEST FOR BYTE TO LOADED |
| | BF | STRBK | GO STORE BLANK IF NONE |
| | SXF | | |
| | SMD | , | |
| | LDRP | WORK2,WORK3 | GET DATA TO LOAD |
| STRBK | SXN | | |
| | SAD | , | |
| | ST | WORK2,WORK3 | STORE DATA TO RANDOM ACCESS MEMORY |
| | A | X'1',D0 | INCREMENT TO NEXT SLICE |
| | SRC | WORK8,WORK8 | POINT TO NEXT BIT |
| | BNC | CKMOR | TEST FOR 4 SLICES LOADED |
| | M | WORK1,WORK0 | SET FOR NEXT 3 SLICES |
| CKMOR | A | X'1',WORK7 | REDUCE COUNT |
| | BNZ | NXSLC | GO GET NEXT SLICE IF MORE |
| | A | X'1',D2 | INCREMENT TO NEXT CHARACTER |
| | AC | X'0',D1 | |
| | M | D1,WORKB | SAVE CHARACTER POINTER |
| | M | D2,WORKC | |
| | M | DATA7,D0 | RESTORE TABLE POINTER |
| | M | DATA8,D1 | |
| | M | DATA9,D2 | |
| | B | LDTPT | GO CONTINUE LOADING |
| NIBCK | T | X'8',WORK6 | TEST FOR RIGHT NIBBLE |
| | BF | MOVBT | BRANCH IF NOT |
| | M | WORK2,WORK3 | MOVE BIT TO RIGHT NIBBLE |
| | CLR | WORK2 | CLEAR LEFT NIBBLE |
| | M | X'0',WORK2 | SET REG/DAR TO ZERO |
| MOVBT | LD | WORK0,WORK1 | LOAD BYTE IN TABLE |
| | O | WORK2,WORK0 | OR IN BIT |
| | O | WORK3,WORK1 | |
| | ST | WORK0,WORK1 | AND RESTORE BYTE |
| | SAD | , | |
| | A | X'1',D2 | POINT TO NEXT EBCDIC CHAR |
| | AC | X'0',D1 | |
| | M | D1,WORKB | SAVE EBCDIC VALUE |
| | M | D2,WORKC | |
| | S | X'1',WORK5 | COUNT DOWN ON NUMBER OF G.E.'S |
| | SB | X'0',WORK4 | |
| | SXF | , | |
| | SMD | , | |
| | C | X'0',WORK4 | TEST FOR END OF MOVE G.E.'S |
| | CS | X'0',WORK5 | |
| | BNE | SETGE | GO FILL NEXT CHAR |
| | BAL | LD012 | RESTORE POINTER TO SKIP TABLE |
| | B | SKPGE | GO LOOK FOR MORE IN TABLE |
| SKPCH | A | X'1',WORKC | INCREMENT FOR A PRINTABLE CHARACTER |
| | AC | X'0',WORKB | |
| | B | SKPGE | GO LOOK FOR MORE IN TABLE |
| PLNSK | A | WORK5,WORKC | INCREMENT FOR SKIP(S) W/O G.E. |

-continued

| Label | Op Code | Arguments | Comment |
|---|---|---|---|
| | AC | WORK4,WORKB | |
| | B | SKPGE | GO LOOK FOR MORE IN TABLE |
| GET 'TO-FROM' ADDRESSES AND SAVE ADDRESSES OF TABLES | | | |
| MOVCH | SMD | , | |
| | LDRP | WORK3,WORK4 | GET FROM ADDRESS |
| | LDRP | WORK5,WORK6 | GET TO ADDRESS |
| | BAL | SD012 | SAVE ADDRESS |
| | SAD | , | |
| | M | D0,DATA6 | SAVE ADDRESS |
| | M | D1,DATA7 | |
| | M | D2,DATA8 | |
| SET UP DARS FOR MOVE OF 9 SLICES (BYTES) | | | |
| | SXN | | |
| | M | WORK5,D1 | MOVE 'TO'ADDR TO DAR (AUX) |
| | M | WORK6,D2 | |
| | M | X'0',D0 | |
| | SMD | , | |
| | M | WORK3,D1 | MOVE 'FROM' ADDR TO DAR (MAIN) |
| | M | WORK4,D2 | |
| | M | X'0',D0 | |
| MOVE A CHARACTER | | | |
| SLCNX | LD | WORK3,WORK4 | LOAD A SLICE |
| | A | X'1',D0 | POINT TO NEXT SLICE IN |
| | SAD | , | |
| | ST | WORK3,WORK4 | STORE THE SLICE IN NEW LOCATION |
| | A | X'1',D0 | POINT TO NEXT SLICE OUT |
| | C | X'9',D0 | CHECK FOR FULL CHARACTER MOVED |
| RESTORE TABLE ADDRESSES | | | |
| AGAIN | SMD | , | |
| | BAL | LD012 | RESTORE MASK ADDR'S |
| | SAD | , | |
| | M | DATA6,D0 | RESTORE TO-FROM ADDR'S |
| | M | DATA7,D1 | |
| | M | DATA8,D2 | |
| | SXF | , | |
| | B | DOMLD | GO SKIP A MASK READ AND CONTINUE |
| SET UP ADDRESSES TO OVERLAY TABLES | | | |
| LDCY1 | M | LOAD1,D2,4 | GET THE ADDRESS OF LOAD1 |
| | B | SET1 | GO SET INDICATOR |
| LDCY2 | M | LOAD2,D2,4 | GET THE ADDRESS OF LOAD2 |
| | B | SET1 | GO SET INDICATOR |
| LDCY3 | M | LOAD3,D2,4 | GET THE ADDRESS OF LOAD3 |
| SET THE LOAD INDICATOR | | | |
| SET1 | M | LOAD1,D0,2 | FINISH THE ADDRESS |
| | M | LOAD1,D1,3 | |
| | M | X'2', LOAD1 | SET THE LOAD INDICATOR |
| | B | LOADT | GO LOAD COUNTRY CHAR'S |
| FIND OUT WHICH BUFFER AVAILABLE ROUTINE | | | |
| Note!! Set X On Before Branch Here | | | |
| SWPBF | X | BFN2,BFNUM | FIND OUT WHICH BUFFER LAST UP |
| GETBF | LDAR | BFCPI | POINT TO CPI INDICATOR |
| GETBF | M | BFCPI,D2,4 | SET UP ADDRESS IN DAR'S |
| | M | BFCPI,D1,3 | |
| | M | BFCPI,D0,2 | |
| | LDD | D0,D1 | LOAD IT |
| | T | X'8',D0 | TEST FOR 15 CPI |
| | BT | BUF15 | BRANCH IF SO |
| BUF10 | EQU | | |
| | M | TBF10,D1,3 | LOAD START OF 10 CPI BUFFER |
| | M | TBF10,D2,4 | LOAD START OF 10 CPI BUFFER |
| | B | SELBF | GO SELECT BUFFER |
| BUF15 | EQU | | |
| | M | TBF15,D1,3 | LOAD START OF 15 CPI BUFFER |
| | M | TBF15,D2,4 | LOAD START OF 15 CPI BUFFER |
| SELBF | M | TBF10,D0,2 | LOAD START OF 10 AND 15 CPI BUFFER |
| | T | BFN2,BFNUM | CHECK TO FIND WHICH BUFFER UP |
| | BF | TXBF1 | BRANCH IF FIRST |

-continued

| Label | Op Code | Arguments | Comment |
|---|---|---|---|
| | A | X'1',D0 | SET SECOND IF NOT |
| TXBF1 | B | RTNOV | |
| | ROUTINE TO SAVE RETURN POINTER TO PROPER MEMORY | | |
| SAVOV | SXN | | |
| | STA | R01SV | SAVE REGS 0/1 |
| | LDA | BAL02 | LOAD BAL RETURN #2 |
| | STA | BAL03 | SAVE AS BAL RETURN #3 |
| | LAD | BAL01 | LOAD BAL RETURN #1 |
| | STA | BAL02 | SAVE AS BAL RETURN #2 |
| | SDL | , | SET DATA LOW TO READ FROM OVERLAY |
| | LDA | OVLYN | GET CURRENT OVERLAY POINTER |
| | SDH | , | RETURN DATA HIGH FOR NORMAL DATA |
| | STA | BAL01 | SAVE AS BAL RETURN #1 |
| | LDA | R01SV | RESTORE REGS 0/1 |
| | RTN | , | RETURN |
| | THIS SUBROUTINE WILL FIND AND BLANK THE NEXT BUFFER | | |
| BFBLK | EQU | | |
| | BAL | SAVOV | SAVE POINTER TO RETURN THIS OVERLAY |
| | BAL | SWPBF | GET START OF BUFFER |
| | M | X'0',D2 | FIND BEGINNING OF BUFFER |
| | M | X'0',D1 | |
| | M | X'F',WORK0 | GENERATE A × FF |
| | M | X'1', WORK1 | GENERATE THE COUNTER |
| | M | X'0',WORK2 | |
| FLBK | STRP | WORK0,WORK0 | STORE BLANK EBCDIC VALUE |
| | A | X'1',WORK2 | INCREMENT COUNTER |
| | AC | X'0'WORK1 | INCREMENT COUNTER |
| | BNC | FLBK | CONTINUE IF NO OVERFLOW |
| | ROUTINE TO RETURN TO PROPER MEMORY | | |
| RTNOV | SXN | | |
| | STA | R01SV | SAVE REGS 0/1 |
| | LDA | BAL01 | LOAD BAL RETURN #1 |
| | OUT | OVLY4 | SET TO MAIN OVERLAY AREA |
| | C | X'4',WORK1 | CHECK FOR PROPER OVERLAY |
| | BE | RESTK | IN GO SHIFT REG STACK |
| | OUT | OVLY3 | SET TO MAIN OVERLAY AREA |
| | C | X'3',WORK1 | CHECK FOR PROPER OVERLAY |
| | BE | RESTK | IN GO SHIFT REG STACK |
| | OUT | OVLY2 | SET TO MAIN OVERLAY AREA |
| | C | X'2',WORK1 | CHECK FOR PROPER OVERLAY |
| | BE | RESTK | IN GO SHIFT REG STACK |
| | OUT | OVLY1 | SET TO MAIN OVERLAY AREA |
| | C | X'1',WORK1 | CHECK FOR PROPER OVERLAY |
| | BE | RESTK | IN GO SHIFT REG STACK |
| | OUT | OVLYM | SET TO MAIN OVERLAY AREA |
| RESTK | LDA | BAL02 | GET BAL RETURN #2 |
| | STA | BAL01 | SAVE AS BAL RETURN #1 |
| | LDA | BAL03 | GET BAL RETURN #3 |
| | STA | BAL02 | SAVE AS BAL RETURN #2 |
| | LDA | R01SV | RESTORE REGS 0/1 |
| RTNIX | RTN | , | RETURN |
| | END | XCOMM | |

While a preferred embodiment of the invention has been illustrated and described, it is to be understood that there is no intention to limit the invention to the precise constructions herein disclosed and the right is reserved to all changes and modifications coming within the scope of the invention as defined in the appended claims.

I claim:

1. A font selection and compression arrangement for a printer subsystem having a printer unit and assemblies for feeding a form and printing character images on said form in a variety of languages during print operations, comprising:

language selection means providing multinational, major, and modifier language selection signals indicative of a plurality of language character images to be printed, said language character images being characterized as multinational, major, and modifier images;

storage means for storing a plurality of image sets in a compressed format for access by said printer subsystem during printing, said storage means storing said language images in the form of a plurality of character image information sets including a multinational master set that is a composite of images used in most of said languages, at least one major country set incorporating images not included in said multinational master set and at least one modifier set including images to be modified in said multinational master set;

font selection means responsive to a multinational signal from said language selection means to select said multinational master set from said storage means for use in developing character image signals during printing operations, said font selection means being further responsive to font selection signals in real time during printing operations, said font selection means being operable responsive to a major language signal from said language selection means to select said major country set from said storage means to substitute for said multinational master set and operable responsive to a modifier language signal from said language selection means to select said modifier set from said storage means to modify but maintain said multinational master set as the primary source of images; and image generator means in said printer subsystem operable to utilize said character image sets for producing character image signals in accordance with the language character image set selected and further operable to supply said character image signals to said printer unit for printing of characters required.

2. The printer subsystem of claim 1, further comprising:

image expansion means in said subsystem operable in response to said language selection signals to develop expanded character image sets from said compressed image sets for use by said image generator means during printing operations.

3. The printer subsystem of claim 1, further comprising:

a host system for producing command signals representative of operations to be performed by said printer subsystem and data signals representative of characters to be printed on a form, said data signals normally being arranged in lines of information to be printed; and means in said printer subsystems responsive to language selection signals from said language selection means during printing operations to change language image sets irrespective of character line boundaries.

4. The printer subsystem of claim 1, further comprising:

text buffer areas in said storage means for accommodating individual lines of data information provided to said printer subsystem during printing operations, said lines of data information being provided to said subsystem in accordance with a first character image format;

a printing assembly in said printer unit arranged for printing characters in accordance with a second character image format that is different from said first format; and wherein said image generator means is responsive to said language selection signals to access the appropriate language character image set during printing operations to convert character information signals received by said printer subsystem representative of said first character image format to signals in said second character image format for use by said printer unit.

5. The printer subsystem of claim 1, further comprising:

image selection means operable responsive to said language selection signals to select only particular ones of the images stored in said language image sets comprising less than all of said images in a particular language image set for utilization by said image generator means.

6. The printer subsystem of claim 2, wherein said character image sets are stored in said storage means in the form of related pointer tables and data tables, said pointer tables specifying address locations in said data tables required for development of character image sets, and further comprising:

means controlled by said image expansion means for utilizing the information in the appropriate pointer table to access character images in the related data tables for developing expanded character image information for use by said image generator means.

7. The printer subsystem of claim 1, further comprising:

at least one microprocessor for performing the font selection, compression and expansion functions in said subsystem.

* * * * *